US009001401B2

(12) United States Patent
Yamauchi et al.

(10) Patent No.: US 9,001,401 B2
(45) Date of Patent: Apr. 7, 2015

(54) FABRICATION PROCESS OF MULTI-IMAGE TYPE HOLOGRAM, AND MULTI-IMAGE TYPE HOLOGRAM FABRICATED BY THAT PROCESS

(75) Inventors: Tsuyoshi Yamauchi, Tokyo (JP);
Masachika Watanabe, Tokyo (JP);
Tomoko Kumasawa, Tokyo (JP); Makio Kurashige, Tokyo (JP); Akiko Kitamura, Tokyo (JP); Mitsuru Kitamura, Tokyo (JP); Kenji Ueda, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 648 days.

(21) Appl. No.: 11/608,097

(22) Filed: Dec. 7, 2006

(65) Prior Publication Data
US 2007/0183011 A1    Aug. 9, 2007

(30) Foreign Application Priority Data

| Dec. 13, 2005 | (JP) | 2005-358637 |
| Jan. 20, 2006 | (JP) | 2006-012642 |
| Nov. 13, 2006 | (JP) | 2006-306502 |
| Nov. 13, 2006 | (JP) | 2006-306503 |

(51) Int. Cl.
*G03H 1/20* (2006.01)
*G03H 1/26* (2006.01)
*G03H 1/30* (2006.01)
*G03H 1/02* (2006.01)
*G03H 1/22* (2006.01)

(52) U.S. Cl.
CPC ............... *G03H 1/26* (2013.01); *G03H 1/2645* (2013.01); *G03H 1/0248* (2013.01); *G03H 1/265* (2013.01); *G03H 2001/2273* (2013.01); *G03H 1/2249* (2013.01); *G03H 2210/30* (2013.01)

(58) Field of Classification Search
USPC .......................................................... 359/22
See application file for complete search history.

(56) References Cited

U.S. PATENT DOCUMENTS

| 5,016,953 A * | 5/1991 | Moss et al. ........................ 359/9 |
| 7,132,200 B1 * | 11/2006 | Ueda et al. ........................ 430/1 |
| 2004/0130762 A1 * | 7/2004 | Thomas et al. .................. 359/15 |

* cited by examiner

*Primary Examiner* — Jade R Chwasz
(74) *Attorney, Agent, or Firm* — Sughrue Mion, PLLC

(57) ABSTRACT

A process by which a multi-image type hologram, wherein one 3D image changes over to another depending on a viewing direction, can be fabricated in a simple construction, and a multi-image type hologram fabricated by that process. According to the process for the fabrication of a multi-image type hologram wherein one image changes over to another depending on a viewing direction, the area of a hologram recording material is divided into a plurality of sub-areas. Objects to be displayed on different images are holographically recorded in the respective sub-areas, using reference light having the same angle of incidence, images recorded in the respective sub-areas are simultaneously reconstructed from the recorded first-stage hologram, so that a second-stage hologram recording material is located near the reconstructed object images for recording them as a reflection or transmission type volume hologram.

23 Claims, 30 Drawing Sheets

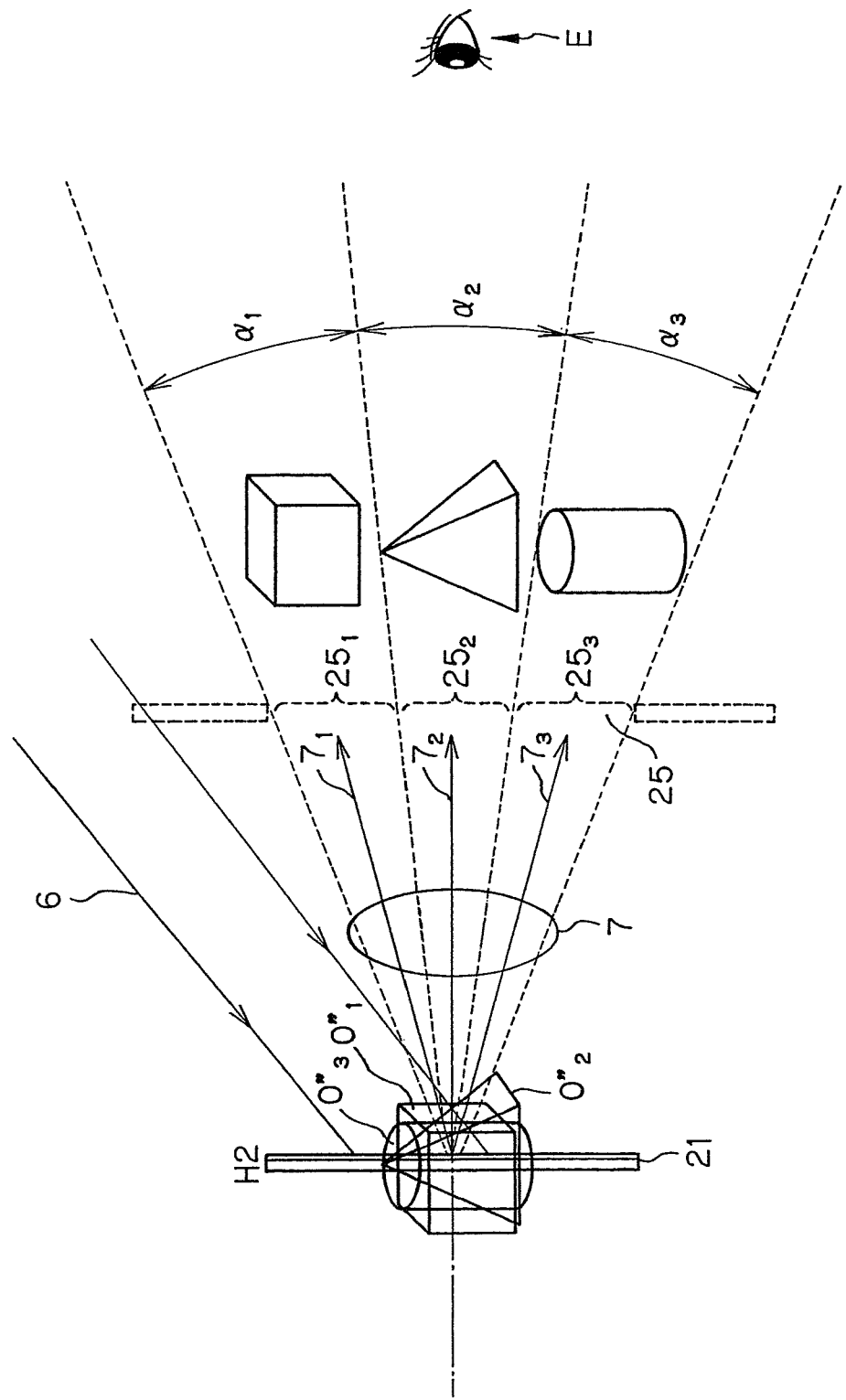

FABRICATION PROCESS OF MULTI-IMAGE TYPE HOLOGRAM, AND MULTI-IMAGE TYPE HOLOGRAM FABRICATED BY THAT PROCESS

BACKGROUND OF THE INVENTION

The present invention relates generally to a fabrication process of multi-image type hologram and a multi-image type hologram fabricated by that process, and more particularly to a process for the fabrication of a volume hologram with one 3D image changing over to another depending on a viewing direction and a volume hologram fabricated by that process.

Among multi-image type holograms with one image changing over to another depending on a viewing direction, there is a rainbow hologram. With the rainbow hologram, a sort of relief hologram, however, each image can never be set up as a 3D (three-dimensional) one, because available images are of the 2D type.

On the other hand, the process of Patent Publication 1 has been known about how to set up each image in the form of a 3D image. According to this process, a plurality of volume holograms with an object on each image recorded by Denisyuk's method using reference light at a specific angle of incidence are recorded by copying in one single volume hologram.

For that process, however, it is required not only to have a plurality of master volume holograms at the ready, but also to provide strict determination of the angle of incidence of reference light at the time of fabricating those master volume holograms.

When the position of a reconstructed image is located at the surface of a recording material according to Denisyuk's method for fabricating a master hologram in one single stage, on the contrary, it is impossible to fabricate such a multi-image type hologram as described above.

Patent Publication 1
JP-A 10-340038
Patent Publication 2
JP-A 2002-39910
Patent Publication 3
JP-A 2000-214751
Non-Patent Publication 1
"99-3D Image Conference '99", a CD-ROM version of lecturing monographs (at the Shinjuku schoolhouse, Kogakuin University), an article entitled "Image-type binary CGH by means of EB printing (3)—Enhancement of 3D effect with hidden surface removal and shading—"

SUMMARY OF THE INVENTION

In view of such problems with the prior-art as described above, the present invention has the provision of a process by which a multi-image type hologram with one 3D image changing over to another depending on a viewing direction can be fabricated in simple construction and a multi-image type hologram fabricated by that process.

To accomplish the object as described above, the present invention provides a process for fabricating a multi-image type hologram wherein one image changes over to another depending on a viewing direction, characterized in that a hologram recording material is divided into a plurality of sub-areas so that objects displayed on different images are holographically recorded in the respective sub-areas, using reference light having an identical angle of incidence, thereby making a first-stage hologram, and images of said objects recorded in the sub-areas are simultaneously reconstructed from the recorded first-stage hologram, so that the material for the recording the second-stage hologram is located near the reconstructed object images to make a reflection or transmission type volume hologram.

In this case, at least one of the objects holographically recorded in the respective sub-areas of the hologram recording material may be an image reconstructed from a computer-generated hologram.

The present invention also provides a method for fabricating a full-color multi-image type hologram wherein one image changes over to another depending a viewing direction, characterized in that a plurality of materials for recording hologram in different colors are each divided into a plurality of sub-areas in such a way as to correspond to one another so that objects displayed on different images are holographically recorded in the respective sub-areas at different color wavelengths for each recording material for hologram using reference light having an identical angle of incidence, thereby making a plurality of first-stage holograms, and images of the objects recorded in the respective sub-areas and having corresponding color components are simultaneously reconstructed from each of the recorded first-stage holograms, so that a material for recording the second-stage hologram is located near the reconstructed object images to make a reflection or transmission type volume hologram.

In this case, at least one of the objects holographically recorded in the respective sub-areas of each of the plurality of materials for recording hologram in different colors may be an image reconstructed from a computer-generated hologram capable of reconstructing a full-color image.

Also, the object images recorded in the respective sub-areas and having corresponding color components may be simultaneously reconstructed in order from the plurality of first-stage holograms, and the materials for recording the second-stage hologram may be located in order near the thus reconstructed object images to make a reflection or transmission type volume hologram.

Further, while the materials for recording the second-stage hologram in different colors are stacked in order, the object images having different color components may be reconstructed in order from the plurality of first-stage holograms to record them in order in the stacked materials for recording the second-stage hologram.

Preferably in the embodiments of the invention as recited above, the direction of incidence of the reference light upon recording the second-stage hologram is determined such that when the reference light is projected onto the surface of the first-stage hologram, the direction of incidence is substantially parallel with the direction of division of the first-stage hologram into the plurality of sub-areas.

It is also preferable that a silver halide photosensitive material is used as the material for recording the first-stage hologram, and a photopolymer is used as the material for recording the second-stage hologram.

Further, it is preferable that substantially parallel light is used as the reference light used for recording the first- and second-stage holograms.

Further, the present invention provides a method for fabricating a multi-image type hologram wherein one image changes over to another depending on a viewing direction, characterized in that objects to be displayed on different images are holographically recorded in a plurality of elemental hologram recording materials using reference light having an identical angle of incidence so that said plurality of elemental holograms are imposed side by side into a first-stage hologram, and images of the objects recorded in the respective elemental holograms are simultaneously reconstructed from said first-stage hologram, and recorded in the material for recording the second-stage hologram which is located near the thus reconstructed object images to make a reflection or transmission type volume hologram.

In this case, at least one of the images of objects holographically recorded in the respective elemental holograms of said hologram recording material may be an image reconstructed from a computer-generated hologram.

Furthermore, the present invention provides a method for fabricating a full-color multi-image hologram wherein one image changes over to another depending on a viewing direction, characterized in that a plurality of recording materials for recording elemental holograms are provided in different colors; objects to be displayed on different images are holographically recorded in the plurality of recording materials for recording elemental holograms for each of color wavelengths using reference light having an identical angle of incidence, so that said plurality of elemental holograms are imposed side by side into a first-stage hologram for each color; and images of the objects recorded in the respective elemental holograms and having corresponding color components are simultaneously reconstructed from said first-stage hologram, and recorded in the material for recording the second-stage hologram which is located near the thus reconstructed object images to make a reflection or transmission type volume hologram.

In this case, at least one of the images of objects holographically recorded in the respective elemental holograms of each of the plurality of hologram recording materials for different colors may be an image reconstructed from a computer-generated hologram capable of reconstructing a full-color image.

Also, the object images recorded in the respective elemental holograms and having corresponding color components may be simultaneously reconstructed in order from the plurality of first-stage holograms, and the materials for recording the second-stage hologram may be located in order near the reconstructed object images to make a reflection or transmission type volume hologram.

Preferably in the aforesaid embodiments, while the materials for recording the second-stage hologram in different colors are stacked in order, the object images having different color components are reconstructed in order from the plurality of first-stage holograms to record said object images in order in the stacked materials for recording the second-stage hologram.

Preferably in the aforesaid embodiments, the direction of incidence of the reference light for recording the second-stage hologram is determined such that when the reference light is projected onto the surface of the first-stage hologram, the direction of incidence is substantially parallel with the direction of imposition of the plurality of elemental holograms of the first-stage hologram.

Preferably in the side-by-side arrangement of the plurality of elemental holograms in the first-stage hologram, the elemental holograms are imposed side by side in such a way as to overlap one another.

It is preferable that a silver halide photosensitive material is used as the material for recording the first-stage hologram, and a photopolymer is used as the material for recording the second-stage hologram.

It is also preferable that substantially parallel light is used as the reference light for recording the first- and second-stage holograms.

Preferably the aforesaid fabrication method of multi-image type hologram of the invention, when the images of the objects recorded in the respective sub-areas are simultaneously reconstructed from the first-stage hologram for recording the object images as a reflection or transmission type volume hologram, the first-stage hologram is supported in such a way as to be adjustable in position in a direction toward the recording material for the second-stage hologram and in angle with respect to the reconstructing light.

It is also preferable that the recording material for the second-stage hologram is supported in such a way as to be forwarded step by step in two orthogonal directions in its plane with respect to the first-stage hologram, and multi-image type holograms are multi-recorded in each step-by-step forwarding area of the second-stage hologram recording material.

Furthermore, the present invention provides a multi-image type hologram, characterized by comprising a volume hologram, wherein the volume hologram is recorded such that when irradiated with predetermined reconstructing light, there are a plurality of object images reconstructed near the surface of the hologram and there is a window reconstructed at a position spaced a predetermined distance from the surface of the hologram, and diffracted light for reconstructing each of the plurality of object images enters a different area of the window.

In this case, at least one of said object images may be an image reconstructed from a computer-generated hologram.

Further, the volume hologram may be recorded such that the diffracted light for reconstructing each of the plurality of object images enters areas in said window, which overlap each other.

Further, the volume hologram of the invention may be recorded as a full-color hologram.

With the present invention, a multi-image type hologram wherein one image changes over to another depending on a viewing direction could be fabricated in one single operation by the two-step process, and a multi-image type hologram with one 3D image changing over to another can be simply fabricated as well. Note here that the multi-image type hologram of the present invention may be used as a hologram having enhanced forgery preventive effects and aesthetic effects, and as an optical element as well.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 4 is illustrative of how the fabricated multi-image type hologram works.

DESCRIPTION OF THE PREFERRED EMBODIMENTS

The fabrication process of multi-image type hologram of the invention and the fabricated multi-image type hologram are now explained with reference to some specific embodiments.

Reference is first to the first fabrication process of multi-image type hologram of the invention wherein a volume hologram is fabricated by the two-step process. When the first-stage hologram (hereinafter called the H1 hologram) is fabricated, a hologram recording material is divided into sub-areas. The objects to be displayed on different images are recorded in the respective sub-areas using reference light having the same angle of incidence. Then, the images of the objects are simultaneously reconstructed from the H1 hologram with the object images recorded in it, and a hologram recording material for the second-stage hologram is located near the reconstructed object images, so that they are recorded as a reflection or transmission type volume hologram (hereinafter called the H2 hologram).

Figure 1A:
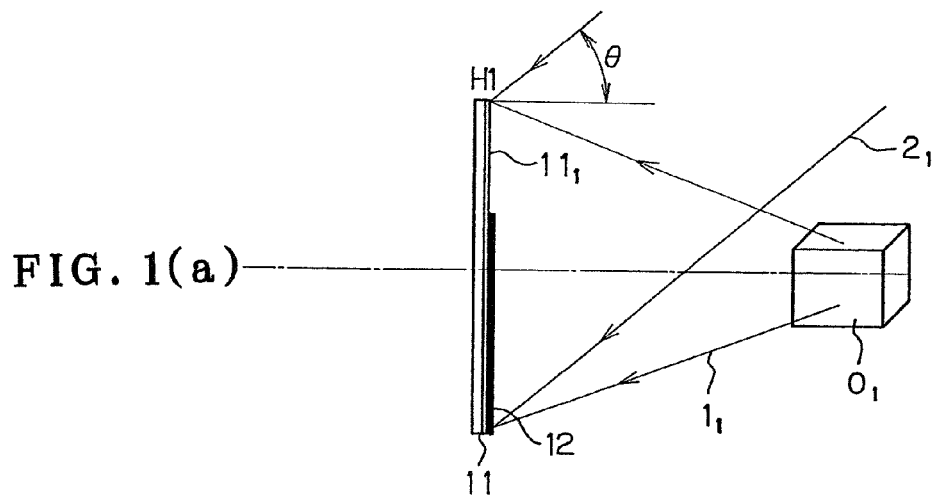
FIG. 1 is illustrative of one holographic recording layout for the first-stage H1 hologram in the process of fabricating a multi-image type hologram by the two-step process based on the first fabrication process of multi-image type hologram of the invention.

Reference is now made with reference to the drawings. FIG. 1 is illustrative of one holographic recording layout for the first-stage H1 hologram in the process of fabricating the multi-image type hologram by the two-step process based on the invention. In the embodiment here, a photosensitive material 11 that a sliver halide material and is highly photosensitive than a photopolymer is used as that for recording the first-stage H1 hologram. First, as depicted in FIG. 1(a), that photosensitive material 11 is located, facing the first object (drawn as a cube) $O_1$ that is recorded on the first image. And then, a mask 12 is applied to a surface of the photosensitive material 11 other than the first sub-area $11_1$ in which the hologram of the first object $O_1$ is to be recorded, to thereby block off light. As the first object $O_1$ is illuminated by laser light having a predetermined wavelength, it causes object light $1_1$ scattered by the first object $O_1$ to enter the first sub-area $11_1$ of the photosensitive material 11. In the meantime, reference light $2_1$ comprising parallel light, coherent with the object light $1_1$ and coming from the same light source, is allowed to enter simultaneously the surface of the photosensitive material 11 at an angle of incidence θ to holographically record the hologram for the first object $O_1$ in the first sub-area $11_1$ of the photosensitive material 11.

The reason why the silver halide (photosensitive) material in place of the photopolymer is used for the photosensitive material 11 is here explained. When the H1 hologram is holographically recorded in the layout of FIG. 1, the object $O_1$ must be spaced some away from the photosensitive material 11; however, as there is a distance between the object $O_1$ and the photosensitive material 11, the intensity of the object light $1_1$ becomes weak. With the photopolymer that is lower than in photosensitivity the silver halide material, therefore, exposure time would become too long to fabricate a bright hologram. Furthermore, the use of the photopolymer gives rise to a change in the angle of incidence of light on the recording material between the time of recording and the time of reconstruction because of shrinkage, whereas the silver halide material is less affected by shrinkage than the photopolymer. This is the reason the silver halide material is used for the photosensitive material 11. It is understood that photopolymers, etc. other than the silver halide material may just as easily be used as the photosensitive material 11.

Figure 1B:
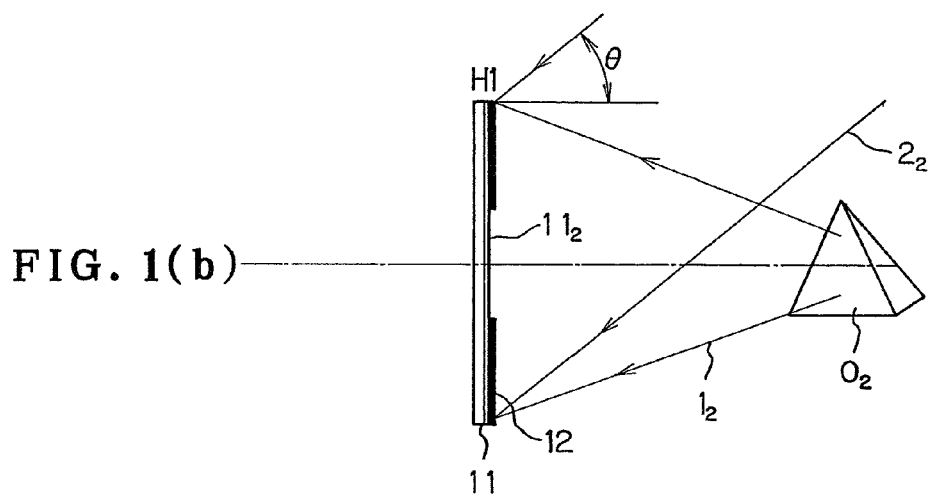

Then, as depicted in FIG. 1(b), while the photosensitive material 11 is held at that position, the second object $O_2$ (indicated here by a triangular pyramid) recorded on the second image is positioned in place of the first object $O_1$. And then, the mask 12 is shifted such that the second sub-area $11_2$ of that photosensitive material 11 adapted for recording the hologram of the second object $O_2$ is holographically recorded with the rest blocked off light. That second sub-area $11_2$ is located adjacent to the first sub-area $11_1$. As, in that layout, the second object $O_2$ is illuminated by laser light having the same wavelength as in the holographic recording of the hologram of the first object $O_1$, it causes object light $1_2$ scattered by the second object $O_2$ to enter the second sub-area $11_2$ of the photosensitive material 11. In the meantime, reference light $2_2$ comprising parallel light, coherent with the object light $1_2$ and coming from the same light source, is allowed to enter simultaneously the surface of the photosensitive material 11 at the same angle of incidence $\theta$, so that the hologram of the second object $O_2$ is holographically recorded in the second sub-area $11_2$ of the photosensitive material 11.

Figure 1C:
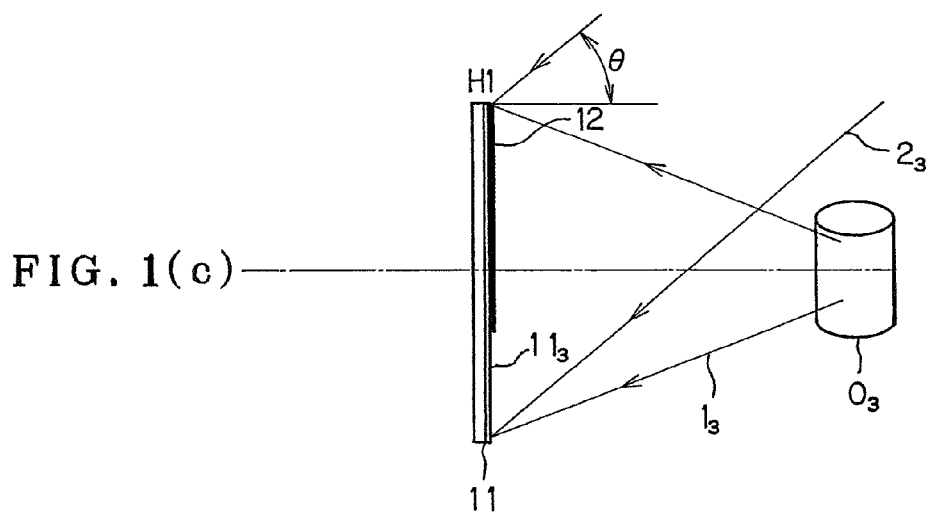

Likewise, as depicted in FIG. 1(c), while the photosensitive material 11 is held at that position, the third object $O_3$ (indicated here by a circular cylinder) to be displayed on the third image is positioned in place of the second object $O_2$. And then, the mask 12 is shifted such that the third sub-area $11_3$ of that photosensitive material 11 adapted for recording the hologram of the third object $O_3$ is holographically recorded with the rest blocked off light. That third sub-area $11_3$ is located adjacent to the second sub-area $11_2$. As, in that layout, the third object $O_3$ is illuminated by laser light having the same wavelength as in the holographic recording of the holograms of the first $O_1$ and the second object $O_2$, it causes object light $1_3$ scattered by the third object $O_3$ to enter the third sub-area $11_3$ of the photosensitive material 11. In the meantime, reference light $2_3$, comprising parallel light coherent with the object light $1_3$ and coming from the same light source, is allowed to enter simultaneously the surface of the photosensitive material 11 at the same angle of incidence $\theta$, so that the hologram of the third object $O_3$ is holographically recorded in the third sub-area $11_3$ of the photosensitive material 11.

Figure 2A:
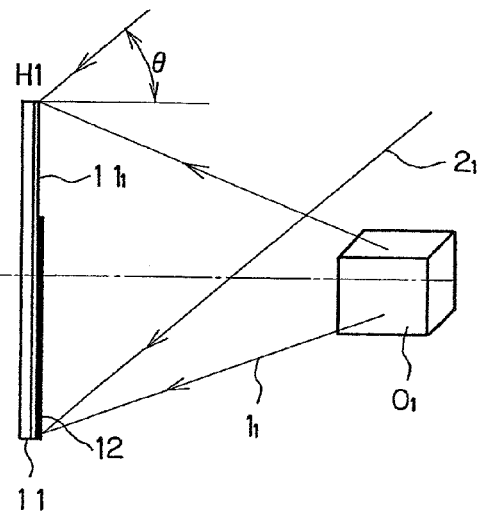
FIG. 2 is illustrative of one modified holographic recording layout wherein an image reconstructed from a computer-generated hologram is recorded as a hologram in the first-stage H1 hologram.
Figure 2B:
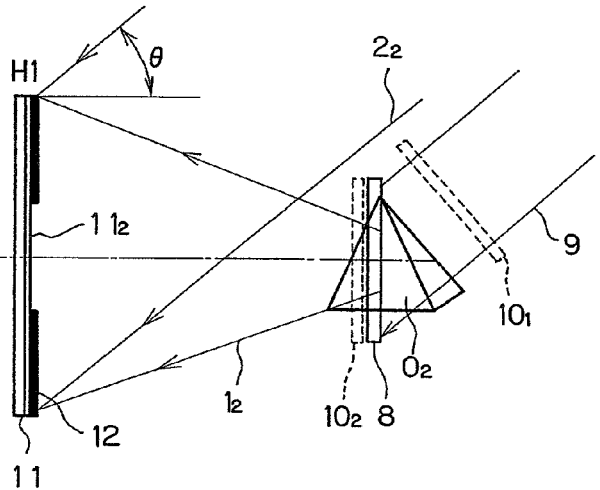
Figure 2C:
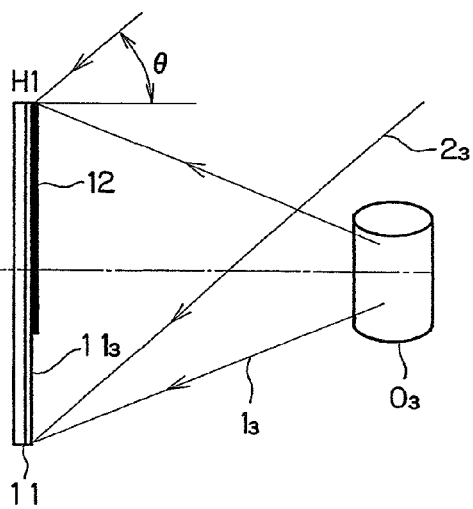

It is here noted that any or all of the first $O_1$, the second $O_2$ and the third object $O_3$ to be recorded as holograms on the sub-areas of the photosensitive material 11 may be images reconstructed from a computer-generated hologram (CGH), as exemplified in FIG. 2. In this embodiment, of the first $O_1$, the second $O_2$ and the third object $O_3$, the second object $O_2$ is an image reconstructed from CGH 8. FIG. 2(a) is similar to FIG. 1(a). As in the case of FIG. 1(a), the hologram of the first object $O_1$ is holographically recorded in the first sub-area $11_1$ of the photosensitive material 11. Then, as depicted in FIG. 2(b), a reconstructed image obtained at the time when CGH 8 is illuminated by reconstructing light 9 having the same wavelength as in the holographic recording of the hologram of the first object $O_1$ is used as the second object $O_2$ to be recorded on the second image (indicated here by a triangular pyramid). In this case, object light $1_2$ diffracted through CGH 8 is allowed to enter the second sub-area $11_2$ of the photosensitive material 11. In the meantime, reference light $2_2$, comprising parallel light coherent with the object light $1_2$ and coming from the same light source, is allowed to enter simultaneously the surface of the photosensitive material 11 at the same angle of incidence $\theta$, so that the hologram of the second object $O_2$ as an image reconstructed from CGH 8 is holographically recorded in the second sub-area $11_2$ of the photosensitive material 11. Then, as depicted in FIG. 2(c), the hologram of the third object $O_3$ is holographically recorded in the third sub-area $11_3$ of the photosensitive material 11, as in the case of FIG. 1(c).

The CGH 8 here may be any of known CGHs such as a CGH fabricated by forming interference fringes on a predetermined recording surface by such computer-aided operation as proposed in Patent Publication 3, and a CGH having an amplitude and phase recorded by the method of A. W. Lohmann et al., and the Lee's method, as described in Non-Patent Publication 1. Some of such CGHs have a three-dimensional object recorded with parallaxes in both the horizontal and the vertical direction: what is needed to this end is simply the irradiation of CGH 8 with reconstructing light 9, and the incidence as the object light $1_2$ of light diffracted through CGH 8 on the second sub-area $11_2$ of the photosensitive material 11. Some CGHs, on the other hand, have a three-dimensional object recorded with parallax in the horizontal direction alone so as to reduce the amount of computation upon fabrication. For a CGH having parallax in the horizontal direction alone, holographic recording is carried out using object light that spreads in the one-dimensional (horizontal) direction alone. Upon reconstruction, light is again diffracted back, spreading in that one-dimensional (horizontal) direction. For this reason, the CGH having parallax in the horizontal direction alone will have a field of vision becoming narrow in a direction (vertical direction) orthogonal to that one-dimensional direction. To make up for such narrowness of the field of vision, it is desired that there is a uniaxial diffuser $10_1$ provided in an optical path taken by reconstructing light 9 as a uniaxial diffuser means adapted to diffuse light in the vertical one-dimensional direction alone, for instance, a lenticular sheet or hologram, so that CGH 8 is irradiated by the reconstructing light 9 defined by diffuse light that diffuses in the vertical direction, or it is desired that there is a uniaxial diffuser $10_2$ provided on the diffraction side of CGH 8 as a uniaxial diffuser means adapted to diffuse light in the vertical one-dimensional direction alone, for instance, a lenticular sheet or hologram. In either case, the diffracted light as the object light $1_2$ diffuses in the vertical direction. Note here that the uniaxial diffuser $10_1$, $10_2$ is indicated by a broken line in FIG. 2(b) to indicate that when the CGH 8 is a CGH having parallax in the one-dimensional direction alone, either one of them may be used as desired.

While the surface of the photosensitive material 11 is divided into two or more sub-areas $11_1$, $11_2$ and $11_3$, the holograms of different objects $O_1$, $O_2$ and $O_3$ are recorded by exposure with reference light $2_1$, $2_2$ and $2_3$ incident on the respective sub-areas at the same angle of incidence $\theta$ and the same wavelength. The division of that surface into a plurality of sub-areas $11_1$, $11_2$ and $11_3$ may be carried out as desired.

The photosensitive material 11 with different holograms holographically recorded in different sub-areas is developed and bleached to make the H1 hologram 11. The photosensitive material and the H1 hologram here are indicated by the same reference numeral 11.

Figure 3:
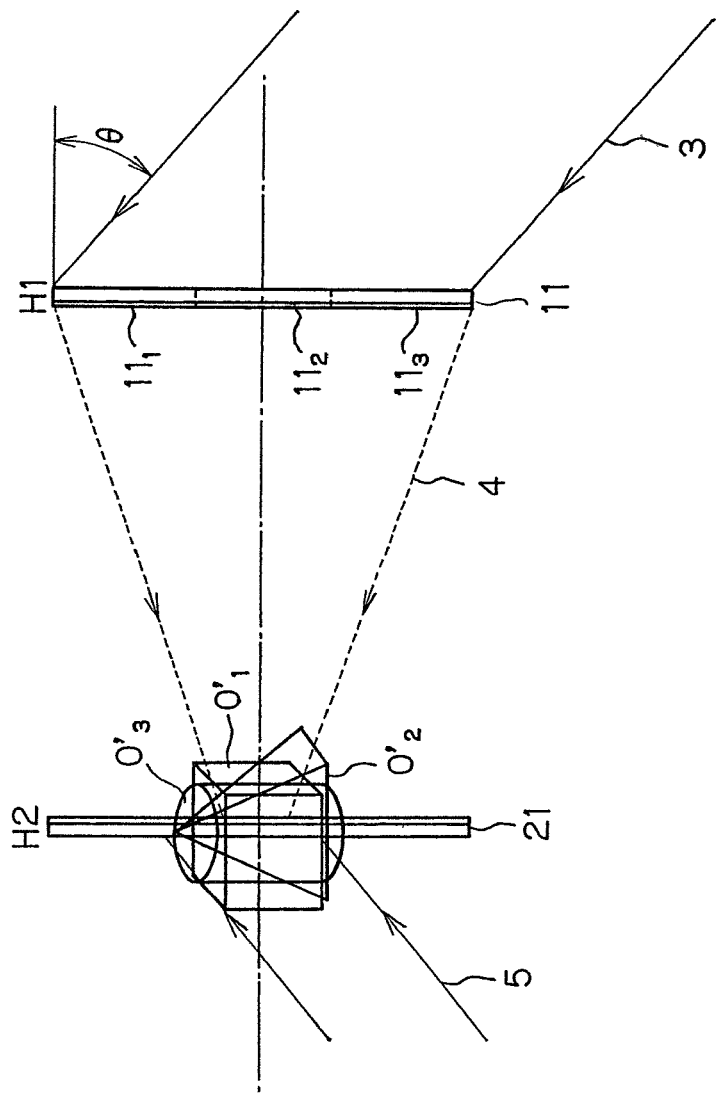
FIG. 3 is illustrative of one holographic recording layout for the second-stage H2 hologram.

Then, as depicted in FIG. 3, reconstructing light 3 that travels in a direction opposite to that taken by the holographic recording reference light $2_1$, $2_2$ and $2_3$ is allowed to enter the H1 hologram 11 from its side that faces away from the holographic recording reference light $2_1$, $2_2$ and $2_3$, whereupon the images $O_1'$, $O_2'$ and $O_3'$ of the first, second and third objects $O_1$, $O_2$ and $O_3$ are reconstructed and formed by diffracted light 4 at the same positions of the H1 hologram 11 surface as the relative positions of the objects $O_1$, $O_2$ and $O_3$ at the time of holographic recording. If the positions of the first, second and third objects $O_1$, $O_2$ and $O_3$ overlap spatially, the images $O_1'$, $O_2'$ and $O_3'$ are formed in a spatially overlapping way, too. A photosensitive material 21 for recording the second-stage H2 hologram is located near the positions at which the images $O_1'$, $O_2'$ and $O_3'$ of these first, second and third objects $O_1$, $O_2$ and $O_3$ are formed, and reference light 5 comprising parallel light, coherent with the reconstructing light 3 and coming from the same light source, is allowed to enter simultaneously it from its side that faces, or faces away from, diffracted light 4 and at any given angle of incidence, so that the second-stage H2 hologram is holographically recorded in the photosensitive material 21. In the embodiment here, the photopolymer is used as the photosensitive material 21 for recording the second-stage hologram, and the photosensitive material 21 after holographic recording is post treated or specifically heated and irradiated with ultraviolet radiation to make an H2 hologram. The photosensitive material and H2 hologram here are indicated by the same reference numeral 21.

The direction of incidence of the reference light 5 here is preferably such that when it is projected onto the surface of the H1 hologram, that direction is substantially parallel with the direction of division of the H1 hologram into a plurality of sub-areas $11_1$, $11_2$ and $11_3$.

Incidentally, the reason the photopolymer, not the silver halide material (silver halide photosensitive material) used for the photosensitive material 11, is used for the photosensitive material 21 is that the use of the silver halide material for the photosensitive material 21 causes a noise component from the H1 hologram 11 to be also recorded in the photosensitive material 21 due to its very high photosensitivity, but the use of the photopolymer makes it almost impossible to carry the noise component from the H1 hologram 11 over to the photosensitive material 21 and the photopolymer itself is of high transparency, and much more reduced in noise as well.

The recorded H2 hologram 21 is a volume hologram: when the reference light 5 is incident on the photosensitive material from its side that faces away from the diffracted light 4, it is recorded as a reflection type hologram, and when the reference light 5 is incident on the photosensitive material from its side that faces the diffracted light 4, it is recorded as a transmission type hologram.

As depicted in FIG. 4, reconstructing light 6 that travels in a direction opposite to that taken by the holographic recording reference light 5 is incident on the recorded H2 hologram 21 from its side that faces away from the holographic recording reference light 5, whereupon the images $O_1''$, $O_2''$ and $O_3''$ of the images $O_1'$, $O_2'$ and $O_3'$ of the first, second and third objects $O_1'$, $O_2$ and $O_3$ are reconstructed by diffracted light 7 in a spatially overlapping way, and a window 25 having the same size as that of the recording surface of the H1 hologram 11 is reconstructed at the original position of the H1 hologram 11. And of the images $O_1''$, $O_2''$ and $O_3''$ of the first, second and third objects $O_1$, $O_2$ and $O_3$, the image $O_1''$ of the first object $O_1$ is reconstructed by a diffracted light component $7_1$ traveling toward a range $25_1$ corresponding to the first sub-area $11_1$ in the window 25; the image $O_2''$ of the second object $O_2$ is reconstructed by a diffracted light component $7_2$ traveling toward a range $25_2$ corresponding to the second sub-area $11_2$ in the window 25; and the image $O_3''$ of the third object $O_3$ is reconstructed by a diffracted light component $7_3$ traveling toward a range $25_3$ corresponding to the third sub-area $11_3$ in the window 25. Accordingly, when there is a viewer's eye E lying in an angle range $\alpha_1$ in FIG. 4 (the range $25_1$ in the window 25 defines an angle range subtended by a position on which the reference light 5 for the H2 hologram 21 is incident), the image $O_1''$ of the first object $O_1$ is seen near the H2 hologram 21; when the viewer's eye E lies in an angle range $\alpha_2$ (the range $25_2$ in the window 25 defines an angle range subtended by a position on which the reference light 5 for the H2 hologram 21 is incident), the image $O_2''$ of the second object $O_2$ is seen near the H2 hologram 21; and when the viewer's eye E lies in an angle range $\alpha_3$ (the range $25_3$ in the window 25 defines an angle range subtended by a position on which the reference light 5 for the H2 hologram 21 is incident), the image $O_3''$ of the third object $O_3$ is seen near the H2 hologram 21. In other words, depending on the viewing direction, the image under observation changes to any of the images $O_1''$, $O_2''$ and $O_3''$. In addition, the object images $O_1''$, $O_2''$ and $O_3''$ are each a three-dimensional (3D) one, and depending on the viewing direction, the three-dimensional image changes in order. Referring again to FIG. 4, the cube, triangular pyramid and circular cylinder drawn in the angle ranges $\alpha_1$, $\alpha_2$ and $\alpha_3$ are given to tell differences between the three-dimensional images seen in the corresponding angle ranges; they are not given to show positions at which they are to be reconstructed. They are indeed reconstructed at the positions of the images $O_1''$, $O_2''$ and $O_3''$ near the H2 hologram 21.

While FIGS. 1, 2, 3 and 4 show that the sub-areas $11_1$, $11_2$ and $11_3$ of the H1 hologram 11 are lined up side by side while they contact one another, it is to be noted that double exposure may be implemented such that the adjoining sub-areas overlap each other, or they may be juxtaposed with a gap between them. For instance, when the sub-areas $11_1$ and $11_2$ of the H1 hologram 11 overlap each other and the sub-areas $11_2$ and $11_3$ lie side by side with a gap between them, in the H2 hologram 21 recorded from such an H1 hologram 11, the range $25_1$ corresponding to the first sub-area $11_1$ and the range $25_2$ corresponding to the second sub-area $11_2$ in the window 25 overlap each other, and the range $25_2$ corresponding to the second sub-area $11_2$ is spaced away from the range $25_3$ corresponding to the third sub-area $11_3$ in the window 25, as can be seen from FIG. 4. Correspondingly, the angle ranges $\alpha_1$ and $\alpha_2$ overlap each other, and there is a space between the angle ranges $\alpha_2$ and $\alpha_3$. Therefore, when the viewer's eye E is positioned in that overlapping range of FIG. 3, both the image $O_1''$ of the first object $O_1$ (cube) and the image $O_2''$ of the second object $O_2$ (triangular pyramid) are seen near the H2 hologram 21, and when it is positioned between $\alpha_2$ and $\alpha_3$, there is nothing seen. In other words, as the viewer moves his eye E from top to bottom, he sees first the cube, then both the cube and the triangular pyramid, then only the triangular pyramid because the cube disappears, then nothing, and then the circular cylinder.

Figure 5B:
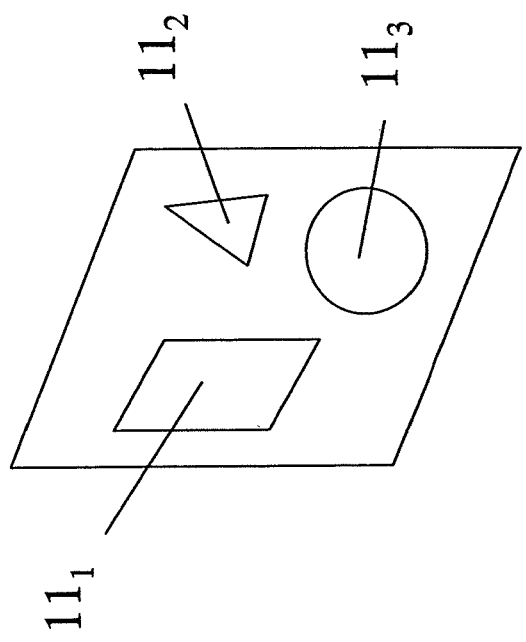
FIG. 5 is illustrative of another exemplified layout for the sub-areas of the H1 hologram.
Figure 5A:
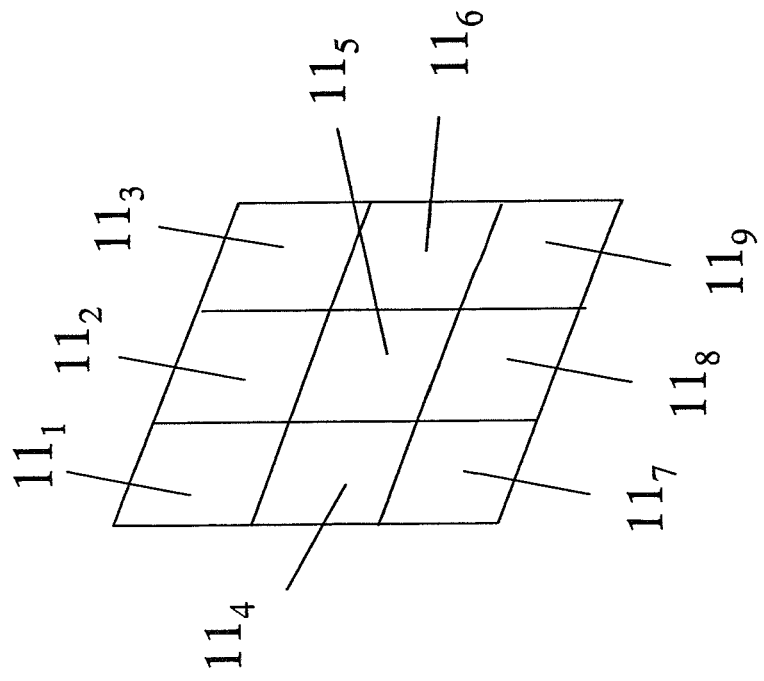

Although the plurality of sub-areas $11_1$, $11_2$ and $11_3$ here are of the same rectangular shape and size, it is to be noted that they may be arranged in any arbitrary size and shape, as exemplified in FIG. 5. FIG. 5(a) is illustrative of a two-dimensional matrix made up of sub-areas $11_1$ to $11_9$, and FIG. 5(b) is illustrative of an arrangement wherein sub-areas $11_1$, $11_2$ and $11_3$, each of a different shape, are two-dimensionally spaced away from one another.

Referring here to the layouts of FIGS. 1 and 2, when divergent light is used as the reference light $2_1$, $2_2$ and $2_3$ for the holographic recording of the H1 hologram 11, the recording system costs much, because it is required to use convergent light as the reconstructing light 3 for the fabrication of the H2 hologram 21 of FIG. 3; that is, it is required to use a convex lens whose aperture is larger than the photosensitive material 11, thereby giving out convergent light enough to cover the whole extent of the photosensitive material 11. Therefore, it is preferable to use parallel light as the reference light $2_1$-$2_3$ and the reconstructing light 3, making it possible to use a lens or parabolic mirror equivalent in size to the photosensitive material 11.

While the embodiments of the invention so far have been described with reference to three images that change depending on the viewing direction, it is to be noted that the invention may be applied to two or more images: how many sub-areas $11_1$, $11_2$, $11_3$ are set in the H1 hologram 11 may be determined depending on how many images are used, and the holograms of objects $O_1$, $O_2$ and $O_3$ corresponding to the respective sub-areas may be recorded.

It is here noted that the multi-image type hologram fabricated by the two-step process described so far is a monochromic hologram. One example of fabricating a full-color multi-image type hologram by this process is now explained. In this example, three holograms, R (red), G (green) and B (blue), are each fabricated as the H1 hologram.

Figure 6A:
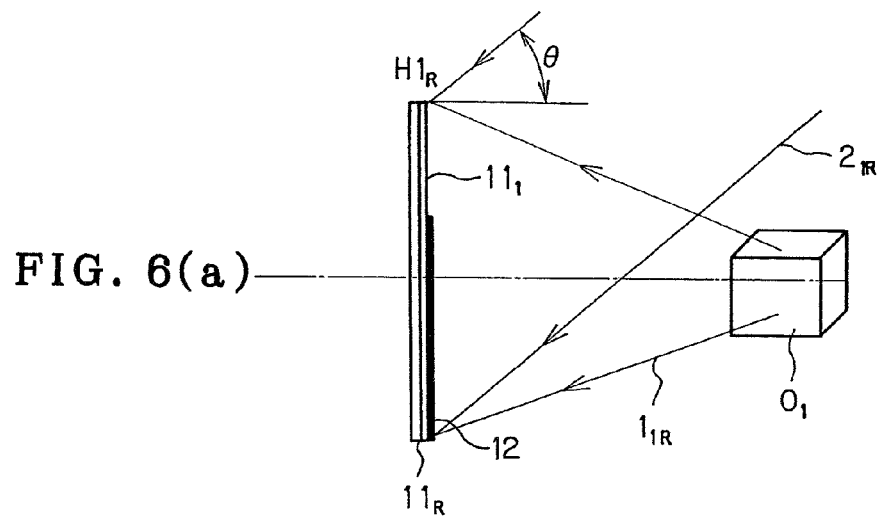
FIG. 6 is illustrative of one layer for holographically recording the hologram of the first object in the first sub-area of each of three first-stage H1 holograms at the time when a full-color multi-image type hologram with one image changing over to another is fabricated on the basis of the first fabrication process of multi-image type hologram of the invention.

FIG. 6 is illustrative of one exemplary layout for the holographic recording of the hologram of the first object $O_1$ in the first sub-area $11_1$ of each of three first-stage H1 holograms. First, as depicted in FIG. 6(a), the photosensitive material $11_R$ for the first-stage H1 hologram for R having sensitivity to the wavelength $\lambda_R$ for R is located at a given position that faces the first object (cube) $O_1$ to be recorded in the first image. A mask 12 is applied to a surface portion of the H1 hologram photosensitive material $11_R$ other than the first sub-area $11_1$ to record the hologram of the first object $O_1$. As the first object $O_1$ is illuminated by laser light having an R-specific wavelength $\lambda_R$ (for instance, 647.1 nm), it causes object light $1_{1R}$ scattered by the first object $O_1$ to enter the first sub-area $11_1$ of the photosensitive material $11_R$. In the meantime, reference light $2_{1R}$ comprising parallel light of the same wavelength, coherent with the object light $1_{1R}$ and coming from the same light source, is allowed to enter simultaneously the surface of the photosensitive material $11_R$ at a predetermined angle of incidence $\theta$, so that the R hologram of the first object $O_1$ is holographically recorded in the first sub-area $11_1$ of the photosensitive material $11_R$.

Figure 6B:
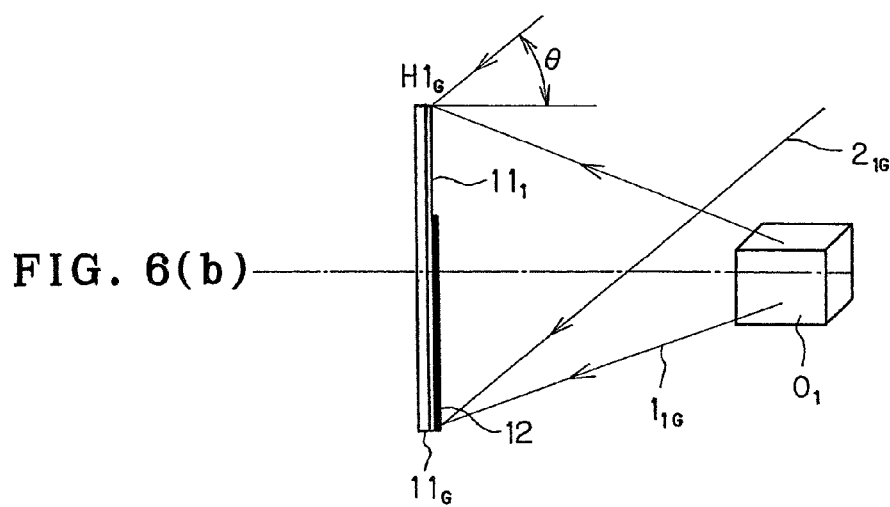

Then, as depicted in FIG. 6(b), the photosensitive material $11_G$ for the first-stage H1 hologram for G having sensitivity to the wavelength $\lambda_G$ for G in place of the photosensitive material $11_R$ for the first-stage H1 hologram for R, is located at the same position. Again, the mask 12 is applied to a surface portion of the photosensitive material other than the first sub-area $11_1$ to record the hologram of the first object $O_1$. As the first object $O_1$ is illuminated by laser light having a G-specific wavelength $\lambda_G$ this time (for instance, 532 nm), it causes object light $1_{1G}$ scattered by the first object $O_1$ to enter the first sub-area $11_1$ of the photosensitive material $11_G$. In the meantime, reference light $2_{1G}$ comprising parallel light of the same wavelength, coherent with the object light $1_{1G}$ and coming from the same light source, is allowed to enter simultaneously the surface of the photosensitive material $11_G$ at a similar angle of incidence $\theta$ as in the case of R, so that the G hologram of the first object $O_1$ is holographically recorded in the first sub-area $11_1$ of the photosensitive material $11_G$.

Figure 6C:
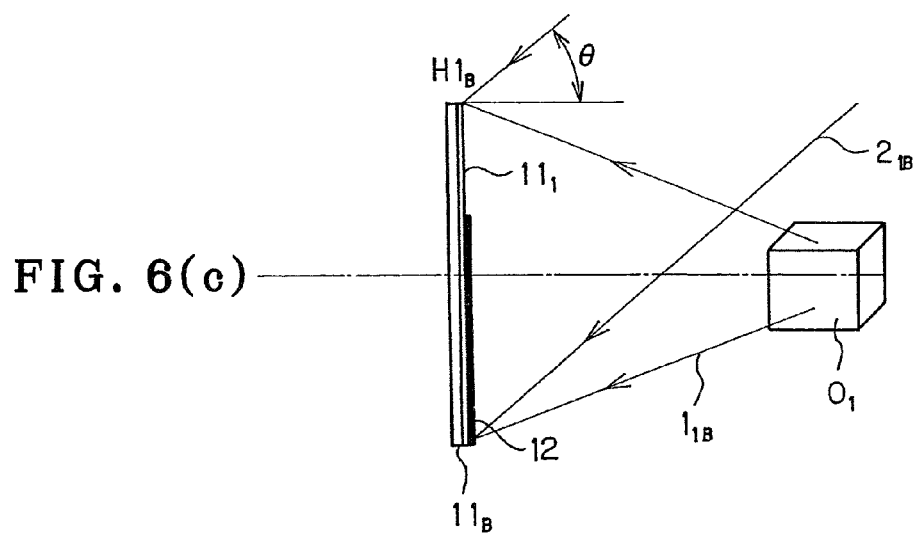

Then, as depicted in FIG. 6(c), the photosensitive material $11_B$ for the first-stage H1 hologram for B having sensitivity to the wavelength $\lambda_B$ for B in place of the photosensitive material $11_G$ for the first-stage H1 hologram for G, is likewise located at the same position. Again, the mask 12 is applied to a surface portion of the photosensitive material other than the first sub-area $11_1$ to record the hologram of the first object $O_1$. As the first object $O_1$ is illuminated by laser light having a B-specific wavelength $\lambda_B$ this time (for instance, 476.5 nm), it causes object light $1_{1B}$ scattered by the first object $O_1$ to enter the first sub-area $11_1$ of the photosensitive material $11_B$. In the meantime, reference light $2_{1B}$ comprising parallel light of the same-wavelength, coherent with the object light $1_{1B}$ and coming from the same light source, is allowed to enter simultaneously the surface of the photosensitive material $11_B$ at a similar angle of incidence $\theta$ as in the case of R, and G, so that the B hologram of the first object $O_1$ is holographically recorded in the first sub-area $11_1$ of the photosensitive material $11_B$.

In this way, the holographic recording of the first object $O_1$ in the respective first sub-areas of the first-stage photosensitive materials $11_R$, $11_G$ and $11_B$ of those three holograms is finished.

Figure 7A:
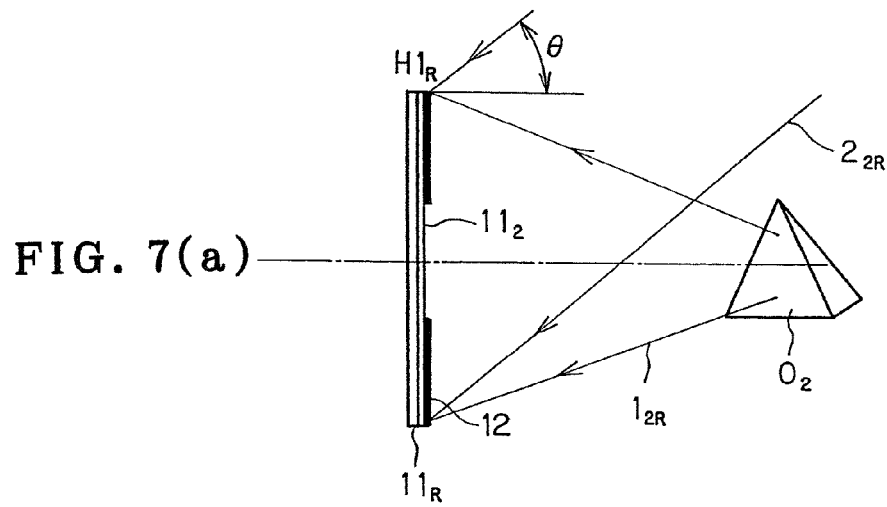
FIG. 7 is illustrative of one layout for holographically recording the hologram of the second object in the second sub-area of each of three first-stage H1 holograms.

Reference is now made to FIG. 7 illustrative of one exemplary layout for the holographic recording of R, G and B holograms of the second object $O_2$ in the second sub-areas $11_2$ of the three first-stage photosensitive materials $11_R$, $11_G$ and $11_B$ that have already been subjected to holographic recording in the first sub-areas $11_1$. First, as depicted in FIG. 7(a), the photosensitive material $11_R$ for the first-stage H1 hologram for R is located at a given position that faces the second object (triangular pyramid) $O_2$ to be recorded in the second image, and a mask 12 is applied to a surface portion of the second sub-area $11_R$ to record the hologram of the second object $O_2$. As the second object $O_2$ is illuminated by laser light having the same wavelength $\lambda_R$ for R as in FIG. 6(a), it causes object light $1_{2R}$ scattered by the second object $O_2$ to enter the second sub-area $11_2$ of the photosensitive material $11_R$. In the meantime, reference light $2_{2R}$ comprising parallel light of the same wavelength, coherent with the object light $1_{2R}$ and coming from the same light source, is allowed to enter simultaneously the surface of the photosensitive material $11_R$ at the same angle of incidence $\theta$ as in FIGS. 6(a)-6(c), so that the R hologram of the second object $O_2$ is holographically recorded in the second sub-area $11_2$ of the photosensitive material $11_R$.

Figure 7B:
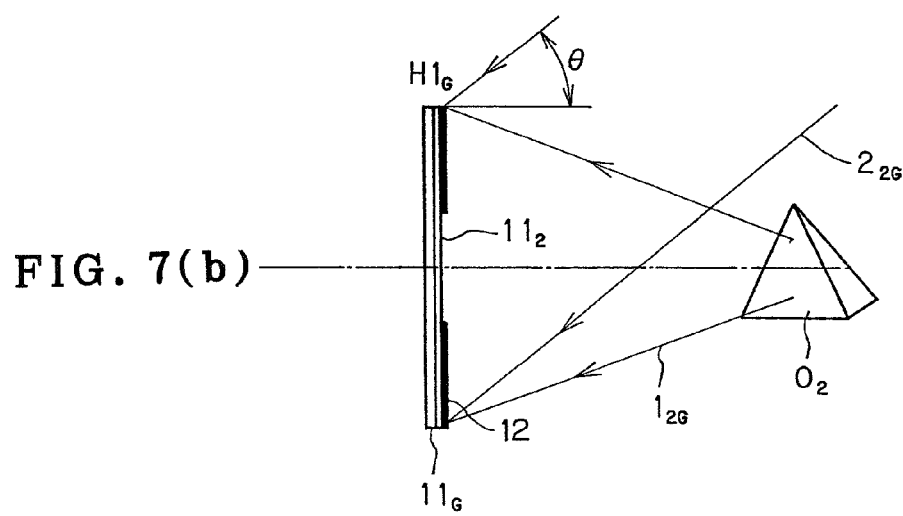

Then, as depicted in FIG. 7(b), the photosensitive material $11_G$ for the first-stage H1 hologram for G in place of the first-stage H1 hologram photosensitive material $11_R$ for R is located at the same position. Again, the mask 12 is applied to a surface portion of the photosensitive material other than the first sub-area $11_2$ to record the hologram of the first object $O_2$. As the second object $O_2$ is illuminated by laser light having the same G wavelength $\lambda_G$ this time as in the case of FIG. 6(b), it causes object light $1_{2G}$ scattered by the second object $O_2$ to enter the second sub-area $11_2$ of the photosensitive material $11_G$. In the meantime, reference light $2_{2G}$ comprising parallel light of the same wavelength, coherent with the object light $1_{2G}$ and coming from the same light source, is allowed to enter simultaneously the surface of the photosensitive material $11_G$ at the same angle of incidence $\theta$ as in the case of FIGS. 6(a)-6(c), so that the G hologram of the second object $O_2$ is holographically recorded in the second sub-area $11_2$ of the photosensitive material $11_G$.

Figure 7C:
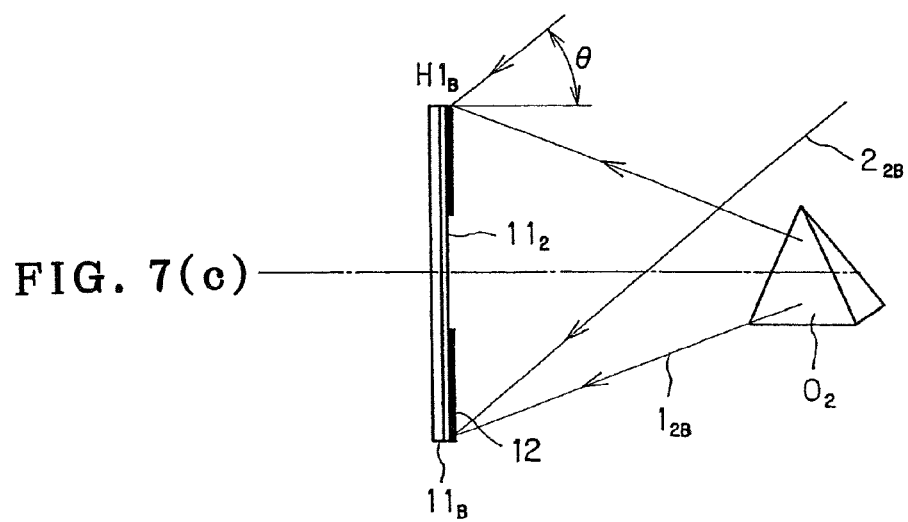

Then, as depicted in FIG. 7(c), the first-stage H1 hologram photosensitive material $11_B$ for B in place of the first-stage H1 hologram photosensitive material $11_G$ for G is likewise located at the same position. Again, the mask 12 is applied to a surface portion of the photosensitive material other than the second sub-area $11_2$ to record the hologram of the second object $O_2$. As the second object $O_2$ is illuminated by laser light having the same B-specific wavelength $\lambda_B$, it causes object light $1_{2B}$ scattered by the second object $O_2$ to enter the second sub-area $11_2$ of the photosensitive material $11_B$. In the meantime, reference light $2_{2B}$ comprising parallel light of the same wavelength, coherent with the object light $1_{2B}$ and coming from the same light source, is allowed to enter simultaneously the surface of the photosensitive material $11_B$ at the same angle of incidence θ as in the case of FIG. 6(a)-6(c), so that the B hologram of the second object $O_2$ is holographically recorded in the second sub-area $11_2$ of the photosensitive material $11_B$.

In this way, the holographic recording of the hologram of the second object $O_2$ in the respective second sub-areas $11_2$ of the three first-stage photosensitive materials $11_R$, $11_G$ and $11_B$ is finished.

Figure 8A:
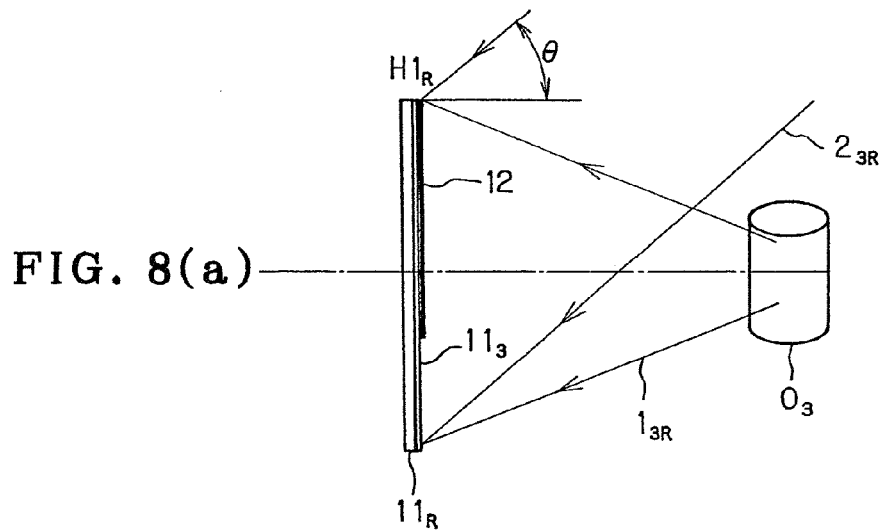
FIG. 8 is illustrative of one layout for holographically recording the hologram of the third object in the third sub-area of each of three first-stage H1 holograms.
Figure 8B:
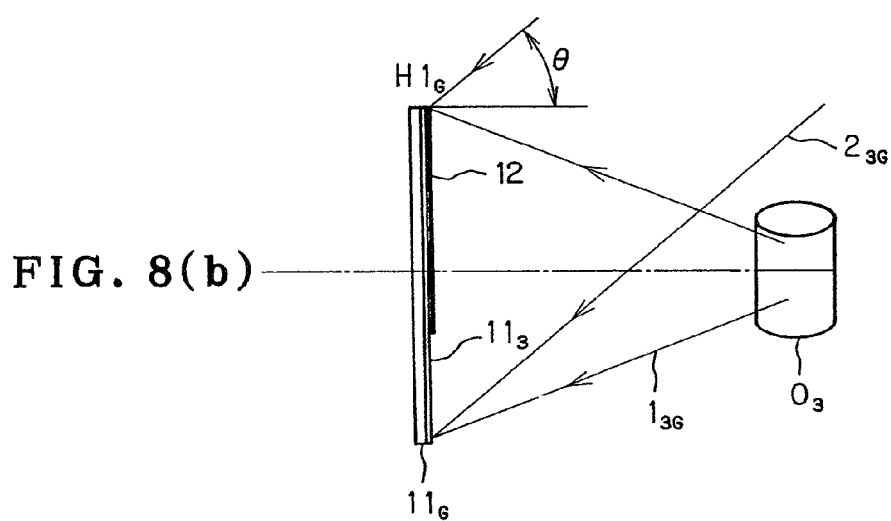
Figure 8C:
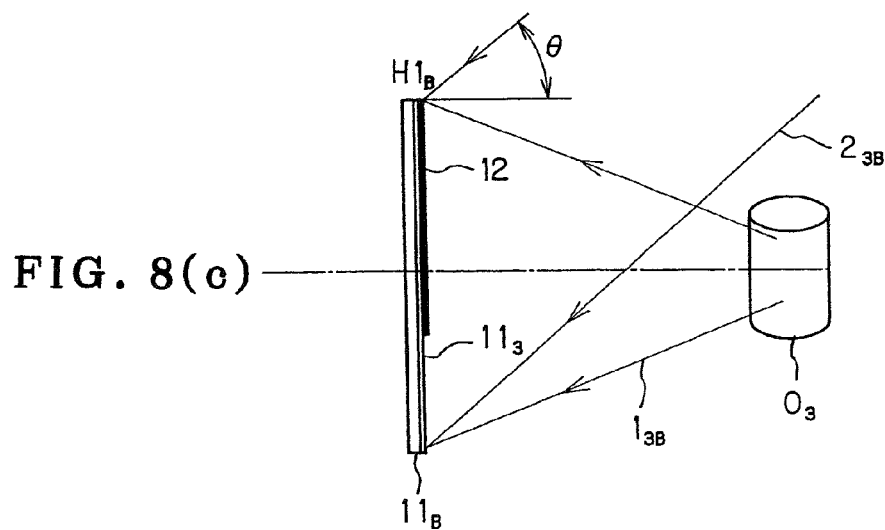

FIG. 8 is illustrative of one exemplary layout for the holographic recording of R, G and B holograms of the third object (circular cylinder) $O_3$ in the third sub-areas $11_3$ of the three first-stage photosensitive materials $11_R$, $11_G$ and $11_B$ that have already been subjected to holographic recording in the first and second sub-areas $11_1$ and $11_2$. The explanation of FIG. 8 is left out because of being similar to that of FIGS. 6 and 7. Note however that object light and reference light are indicated by $1_{3R}$, $1_{3G}$, $1_{3B}$, and $2_{3R}$, $2_{3G}$, $2_{3B}$, respectively.

Figure 9A:
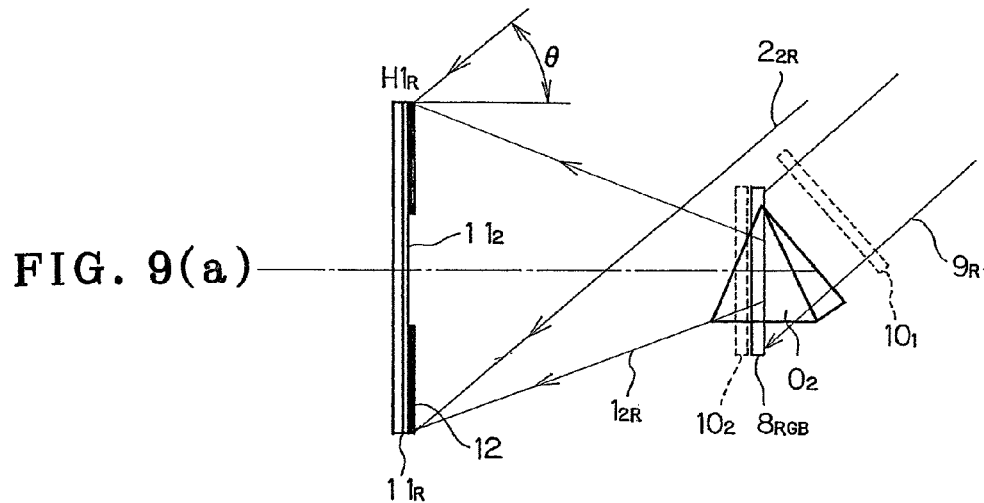
FIG. 9 is illustrative of one modified layout for holographically recording the hologram of an image reconstructed from a computer-generated hologram in the second sub-area of each of three first-stage H1 holograms.

In this example, too, any or all of the first, second and third objects $O_1$, $O_2$ and $O_3$ to be recorded in the sub-areas $11_1$, $11_2$ and $11_3$ of the photosensitive materials $11_R$, $11_G$ and $11_B$ for the first-stage H1 hologram may be R, G and B reconstructed images from a CGH. As an example, take R, G and B reconstructed images from CGH $8_{RGB}$ (see Patent Publication 1) that enables the image of the second object $O_2$ of the first, second and third objects $O_1$, $O_2$ and $O_3$ to be reconstructed in the form of a full-color image. In that case, such holographic recording as shown in FIG. 9 is implemented in place of that of FIG. 7. That is, FIG. 9 is illustrative of one exemplary layout for the holographic recording of the respective R, G and B holograms of the second object $O_2$ in the second sub-areas $11_2$ of the three first-stage photosensitive materials $11_R$, $11_G$ and $11_B$ that have already been subjected to holographic recording in the first sub-areas $11_1$, using as that second object $O_2$ a full-color reconstructed image from CGH $8_{RGB}$ that enables an image to be reconstructed in full color. First, as depicted in FIG. 9(a), the photosensitive material $11_R$ for the first-stage H1 hologram in R is located at a given position that faces the second object (triangular pyramid) $O_2$ that is a reconstructed image from CGH $8_{RGB}$, and a mask 12 is applied to a surface portion of the second sub-area $11_2$ to record the hologram of the second object $O_2$. As the CGH $8_{RGB}$ is illuminated by reconstructing light $9_R$ having the same wavelength $\lambda_R$ for R as in FIG. 6(a), it causes R object light $1_{2R}$ diffracted through CGH $8_{RGB}$ to enter the second sub-area $11_2$ of the photosensitive material $11_R$. In the meantime, reference light beams $2_{2R}$ comprising parallel light, coherent with the object light $1_{2R}$ and coming from the same light source, are allowed to enter simultaneously the surface of the photosensitive material $11_R$ at the same angle of incidence θ as in FIGS. 6(a)-6(c), so that the R hologram of the second object $O_2$ is holographically recorded as the reconstructed image from CGH $8_{RGB}$ in the second sub-area $11_2$ of the photosensitive material $11_R$.

Figure 9B:
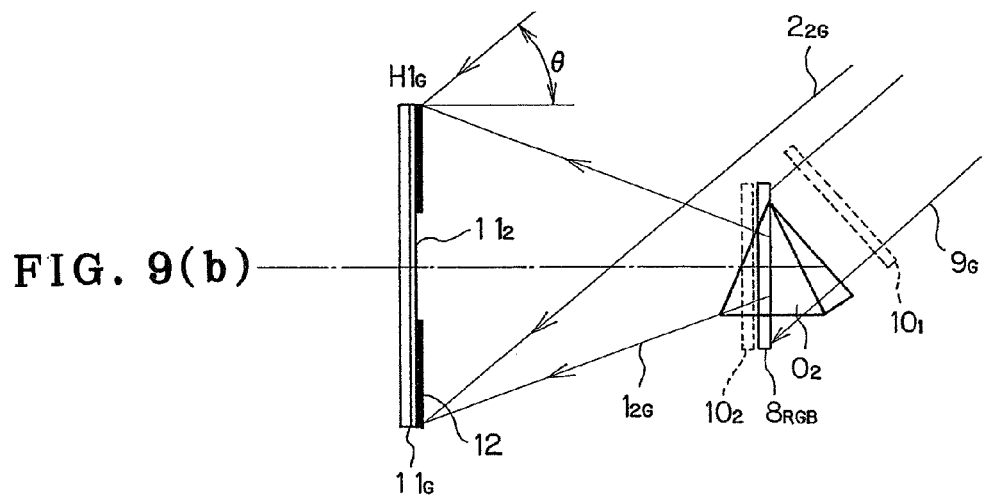

Then, as depicted in FIG. 9(b), the photosensitive material $11_G$ for the first-stage H1 hologram in G in place of the photosensitive material $11_R$ for the first-stage H1 hologram in R is located at the same position. Again, the mask 12 is applied to a surface portion of the photosensitive material other than the second sub-area $11_2$ to record the hologram of the first object $O_2$ comprising a full-color reconstructed image from CGH $8_{RGB}$. As CGH $8_{RGB}$ is illuminated by reconstructing light $9_G$ having the same wavelength $\lambda_G$ for as in the case of FIG. 6(b), it causes G object light $1_{2G}$ diffracted through CGH $8_{RGB}$ to enter the second sub-area $11_2$ of the photosensitive material $11_G$. In the meantime, reference light $2_{RG}$ comprising parallel light, coherent with the object light $1_{2G}$ and coming from the same light source, is allowed to enter simultaneously the surface of the photosensitive material $11_G$ at the same angle of incidence θ as in the case of FIGS. 6(a)-6(c), so that the G hologram of the second object $O_2$ is holographically recorded as the reconstructed image from CGH $8_{RGB}$ in the second sub-area $11_2$ of the photosensitive material $11_G$.

Figure 9C:
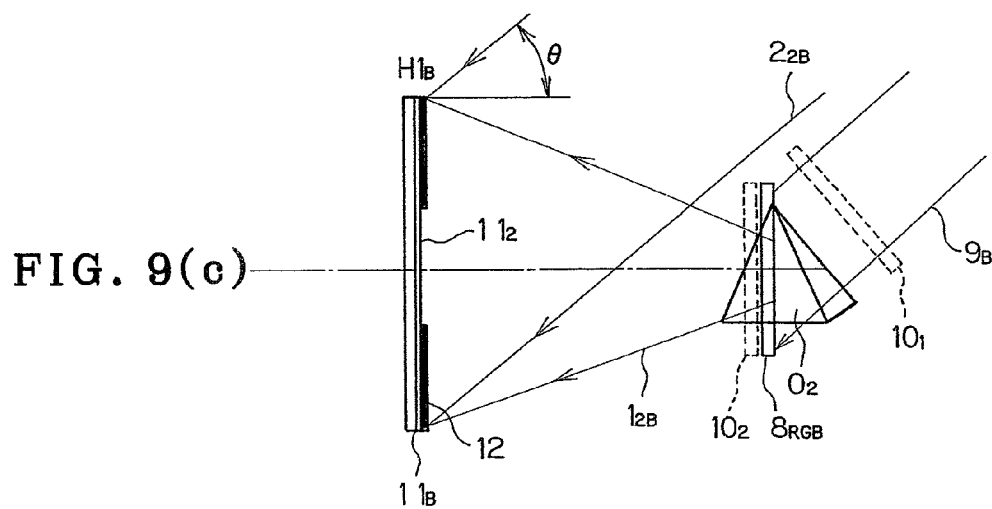

Then, as depicted in FIG. 9(c), the photosensitive material $11_B$ for the first-stage H1 hologram in B in place of the photosensitive material $11_G$ for the first-stage H1 hologram in G is likewise located at the same position. Again, the mask 12 is applied to a surface portion of the photosensitive material other than the second sub-area $11_2$ to record the hologram of the second object $O_2$ comprising a full-color reconstructed image from CGH $8_{RGB}$. As the CGH $8_{RGB}$ is illuminated by reconstructing light $9_B$ having the same wavelength $\lambda_B$ for B as in the case of FIG. 6(c), it causes B object light $1_{2B}$ diffracted through CGH $8_{RGB}$ to enter the second sub-area $11_2$ of the photosensitive material $11_B$. In the meantime, reference light $2_{2B}$ comprising parallel light, coherent with the object light $1_{2B}$ and coming from the same light source, is allowed to enter simultaneously the surface of the photosensitive material $11_B$ at the same angle of incidence θ as in the case of FIG. 6(a)-6(c), so that the B hologram of the second object $O_2$ is holographically recorded as the reconstructed image from CGH $8_{RGB}$ in the second sub-area $11_2$ of the photosensitive material $11_B$.

It is here noted that the uniaxial diffuser $10_1$, $10_2$ indicated by a broken line in FIG. 9 is used in the same way as shown in FIG. 2.

In this way, the surface of each of the three first-stage photosensitive materials $11_R$, $11_G$ and $11_B$ is divided into a plurality of sub-areas $11_1$, $11_2$ and $11_3$, and the respective R, G and B holograms of the same objects $O_1$, $O_2$ and $O_3$ are recorded by holographically recording in the respective sub-areas $11_1$, $11_2$ and $11_3$, using reference light $21_R$, $21_G$, $21_B$; $22_R$, $22_G$, $22_B$; and $23_R$, $23_G$, $23_B$ having three wavelengths $\lambda_R$, $\lambda_G$ and $\lambda_B$ for R, G and B, all at the same angle of incidence θ. It is noted that the order of recording R, G and B may be optional. The photosensitive materials $11_R$, $11_G$ and $11_B$ for R, G and B with different holograms holographically recorded in the respective sub-areas are each developed and bleached to make the H1 holograms $11_R$, $11_G$ and $11_B$ for R, G and B. The photosensitive materials and H1 holograms shown here are indicated by the same reference numerals $11_R$, $11_G$ and $11_B$.

Figure 10:
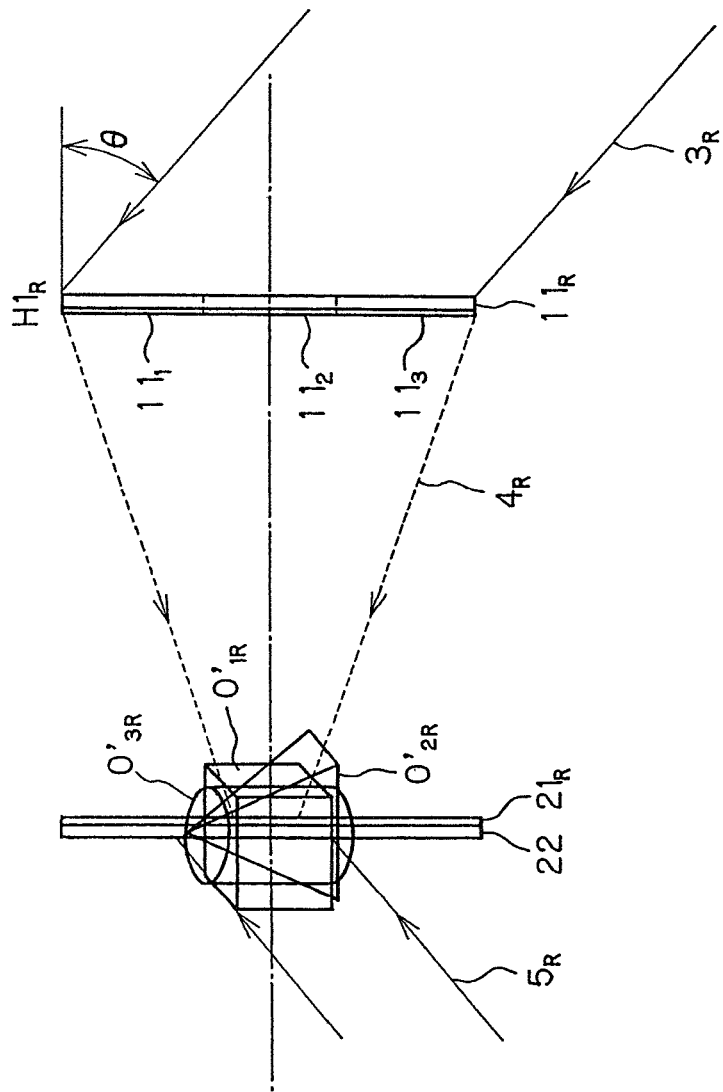
FIG. 10 is illustrative of one layout for holographically recording the H2 hologram of the first color at the second stage.

One example of how to fabricate the second-stage H2 hologram using the aforesaid H1 holograms $11_R$, $11_G$ and $11_B$ is now explained. First, as depicted in FIG. 10, reconstructing light $3_R$ of a wavelength $\lambda_R$ that travels in a direction opposite to that taken by the holographic recording reference light $2_{1R}$, $2_{2R}$ and $2_{3R}$ is allowed to enter the H1 hologram $11_R$ for R fabricated as in FIGS. 6-8 or FIGS. 6, 9 and 8 from its side that the faces away from the holographic recording reference light $2_{1R}$, $2_{2R}$ and $2_{3R}$, whereupon the R-component images $O_{1R}'$, $O_{2R}'$ and $O_{3R}'$ of the first, second and third objects $O_1$, $O_2$ and $O_3$ are reconstructed and formed by diffracted light $4_R$ at the same positions of the H1 hologram $11_R$ surface as the relative positions of the objects $O_{1R}$, $O_{2R}$ and $O_{3R}$ at the time of holographic recording. If the positions of the first, second and third objects $O_1$, $O_2$ and $O_3$ overlap spatially, the images $O_{1R}'$, $O_{2R}'$ and $O_{3R}'$ are formed in a spatially overlapping way, too. The photosensitive material $21_R$ for recording the second-stage H2 hologram in R having sensitivity to an R wavelength $\alpha_R$, applied onto a transparent substrate 22, is located near the positions at which the R-component images $O_{1R}'$, $O_{2R}'$ and $O_{3R}'$ of the first, second and third objects $O_1$, $O_2$ and $O_3$ are formed, and reference light $5_R$ comprising parallel light of the same wavelength, coherent with the reconstructing light $3_R$ and coming from the same light source, is allowed to enter simultaneously that photosensitive material $21_R$ at any arbitral angle of incidence from its side that faces, or faces way from, the diffracted light $4_R$, so that the second-stage H2 hologram of R is holographically recorded in the photosensitive material $21_R$.

Figure 11:
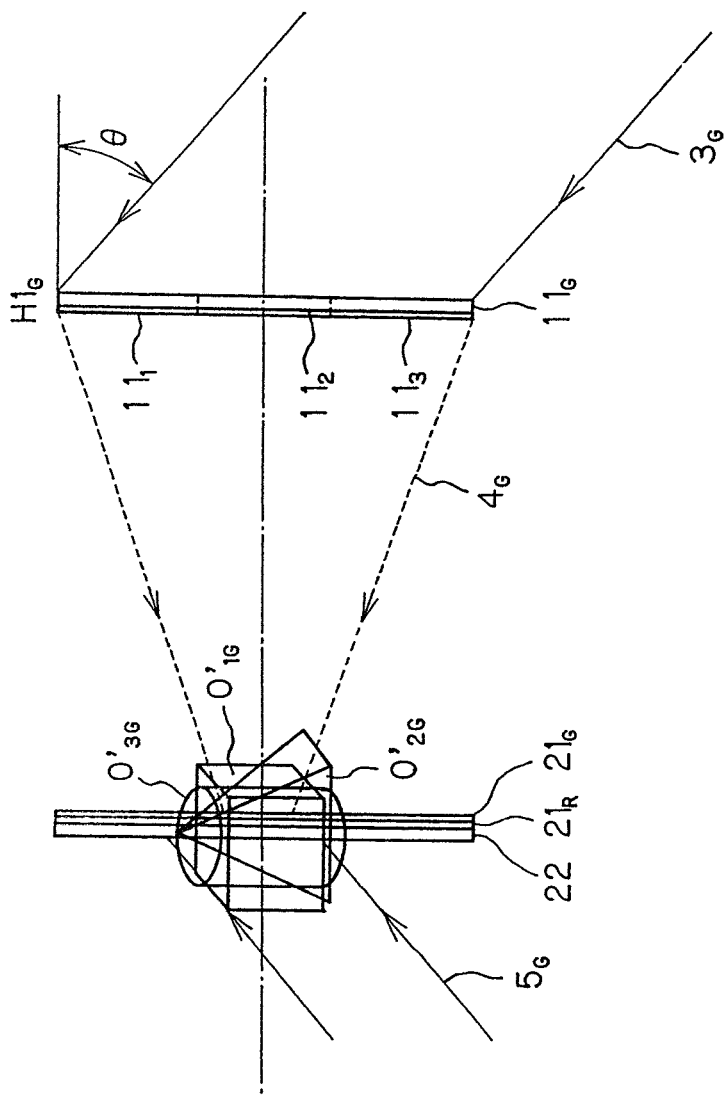
FIG. 11 is illustrative of one layout for holographically recording the H2 hologram of the second color at the second stage.

Thereafter, the photosensitive material $21_R$ is post-treated to get rid of photosensitivity (in this example, the photopolymer is used as the photosensitive materials $21_R$, $21_G$ and $21_B$ for recording the second-stage H2 hologram and heating and ultraviolet irradiation are carried out for that post-treatment after exposure). Onto that, as depicted in FIG. 11, the photosensitive material $21_G$ for recording the second-stage H2 hologram in G having sensitivity to the G wavelength $\lambda_G$ is applied, and the transparent substrate 22 is located at the same position as the relative position of FIG. 10. Then, the H1 hologram $11_G$ fabricated as in FIGS. 6-8 or FIGS. 6, 9 and 8 in place of the H1 hologram $11_R$ for R of FIG. 10 is located at the same position. Likewise, the reconstructing light $3_G$ of wavelength $\lambda_G$ that travels in a direction opposite to that taken by the holographic recording reference light $2_{1G}$, $2_{2G}$ and $2_{3G}$ is allowed to enter the H1 hologram $11_G$ for G from its side that faces way from the holographic recording reference light $2_{1G}$, $2_{2G}$ and $2_{3G}$, whereupon the G-component images $O_{1G}'$, $O_{2G}'$ and $O_{3G}'$ of the first, second and third $O_1$, $O_2$ and $O_3$ are reconstructed and formed by the diffracted light $4_G$ on the same position of the H1 hologram $11_G$ surface for G as the relative position of the objects $O_1$, $O_2$ and $O_3$ upon holographic recording. The photosensitive material $21_G$ for recording the second-stage H2 hologram in G applied onto the transparent substrate 22 is positioned near these G-component images $O_{1G}'$, $O_{2G}'$ and $O_{3G}'$, and reference light $5_G$ comprising parallel light of the same wavelength, coherent with the reconstructing light $3_G$ and coming from the same light source, is allowed to enter simultaneously the photosensitive material $21_G$ in the same direction and at the same angle of incidence as is the case with the reference light $5_R$ for R, so that the second-stage H2 hologram for G is holographically recorded in the photosensitive material $21_G$.

Figure 12:
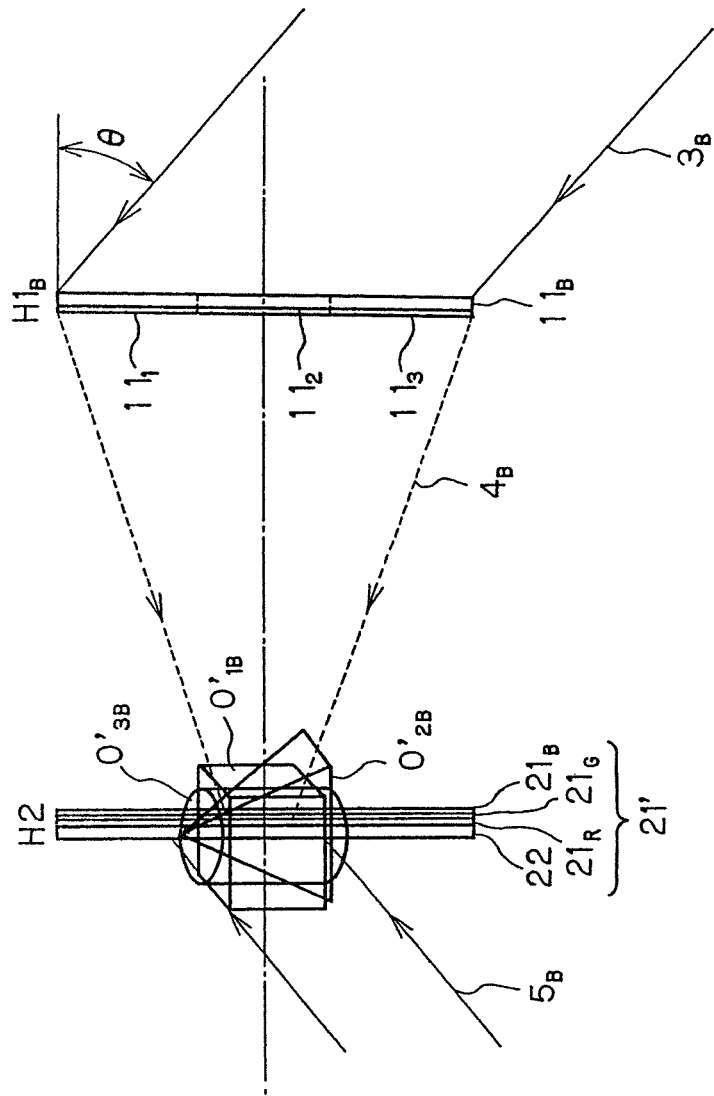
FIG. 12 is illustrative of one layout for holographically recording the H2 hologram of the third color at the second stage.

Thereafter, the photosensitive material $21_G$ is post-treated to get rid of photosensitivity. Onto that, as depicted in FIG. 12, the photosensitive material $21_B$ for recording the second-stage H2 hologram in B having sensitivity to the wavelength $\lambda_B$ for B is applied, and the transparent substrate 22 is located at the same position as the relative position of FIGS. 10 and 11. Then, the H1 hologram $11_B$ for B fabricated as in FIGS. 6-8 or FIGS. 6, 9 and 8 in place of the H1 hologram $11_G$ for G of FIG. 11 is located at the same position. Likewise, the reconstructing light $3_B$ of wavelength $\alpha_B$ that travels in a direction opposite to that taken by the holographic recording reference light $2_{1B}$, $2_{2B}$ and $2_{3B}$ is allowed to enter the H1 hologram $11_B$ for B from its side that faces away from the holographic recording reference light $2_{1B}$, $2_{2B}$ and $2_{3B}$, whereupon the B-component images $O_{1B}'$, $O_{2B}'$ and $O_{3B}'$ of the first, second and third $O_1$, $O_2$ and $O_3$ are reconstructed and formed by the diffracted light $4_B$ on the same position of the H1 hologram $11_B$ surface for B as the relative position of the objects $O_1$, $O_2$ and $O_3$ upon holographic recording. The photosensitive material $21_B$ for recording the second-stage H2 hologram in B applied onto the transparent substrate 22 is positioned near these B-component images $O_{1B}'$, $O_{2B}'$ and $O_{3B}'$, and reference light $5_B$ comprising parallel light of the same wavelength, coherent with the reconstructing light $3_B$ and coming from the same light source, is allowed to enter simultaneously the photosensitive material $21_B$ in the same direction and at the same angle of incidence as is the case with the reference light $5_R$, $5_G$ for R, G, so that the second-stage H2 hologram for B is holographically recorded in the photosensitive material $21_B$.

Finally, the photosensitive material $21_B$ is likewise post-treated to get rid of photosensitivity, thereby obtaining a full-color H2 hologram 21' wherein the second-stage H2 hologram ($21_R$) for R, H2 hologram ($21_G$) for G and H2 hologram ($21_B$) for B are stacked on the transparent substrate 22 in order.

This full-color H2 hologram 21' works as already set forth with reference to FIG. 4 too. As reconstructing light 6 that travels in a direction opposite to that taken by the holographic recording reference light 5R, 5G, 5B (white light here) enters the full-color H2 hologram 21' from its side that faces away from the holographic recording reference light $5_R$, $5_C$, $5_B$, it causes the three-color RGB images $O_1''$, $O_2''$ and $O_3''$ of the first, second and third objects $O_1$, $O_2$ and $O_3$ to be reconstructed by diffracted light 7 in an overlapping way, and the window 25 having the same size as that of the recording surface of the H1 hologram $11_R$, $11_G$, $11_B$ to be reconstructed at the original position of the H1 hologram $11_R$, $11_G$, $11_B$. And of the images $O_1''$, $O_2''$ and $O_3''$ of the first, second and third objects $O_1$, $O_2$ and $O_3$, the image $O_1''$ of the first object $O_1$ is reconstructed by the diffracted light component $7_1$ traveling toward the range $25_1$ corresponding to the first sub-area $11_1$ in the window 25; the image $O_2''$ of the second object $O_2$ is reconstructed by the diffracted light component $7_2$ traveling toward the range $25_2$ corresponding to the second sub-area $11_2$ in the window 25; and the image $O_3''$ of the third object $O_3$ is reconstructed by the diffracted light component $7_3$ traveling toward the range $25_3$ corresponding to the third sub-area $11_3$ in the window 25. Accordingly, when there is a viewer's eye E lying in the angle range $\alpha_1$ in FIG. 4 (the range $25_1$ in the window 25 defines an angle range subtended by a position on which the reference light $5_R$, $5_G$, $5_B$ for the H2 hologram 21 is incident), the full-color image $O_1''$ of the first object $O_1$ (cube) is seen near the H2 hologram 21 (21'); when the viewer's eye E lies in the angle range $\alpha_2$ (the range $25_2$ in the window 25 defines an angle range subtended by a position on which the reference light $5_R$, $5_G$, $5_B$ for the H2 hologram 21 (21') is incident), the full-color image $O_2''$ of the second object $O_2$ (triangular pyramid) is seen near the H2 hologram 21 (21''); and when the viewer's eye E lies in the angle range $\alpha_3$ (the range $25_3$ in the window 25 defines an angle range subtended by a position on which the reference light $5_R$, $5_G$, $5_B$ for the H2 hologram 21 (21') is incident), the full-color image $O_3''$ of the third object $O_2$ is seen near the H2 hologram 21 (21'): depending on the viewing direction, the image under observation changes between the full-color images $O_1''$, $O_2''$ and $O_3''$. In addition, the image $O_1''$, $O_2''$, $O_3''$, each object is a three-dimensional (3D) one with the stereoscopic image changing in order depending on the viewing direction.

While the H1 holograms $11_R$, $11_G$ and $11_B$ are shown in FIGS. 10-12 as being recorded in the order of R, G and B, it is to be noted that they may be recorded in any desired order.

In the fabrication process for the full-color H2 hologram 21' as described above, while the photosensitive materials $21_R$, $21_G$ and $21_B$ for recording hologram in R, G and B are stacked in order on the common transparent substrate 22, the holograms of the corresponding colors are holographically recorded in order. In this connection, it is to be noted that a single photosensitive material sensitive to the three colors R, G and B may be sequentially or simultaneously exposed to holographic light. Simultaneous exposure, however, requires simultaneous reconstruction of images from the stacked H1 holograms $11_R$, $11_G$ and $11_B$. Note here that a hologram containing a lot more noise is recorded as the H2 hologram, because each of the H1 holograms $11_R$, $11_G$ and $11_B$ is of the transmission type that don't have high wavelength dependency and has chromatic dispersion. However, if the H1 holograms $11_R$, $11_G$ and $11_B$ are each a volume type reflection hologram, such noise can be reduced.

Instead of stacking the photosensitive materials $21_R$, $21_G$ and $21_B$ for recording hologram in R, G and B in order on the common transparent substrate 22 while the holograms of corresponding colors are exposed in order to holographic light while the photosensitive materials $21_R$, $21_G$ and $21_B$ for recording hologram are replaced in order, the H2 holograms of corresponding colors may be holographically recorded, and the thus holographically recorded three R, G and B H2 holograms may be stacked and integrated together into the full-color H2 hologram 21'. In this case, the relative position between the holograms is displaced by the thickness of each hologram in association with stacking operation, and there is correspondingly a displacement in the position of the reconstructed image of each color component. To compensate for this, the distance between each H2 hologram and the H1 hologram $11_R$, $11_G$, $11_B$ must be adjusted for each color upon holographic recording.

In the aforesaid embodiments and examples, while the different photosensitive materials $11_R$, $11_G$ and $11_B$ for each color are used for the H1 holograms, too, it is to be understood that they may be multi-recorded in a single photosensitive material having sensitivities to the three R, G and B colors. Note here that a hologram containing a lot more noise is recorded as the H2 hologram, because each of the H1 holograms $11_R$, $11_G$ and $11_B$ is of the transmission type that is not high in wavelength dependency and has chromatic dispersion. However, if the H1 holograms $11_R$, $11_G$ and $11_B$ are each a volume type reflection hologram, such noise can be reduced.

According to the inventive second process for the fabrication of a multi-image type hologram, a volume hologram is fabricated by a two-step process wherein different objects to be displayed on different images are recorded in different hologram recording materials using reference light of the same angle of incidence, a plurality of elemental holograms with the objects recorded in them are imposed side by side or arranged in an overlapping way for integration to fabricate a first-stage hologram (hereinafter called the H1 hologram), and images of the recorded objects are simultaneously reconstructed from that H1 hologram so that a material for recording the second-stage hologram is located near the reconstructed images of the recorded objects to record the second-stage hologram as a reflection or transmission type of volume hologram (hereinafter called the H2 hologram).

Figure 13A:
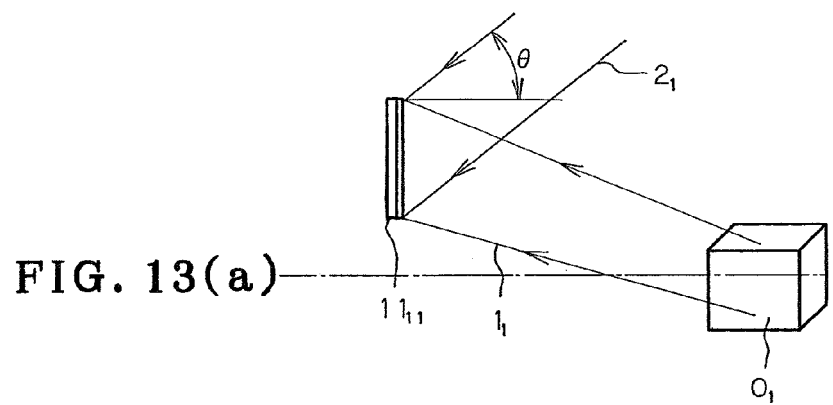
FIG. 13 is illustrative of one layout for holographically recording a plurality of elemental holograms forming part of the first-stage H1 hologram at the time when a multi-image type hologram with one image changing over to another is fabricated by the two-step process on the basis of the second fabrication process of multi-image type hologram of the invention.

The second fabrication process of multi-image type hologram of the invention is now explained with reference to the drawings. FIG. 13 is illustrative of one exemplary holographic recording layout for a plurality of element holograms that constitutes part of the first-stage hologram H1 hologram when fabricating a multi-image type hologram by the two-step process on the basis of the invention. In the embodiment here, a photosensitive material $11_{11}$, $11_{12}$, $11_{13}$ that is highly sensitive than a photopolymer is used. First, as depicted in FIG. 13(a), the first photosensitive material $11_{11}$ is located, facing the first object (drawn as a cube) $O_1$ that is to be recorded on the first image. As the first object $O_1$ is illuminated by laser light having a predetermined wavelength, it causes object light $1_1$ scattered by the first object $O_1$ to enter the first photosensitive material $11_{11}$. In the meantime, reference light $2_1$ comprising parallel light, coherent with the object light $1_1$, coming from the same light source, is allowed to enter simultaneously the surface of the photosensitive material $11_{11}$ at an angle of incidence θ to holographically record the elemental hologram of the first object $O_1$ in the first photosensitive material $11_{11}$. The photosensitive material and elemental hologram here are indicated by the same reference numeral $11_{11}$: the same applies to other photosensitive material $11_{12}$, $11_{13}$ and elemental hologram $11_{12}$, $11_{13}$ as well.

The reason why the silver halide material (silver halide photosensitive material) in place of the photopolymer is used for the photosensitive material $11_{11}$, $11_{12}$, $11_{13}$ is here explained. When a plurality of elemental holograms $11_{11}$, $11_{12}$ and $11_{13}$ that form part of the H1 hologram are holographically recorded in the layout of FIG. 13, the object $O_1$, $O_2$, $O_3$ must be spaced some away from the photosensitive-material $11_{11}$, $11_{12}$, $11_{13}$, however, as there is a distance between the object $O_1$, $O_2$, $O_3$ and the photosensitive material $11_{11}$, $11_{12}$, $11_{13}$, the intensity of the object light $1_1$, $1_2$, $1_3$ becomes weak. With the photopolymer that has low sensitivity the silver halide material, therefore, exposure time would become too long to fabricate a bright hologram. Further, the use of the photopolymer gives rise to a change in the angle of incidence of light on the recording material between the time of recording and the time of reconstruction because of shrinkage, whereas the silver halide material is less affected by shrinkage than the photopolymer. This is the reason the silver halide material is used for the photosensitive material $11_{11}$, $11_{12}$, $11_{13}$.

Figure 13B:
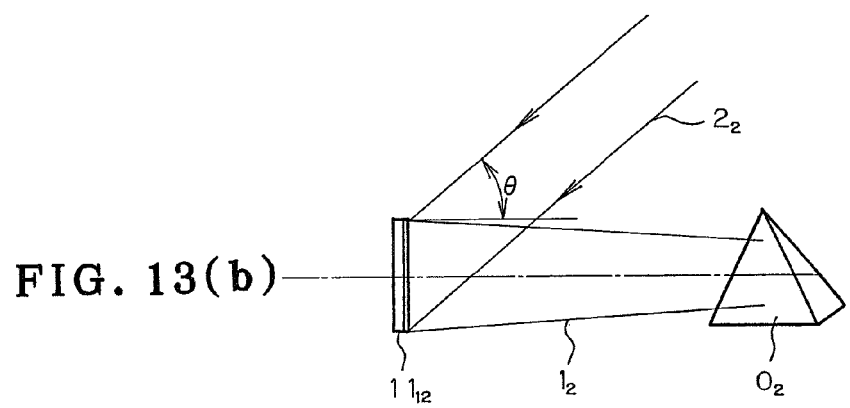

Likewise, as depicted in FIG. 13(b), the second photosensitive material $11_{12}$ is located, facing the second object (drawn as a triangular pyramid) $O_2$ that is to be recorded on the second image. As the second object $O_2$ is illuminated by laser light having the same wavelength as that for the holographic recording of the hologram of the first object $O_1$, it causes object light $1_2$ scattered by the second object $O_2$ to enter the second photosensitive material $11_{12}$. In the meantime, reference light beams $2_2$ comprising parallel light coherent with the object light $1_2$, coming from the same light source are allowed to enter simultaneously the surface of the photosensitive material $11_{11}$ at the same angle of incidence θ as that for the reference light $2_1$ to holographically record the element hologram of the second object $O_2$ in the second photosensitive material $11_{12}$.

Figure 13C:
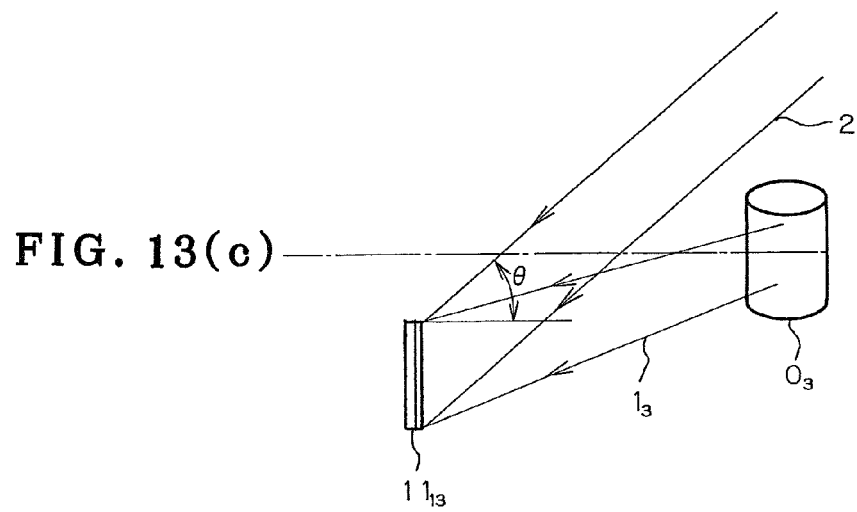

Again likewise, as depicted in FIG. 13(c), the third photosensitive material $11_{13}$ is located, facing the third object (drawn as a circular cylinder) $O_3$ that is to be recorded on the third image. As the third object $O_3$ is illuminated by laser light having the same wavelength as that for the holographic recording of the hologram of the first, and second object $O_1$, $O_2$, it causes object light $1_3$ scattered by the third object $O_3$ to enter the third photosensitive material $11_{13}$. In the meantime, reference light $2_3$ comprising parallel light, coherent with the object light $1_3$, coming from the same light source is allowed to enter simultaneously the surface of the photosensitive material $11_{13}$ at the same angle of incidence θ as that for the reference light $2_1$, $2_2$ to holographically record the elemental hologram of the second object $O_3$ in the third photosensitive material $11_{13}$.

It is here noted that any or all of the first $O_1$, the second $O_2$ and the third object $O_3$ to be recorded as holograms in the photosensitive materials $11_{11}$, $11_{12}$ and $11_{13}$ may be images reconstructed from a computer-generated hologram (CGH), as in FIG. 2.

In this way, the holograms of the different objects $O_1$, $O_2$ and $O_3$ are holographically recorded in the respective elemental holograms $11_{11}$, $11_{12}$ and $11_{13}$, using the reference light $2_1$, $2_2$ and $2_3$ of the same wavelength at the same angle of incidence θ.

The first, second and third photosensitive materials $11_{11}$, $11_{12}$ and $11_{13}$ with the different holograms holographically recorded in them are developed and bleached to obtain the elemental holograms $11_{11}$, $11_{12}$ and $11_{13}$.

Figure 14:
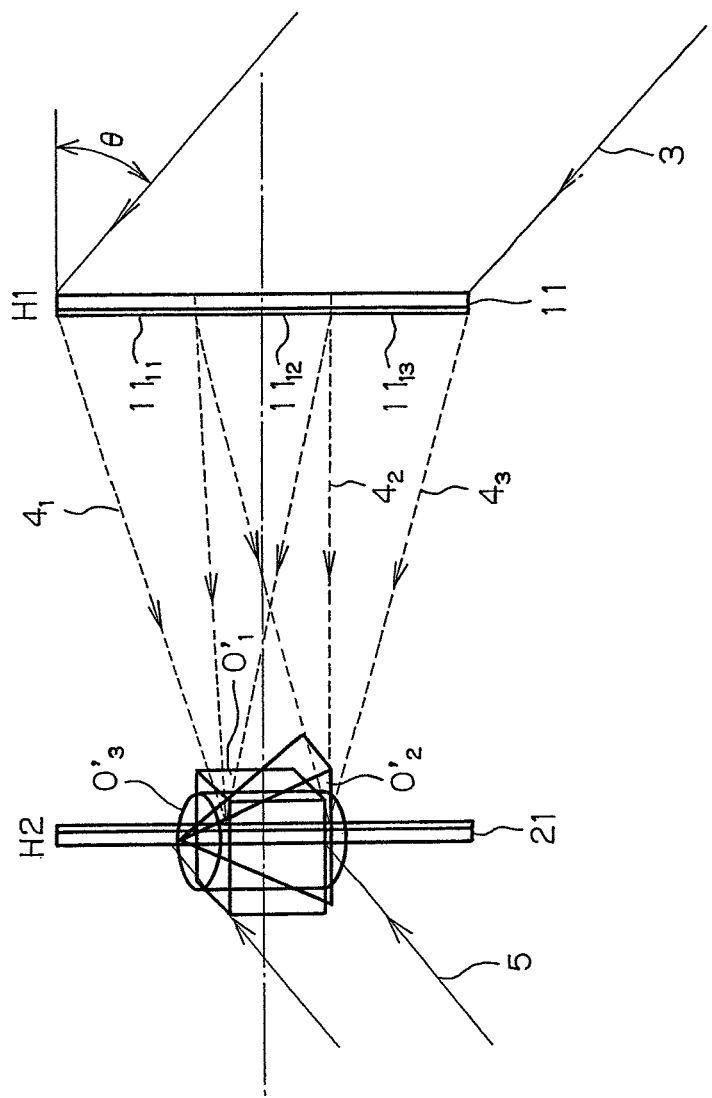
FIG. 14 is illustrative of one layout for holographically recording the second-stage H2 hologram.

Then, as depicted in FIG. 14, the plurality of elemental holograms $11_{11}$, $11_{12}$ and $11_{13}$ are imposed side by side while they are adjacent to one another. Note here that the plurality of elemental holograms $11_{11}$, $11_{12}$ and $11_{13}$ may be imposed in any desired order.

And then, reconstructing light 3 that travels in a direction opposite to that taken by the reference light $2_1$, $2_2$ and $2_3$ for the holographic recording of the elemental holograms $11_{11}$, $11_{12}$, $11_{13}$ in the H1 hologram 11 with the elemental holograms $11_{11}$, $11_{12}$, $11_{13}$ imposed is allowed to enter the H1 hologram 11 from its side that faces away from the holographic recording reference light $2_1$, $2_2$ and $2_3$, whereupon the images $O_1'$, $O_2'$ and $O_3'$ of the first, second and third objects $O_1$, $O_2$ and $O_3$ are reconstructed and formed by diffracted light $4_1$, $4_2$, $4_3$ from the elemental holograms $11_{11}$, $11_{12}$, $11_{13}$ at the same positions of the H1 hologram 11 surface as the relative positions of the objects $O_1$, $O_2$ and $O_3$ at the time of holographic recording of the elemental holograms $11_{11}$, $11_{12}$, $11_{13}$. If the positions of the first, second and third objects $O_1$, $O_2$ and $O_3$ overlap spatially, the images $O_1'$, $O_2'$ and $O_3'$ are formed in a spatially overlapping way, too. The photosensitive material 21 for recording the second-stage H2 hologram is located near the positions at which the images $O_1'$, $O_2'$ and $O_3'$ of these first, second and third objects $O_1$, $O_2$ and $O_3$ are formed, and reference light beams 5 comprising parallel light, coherent with the reconstructing light 3 and coming from the same light source, is allowed to enter simultaneously it from its side that faces or faces away from the diffracted light $4_1$, $4_2$, $4_3$ and at any given angle of incidence, so that the second-stage H2 hologram is holographically recorded in the photosensitive material 21. In this embodiment, the photopolymer is used as the photosensitive material 21 for recording the second-stage H2 hologram, and the photosensitive material 21 after holographic recording is post treated or specifically heated and irradiated with ultraviolet radiation to fabricate an H2 hologram 21. The photosensitive material and H2 hologram here are indicated by the same reference numeral 21.

The direction of incidence of the reference light 5 here is preferably such that when it is projected onto the surface of the H1 hologram 11, that direction is substantially parallel with the direction of juxtaposition of the elemental holograms $11_{11}$, $11_{12}$ and $11_{13}$ of the H1 hologram 11.

Incidentally, the reason the photopolymer, not the silver halide material (silver halide photosensitive material) used for the photosensitive materials $11_{11}$, $11_{12}$ and $11_{13}$, is used for the photosensitive material 21 is that the use of the silver halide material for the photosensitive material 21 causes a noise component from the H1 hologram 11 to be also recorded in the photosensitive material 21 due to its very high sensitivity, but the use of the photopolymer makes it almost impossible to carry the noise component from the H1 hologram 11 over to the photosensitive material 21 and the photopolymer itself is of high transparency and much more reduced in noise.

The thus recorded H2 hologram 21 is a volume hologram: when the reference light 5 is incident on the photosensitive material from its side that faces away from the diffracted light $4_1$, $4_2$, $4_3$, it is recorded as a reflection type hologram, and when the reference light 5 is incident on the photosensitive material from its side that faces the diffracted light $4_1$, $4_2$, $4_3$, it is recorded as a transmission type hologram.

Figure 15:
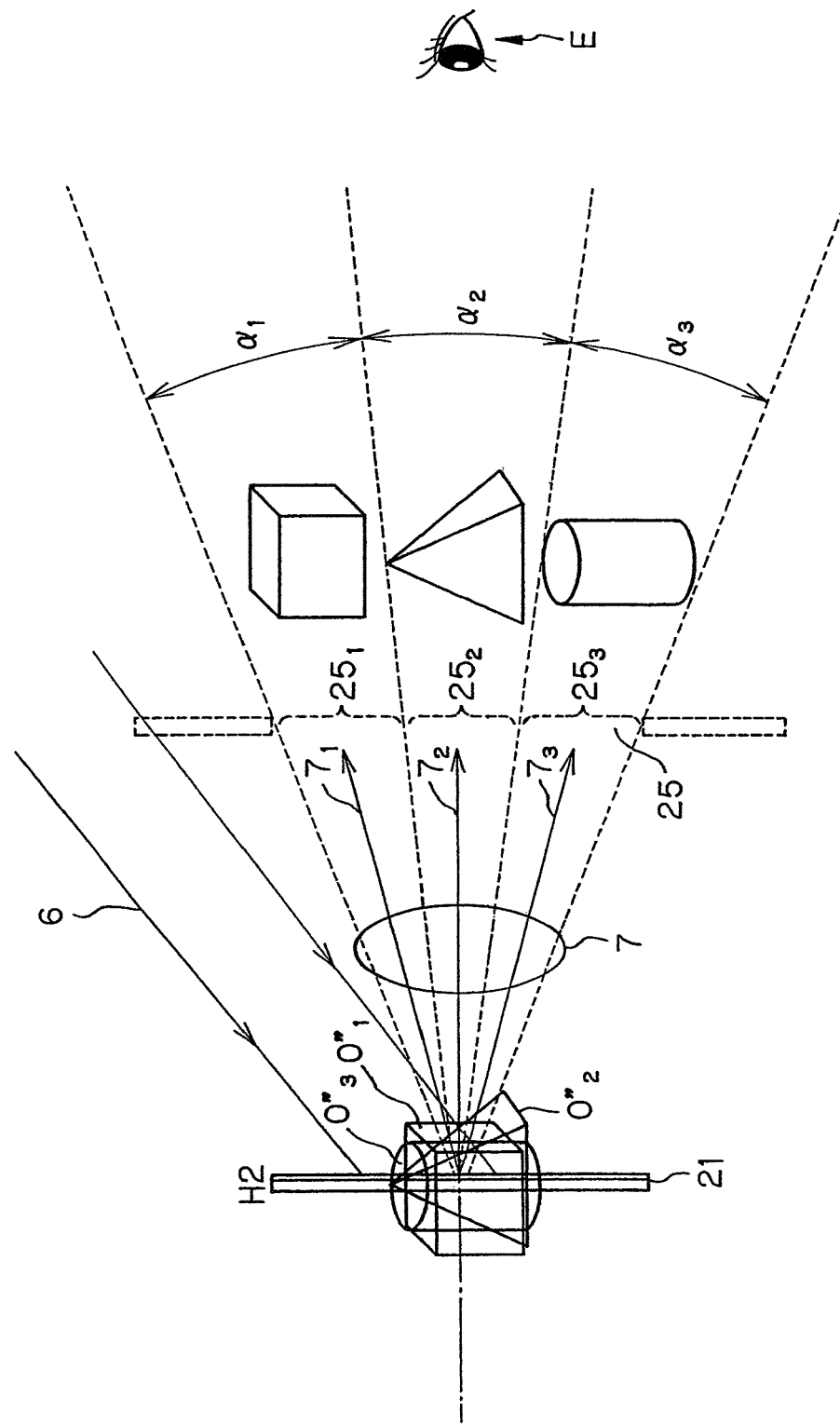
FIG. 15 is illustrative of how the fabricated multi-image type hologram works.

As depicted in FIG. 15, reconstructing light 6 that travels in a direction opposite to that taken by the holographic recording reference light 5 used for the holographic recording of the H2 hologram 21 is incident on the thus recorded H2 hologram 21 from its side that faces away from the holographic recording reference light 5, whereupon the images $O_1''$, $O_2''$ and $O_3''$ of the images $O_1'$, $O_2'$ and $O_3'$ of the first, second, and third objects $O_1$, $O_2$ and $O_3$ are reconstructed by diffracted light 7 in a spatially overlapping way, and a window 25 having the same size as that of the recording surface of the H1 hologram 11 is reconstructed at the original position of the H1 hologram 11. And of the images $O_1''$, $O_2''$ and $O_3''$ of the first, second and third objects $O_1$, $O_2$ and $O_3$, the image $O_1''$ of the first object $O_1$ is reconstructed by a diffracted light component $7_1$ traveling toward a range $25_1$ corresponding to the first elemental hologram $11_{11}$ in the window 25; the image $O_2''$ of the second object $O_2$ is reconstructed by a diffracted light component $7_2$ traveling toward a range $25_2$ corresponding to the second elemental hologram $11_{12}$ in the window 25; and the image $O_3''$ of the third object $O_3$ is reconstructed by a diffracted light component $7_3$ traveling toward a range $25_3$ corresponding to the third elemental hologram $11_{13}$ in the window 25. Accordingly, when there is a viewer's eye E lying an angle range $\alpha_1$ in FIG. 15 (the range $25_1$ in the window 25 defines an angle range subtended by a position on which the reference light 5 for the H2 hologram 21 is incident), the image $O_1''$ (cube) of the first object $O_1$ is seen near the H2 hologram 21; when the viewer's eye E lies in an angle range $\alpha_2$ (the range $25_2$ in the window 25 defines an angle range subtended by a position on which the reference light 5 for the H2 hologram 21 is incident), the image $O_2''$ of the second object $O_2$ (triangular pyramid) is seen near the H2 hologram 21; and when the viewer's eye E lies in an angle range $\alpha_3$ (the range $25_3$ in the window 25 defines an angle range subtended by a position on which the reference light 5 for the H2 hologram 21 is incident), the image $O_3''$ of the third object $O_3$ (circular cylinder) is seen near the H2 hologram 21. In other words, depending on the viewing direction, the image under observation changes to any of the images $O_1''$, $O_2''$ and $O_3''$. In addition, the object images $O_1''$, $O_2''$ and $O_3''$ are each a three-dimensional (3D) one, and depending on the viewing direction, the three-dimensional image changes in order. Referring again to FIG. 15, the cube, triangular pyramid and circular cylinder drawn in the angle ranges $\alpha_1$, $\alpha_2$ and $\alpha_3$ are given to tell differences between the three-dimensional images seen in the corresponding angle ranges; they are not given to show positions at which they are to be reconstructed. They are reconstructed at the positions of the images $O_1''$, $O_2''$ and $O_3''$ near the H2 hologram 21.

Figure 16:
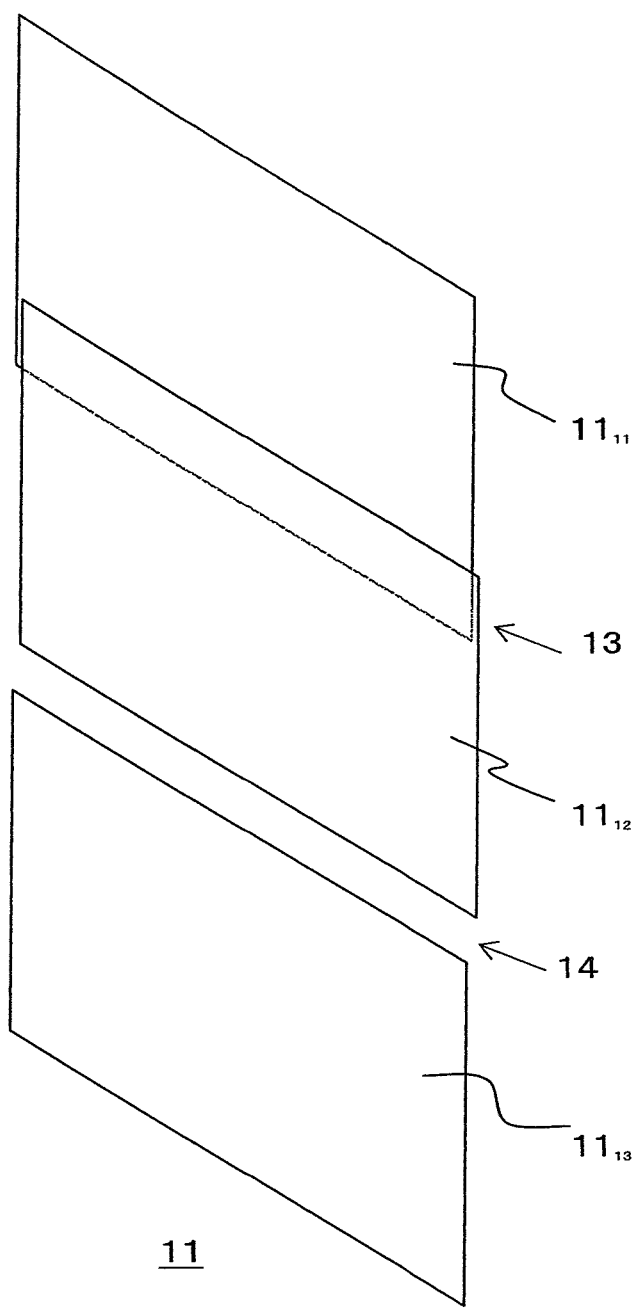
FIG. 16 is illustrative of how to impose the elemental holograms forming part of the first-stage H1 hologram side by side.
Figure 17:
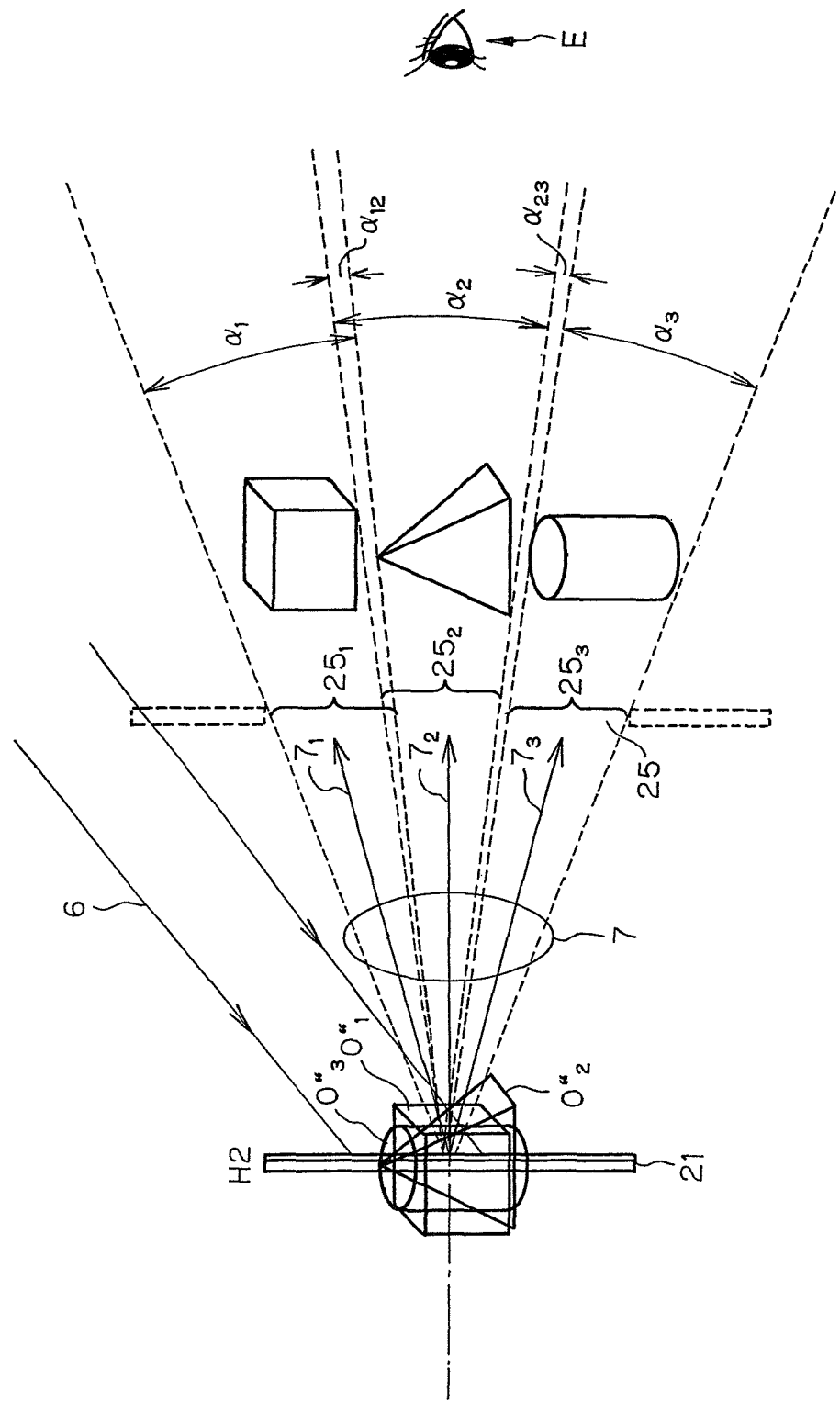
FIG. 17 is illustrative of how a multi-image type hologram fabricated in the side-by-side arrangement of FIG. 16 works.

While FIG. 14 shows that the plurality of elemental holograms $11_{11}$, $11_{12}$ and $11_{13}$ of the H1 hologram 11 are lined up side by side while they contact one another, it is to be noted that the adjoining holograms may overlap each other at 13, as depicted in FIG. 16, or they may be juxtaposed with a gap between them. In the H2 hologram 21 recorded from such an H1 hologram 11, as depicted in FIG. 17 corresponding to FIG. 15, the range $25_1$ corresponding to the first elemental hologram $11_{11}$ and the range $25_2$ corresponding to the second elemental hologram $11_{12}$ in the window 25 overlap each other at 13 in FIG. 6, and the range $25_2$ corresponding to the second elemental hologram $11_{12}$ is spaced away from the range $25_3$ corresponding to the third elemental hologram $11_{13}$ in the window 25, as can be indicated at 14 in FIG. 16. Correspondingly, the angle ranges $\alpha_1$ and $\alpha_2$ overlap each other in an angle range $\alpha_{12}$, and the angle ranges $\alpha_2$ and $\alpha_3$ are spaced away from each other in an angle range $\alpha_{23}$. Therefore, when the viewer's eye E is positioned in the angle range $\alpha_{12}$ of FIG. 17, both the image $O_1$" of the first object $O_1$ (cube) and the image $O_2$" of the second object $O_2$ (triangular pyramid) are seen near the H2 hologram 21, and when it is in the angle range $\alpha_{23}$, there is nothing seen. In other words, as the viewer moves his eye E from top to bottom in FIG. 17, he sees first the cube, then both the cube and the triangular pyramid, then only the triangular pyramid because the cube disappears, then nothing, and then the circular cylinder.

Figure 18B:
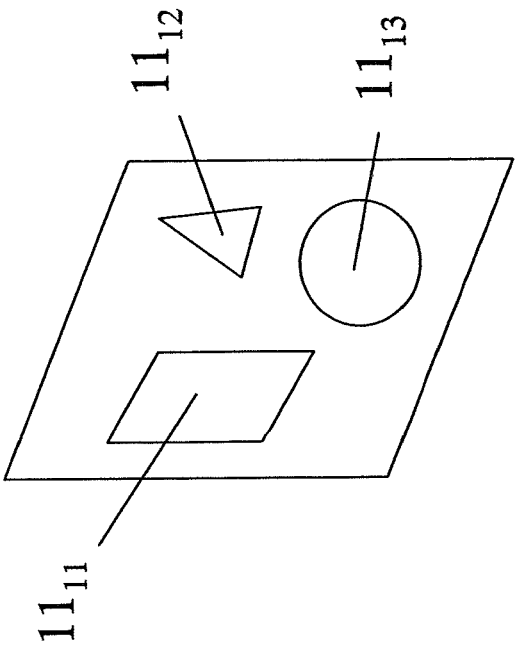
FIG. 18 is illustrative of another exemplified layout for the elemental holograms forming part of the H1 hologram.
Figure 18A:
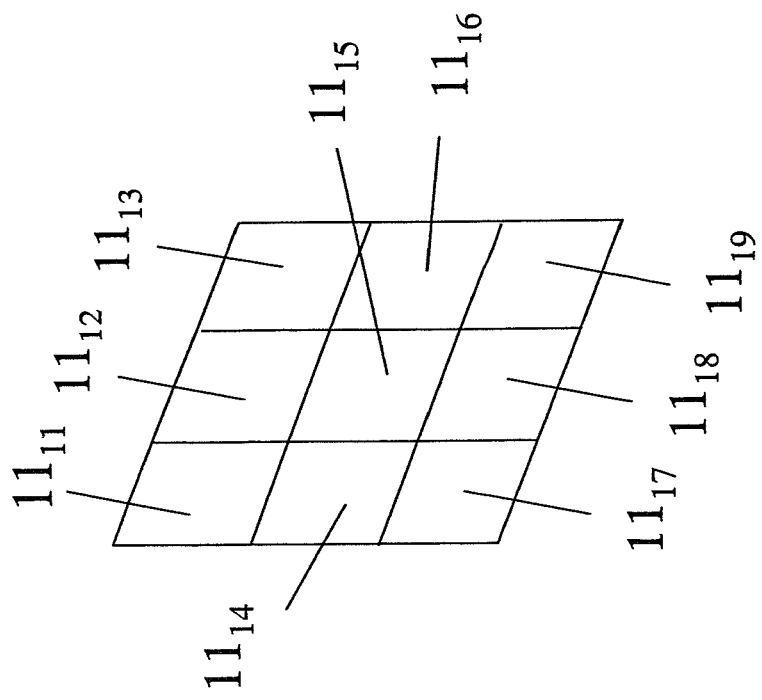

Although the plurality of elemental holograms $11_{11}$, $11_{12}$ and $11_{13}$ here are each of the same rectangular shape and size, it is to be noted that they may be arranged in any arbitrary size and shape, as exemplified in FIG. 18. FIG. 18(*a*) is illustrative of a two-dimensional matrix made up of elemental holograms $11_{11}$ to $11_{19}$, and FIG. 18(*b*) is illustrative of an arrangement wherein elemental holograms $11_{11}$, $11_{12}$ and $11_{13}$, each of a different shape, are two-dimensionally spaced away from one another.

Referring here to the layouts of FIG. 18, when divergent light is used as the reference light $2_1$, $2_2$ and $2_3$ for the holographic recording the elemental holograms $11_{11}$, $11_{12}$ and $11_{13}$ of the H1 hologram 11, the recording system costs much, because it is required to use convergent light as the reconstructing light 3 for the fabrication of the H2 hologram 21 of FIG. 14; that is, it is required to use a convex lens whose aperture is larger than the photosensitive material 11, thereby giving out convergent light enough to cover the whole extent of the photosensitive material 11. Therefore, it is preferable to use parallel light as the reference light $2_1$-$2_3$, and the reconstructing light 3, making it possible to use a lens or parabolic mirror equivalent in size to the photosensitive material 11.

While the embodiments of the invention here have been described with reference to three images that change depending on the viewing direction, it is to be noted that the invention may be applied to two or more images: how many elemental holograms $11_{11}$, $11_{12}$, $11_{13}$ are set in the H1 hologram 11 may be determined depending on how many images are used, and the holograms of objects $O_1$, $O_2$ and $O_3$ corresponding to the elemental holograms $11_{11}$-$11_{13}$ may be recorded.

It is here noted that the multi-image type hologram fabricated by the two-step process described so far is a monochromic hologram. One example of fabricating a full-color multi-image type hologram by this process is now explained. In this example, three holograms, R (red), G (green) and B (blue), are each fabricated as the H1 hologram from a plurality of elemental holograms.

Figure 19A:
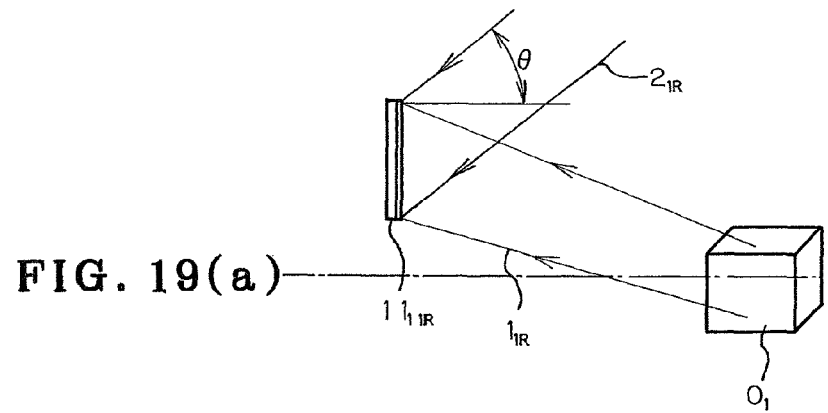
FIG. 19 is illustrative of one layout for holographically recording a plurality of elemental holograms forming part of the first-stage H1 hologram for R at the time when a full-color multi-image type hologram with one image changing over to another is fabricated on the basis of the second fabrication process of multi-image type hologram of the invention.
Figure 19B:
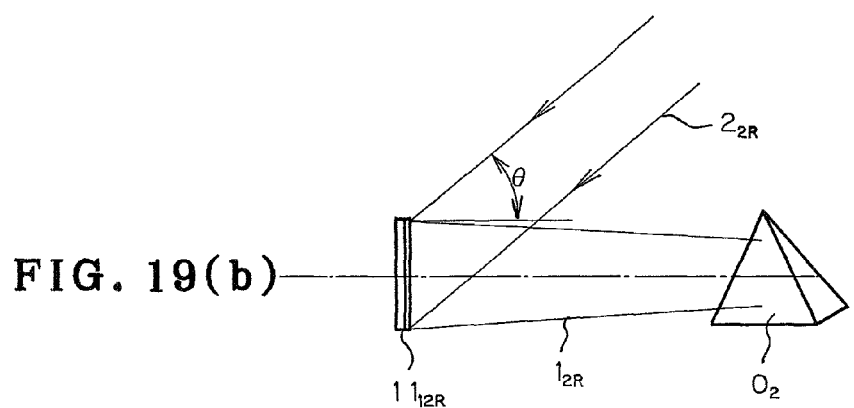
Figure 19C:
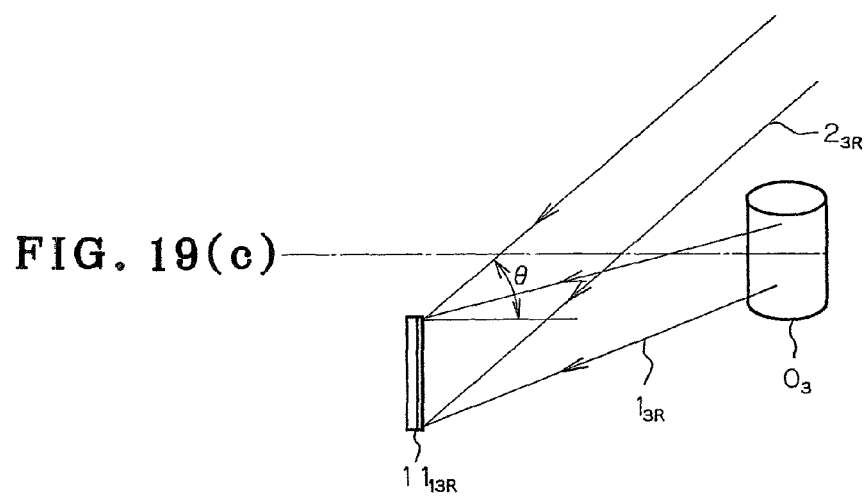

FIG. 19 is illustrative of one exemplary layout for the holographic recording of a plurality of elemental holograms $11_{11R}$, $11_{12R}$ and $11_{13R}$ that form part of the H1 hologram $11_R$ in each of three first-stage H1 holograms. FIG. 19 is basically similar to FIG. 13. First, as depicted in FIG. 19(*a*), the photosensitive material $11_{11R}$ for the first-stage H1 hologram in R having sensitivity to the wavelength $\alpha_R$ for R is located, facing the first object (drawn as a cube) $O_1$ to be recorded on the first image. As the first object $O_1$ is illuminated by laser light having an R-specific wavelength $\alpha_R$ (for instance, 647.1 nm), it causes object light $1_{1R}$ scattered by the first object $O_1$ to enter the first photosensitive material $11_{11R}$ for R. In the meantime, reference light $2_{1R}$ comprising parallel light, coherent with the object light $1_{1R}$ and coming from the same light source, is allowed to enter simultaneously the surface of the first photosensitive material $11_{11R}$ for R at an angle of incidence θ, so that the R elemental hologram $11_{11R}$ of the first object $O_1$ is holographically recorded in the first photosensitive material $11_{11R}$ for R. The photosensitive material and elemental hologram here are indicated by the same reference numeral $11_{11R}$: the same applies to other photosensitive materials $11_{12R}$, $11_{13R}$ and elemental holograms $11_{12R}$, $11_{13R}$ as well.

Likewise, as depicted in FIG. 19(*b*), the second hologram photosensitive material $11_{12R}$ for R having sensitivity to the wavelength $\alpha_R$ for R is located, facing the second object (drawn as a triangular pyramid) $O_2$ to be recorded on the second image. As the second object $O_2$ is illuminated by laser light having the same R wavelength $\alpha_R$ as that for the holographic recording of the hologram of the first object $O_1$, it causes object light $1_{12R}$ scattered by the second object $O_2$ to enter the second photosensitive material $11_{12R}$ for R. In the meantime, reference light $2_{2R}$ comprising parallel light, coherent with the object light $1_{2R}$ and coming from the same light source, is allowed to enter simultaneously the surface of the second photosensitive material $11_{12R}$ for R at the same angle of incidence θ as that for the reference light $2_{1R}$ so that the R elemental hologram $11_{12R}$ of the second object $O_2$ is holographically recorded in the second photosensitive material $11_{12R}$ for R.

Again likewise, as depicted in FIG. 19(*c*), the third hologram photosensitive material $11_{13R}$ for R having sensitivity to the wavelength $\alpha_R$ for R is located, facing the third object (drawn as a circular cylinder) $O_3$ to be recorded in the third image. As the third object $O_3$ is illuminated by laser light having the same wavelength $\alpha_R$ for R as that for the holographic recording of the hologram of the first $O_1$, and the second object $O_2$, it causes object light $1_{13R}$ scattered by the third object $O_3$ to enter the third photosensitive material $11_{13R}$ for R. In the meantime, reference light $2_{3R}$ comprising parallel light, coherent with the object light $1_{3R}$ and coming from the same light source, is allowed to enter simultaneously the surface of the third photosensitive material $11_{13R}$ for R at the same angle of incidence θ as that for the reference light $2_{1R}$, $2_{2R}$ so that the R elemental hologram $11_{13R}$ of the third object $O_3$ is holographically recorded in the third photosensitive material $11_{13R}$ for R.

The first, second and third photosensitive materials $11_{11R}$, $11_{12R}$ and $11_{13R}$ for R, with different holograms holographically recorded in them as described above, are developed and bleached into the elemental holograms $11_{11R}$, $11_{12R}$ and $11_{13R}$ for R.

Figure 20A:
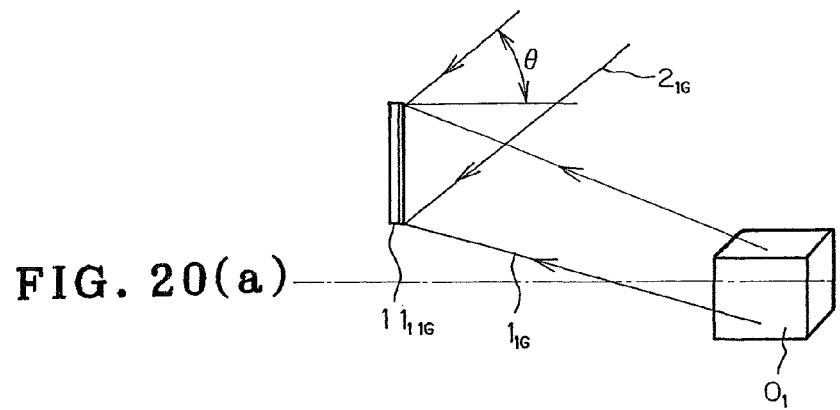
FIG. 20 is illustrative of one layout for holographically recording a plurality of elemental holograms forming part of the first-stage H1 hologram for G at the time when a full-color multi-image type hologram with one image changing over to another is fabricated on the basis of the invention.

For the holographic recording of a plurality of elemental holograms $11_{11G}$, $11_{12G}$ and $11_{13G}$ that form part of the H1 hologram $11_G$ for G, the photosensitive material $11_{11G}$ for recording the first-stage H1 hologram in G having sensitivity to a G wavelength $\lambda_G$ is located, facing the first object $O_1$ to be recorded in the first image, as depicted in FIG. 20 (*a*). And then, as the first object $O_1$ is illuminated by laser light having a G-specific wavelength $\lambda_G$ (for instance, 532 nm), it causes object light $1_{1G}$ scattered by the first object $O_1$ to enter the first photosensitive material $11_{11G}$ for G. In the meantime, reference light $2_{1G}$ comprising parallel light, coherent with the object light $1_{1G}$ and coming from the same light source, is allowed to enter simultaneously the surface of the first photosensitive material $11_{11G}$ for G at an angle of incidence θ, so that the G elemental hologram $11_{11G}$ of the first object $O_1$ is holographically recorded in the first photosensitive material $11_{11G}$ for G. The photosensitive material and elemental hologram here are indicated by the same reference numeral $11_{11G}$: the same applies to other photosensitive materials $11_{12G}$, $11_{13G}$ and elemental holograms $11_{12G}$, $11_{13G}$ as well.

Figure 20B:
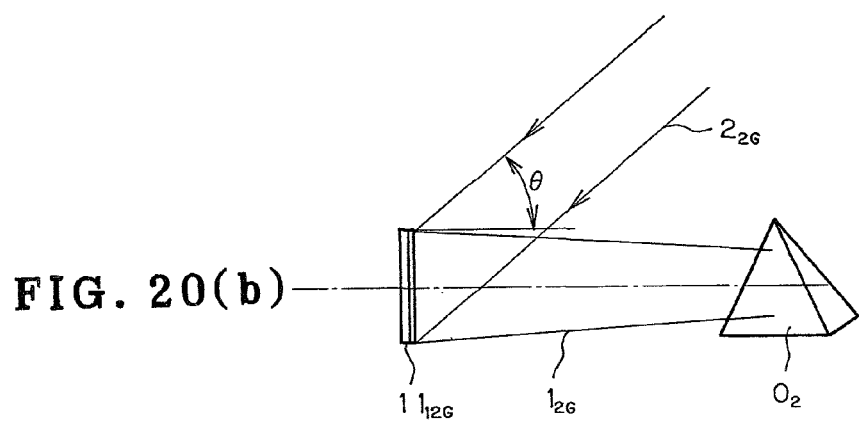

Likewise, as depicted in FIG. 20(b), the second hologram photosensitive material $11_{12G}$ for G having sensitivity to a G wavelength $\lambda_G$ is located, facing the second object $O_2$ to be recorded on the second image. And then, as the second object $O_2$ is illuminated by laser light having the same G wavelength $\lambda_G$ as that for the holographic recording of the hologram of the first object $O_1$, it causes object light $1_{2G}$ scattered by the second object $O_2$ to enter the second photosensitive material $11_{12G}$ for G. In the meantime, reference light beams $2_{2G}$ comprising parallel light, coherent with the object light $1_{2G}$ and coming from the same light source, are allowed to enter simultaneously the surface of the second photosensitive material $11_{12G}$ for G at the same angle of incidence θ as that for the reference light $2_{1G}$ so that the G elemental hologram $11_{12G}$ of the second object $O_2$ is holographically recorded in the second photosensitive material $11_{12G}$ for G.

Figure 20C:
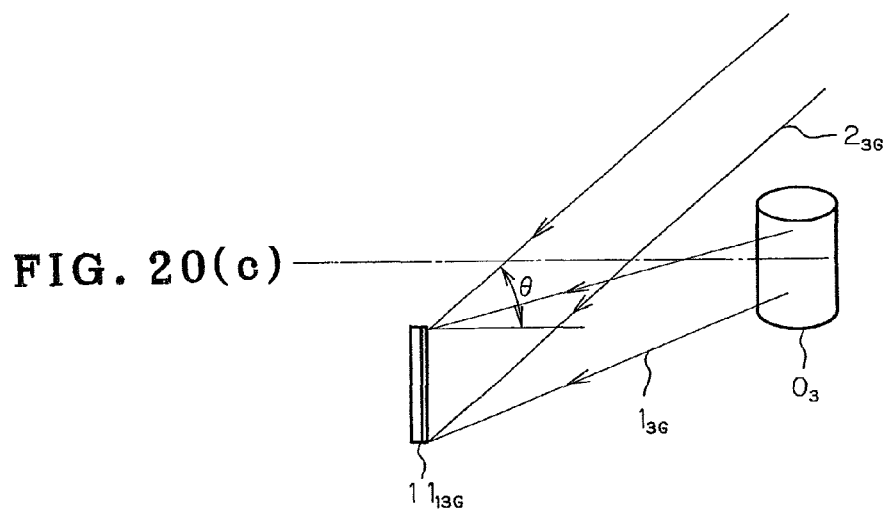

Again likewise, as depicted in FIG. 20(c), the third hologram photosensitive material $11_{13G}$ for G having sensitivity to the wavelength $\lambda_G$ for G is located, facing the third object $O_3$ to be recorded in the third image. And then, as the third object $O_3$ is illuminated by laser light having the same wavelength $\lambda_G$ for G as that for the holographic recording of the hologram of the first $O_1$, and the second object $O_2$, it causes object light $1_{13R}$ scattered by the third object $O_3$ to enter the third photosensitive material $11_{13G}$ for G. In the meantime, reference light $2_{3G}$ comprising parallel light, coherent with the object light $1_{3R}$ and coming from the same light source, is allowed to enter simultaneously the surface of the third photosensitive material $11_{13G}$ for G at the same angle of incidence θ as that for the reference light $2_{1G}$, $2_{2G}$ so that the G elemental hologram $11_{13G}$ of the third object $O_3$ is holographically recorded in the third photosensitive material $11_{13G}$ for G.

The first, second and third photosensitive materials $11_{11G}$, $11_{12G}$ and $11_{13G}$ for G, with different holograms holographically recorded in them as described above, are developed and bleached into the elemental holograms $11_{11G}$, $11_{12G}$ and $11_{13G}$ for G.

Figure 21A:
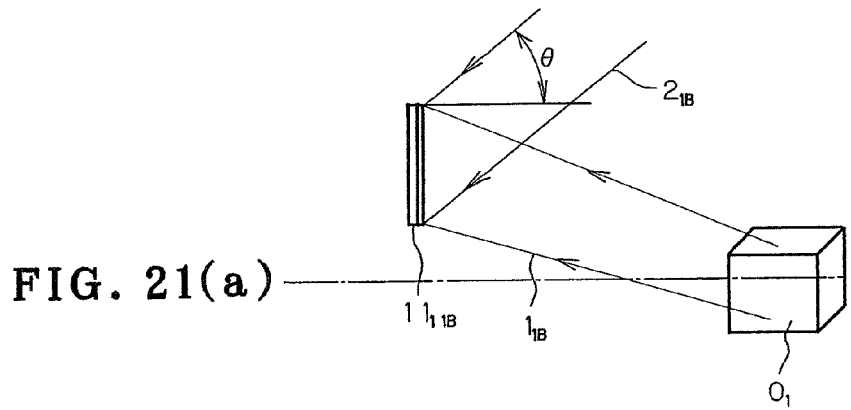
FIG. 21 is illustrative of one layout for holographically recording a plurality of elemental holograms forming part of the first-stage H1 hologram for B at the time when a full-color multi-image type hologram with one image changing over to another is fabricated on the basis of the invention.
Figure 21B:
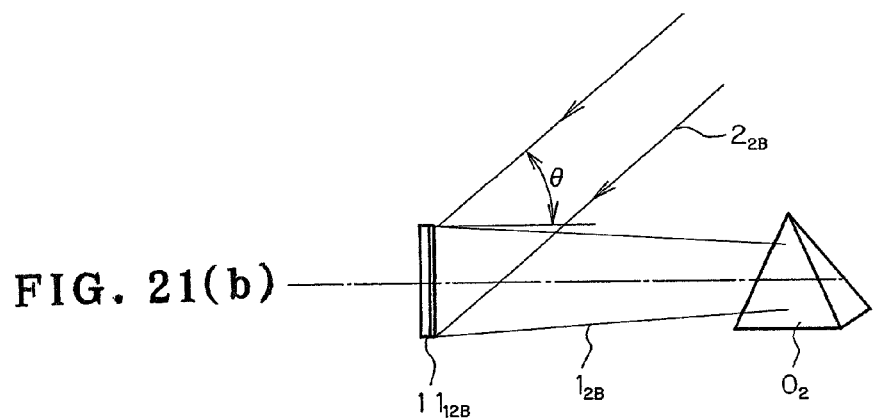
Figure 21C:
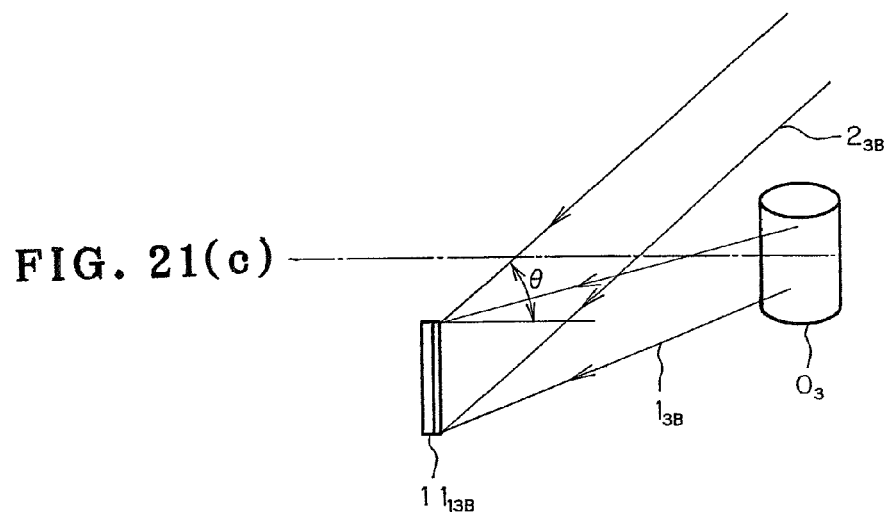

Further, the holographic recording of a plurality of elemental holograms $11_{11B}$, $11_{12B}$ and $11_{13B}$ that form part of the H1 hologram $11_B$ for B is carried out as described above. The holographic recording layout to this end is depicted in FIG. 21, an explanation of which is left out because of being similar to those of FIGS. 19 and 20. However, laser light having a wavelength of 476.5 nm as an example is used as the B-specific wavelength $\alpha_B$; the first, second and third photosensitive materials $11_{11B}$, $11_{12B}$ and $11_{13B}$ for B having sensitivity to the wavelength $\alpha_B$ for B are used; and object light $1_{1B}$, $1_{2B}$ and $1_{3B}$ are mutually interfered with reference light $2_{1B}$, $2_{2B}$ and $2_{3B}$ for the holographic recording of the B elemental hologram $11_{11B}$ of the first object $O_1$, the B elemental hologram $11_{12B}$ of the second object $O_2$ and the B elemental hologram $11_{13B}$ of the third object $O_3$. And then, the first, second and third photosensitive materials $11_{11B}$, $11_{12B}$ and $11_{13B}$ with different holograms holographically recorded in them are developed and bleached into the elemental holograms $11_{11B}$, $11_{12B}$ and $11_{13B}$ for B.

In the example here, too, any or all of the first $O_1$, the second $O_2$ and the third object $O_3$ recorded in $11_{11R}$-$11_{13R}$; $11_{11G}$-$11_{13G}$; and $11_{11B}$-$11_{13B}$ may be images reconstructed from a computer-generated hologram (CGH), as in FIG. 9.

Figure 22:
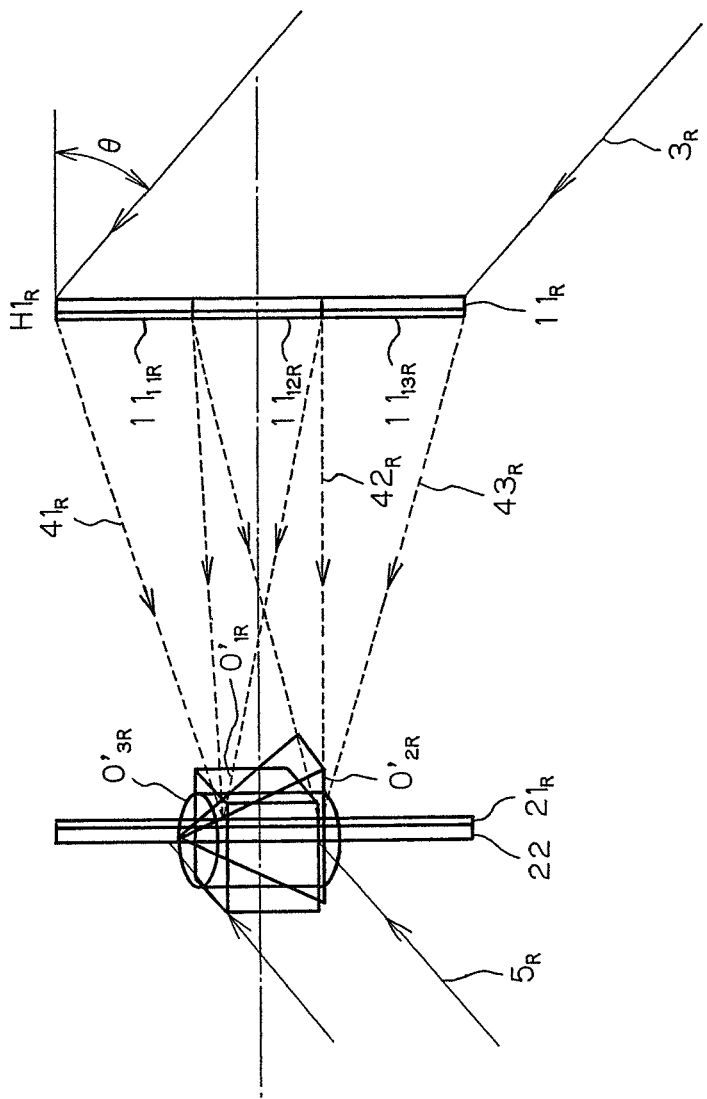
FIG. 22 is illustrative of one layout for holographically recording the second-stage H2 hologram for R.
Figure 23:
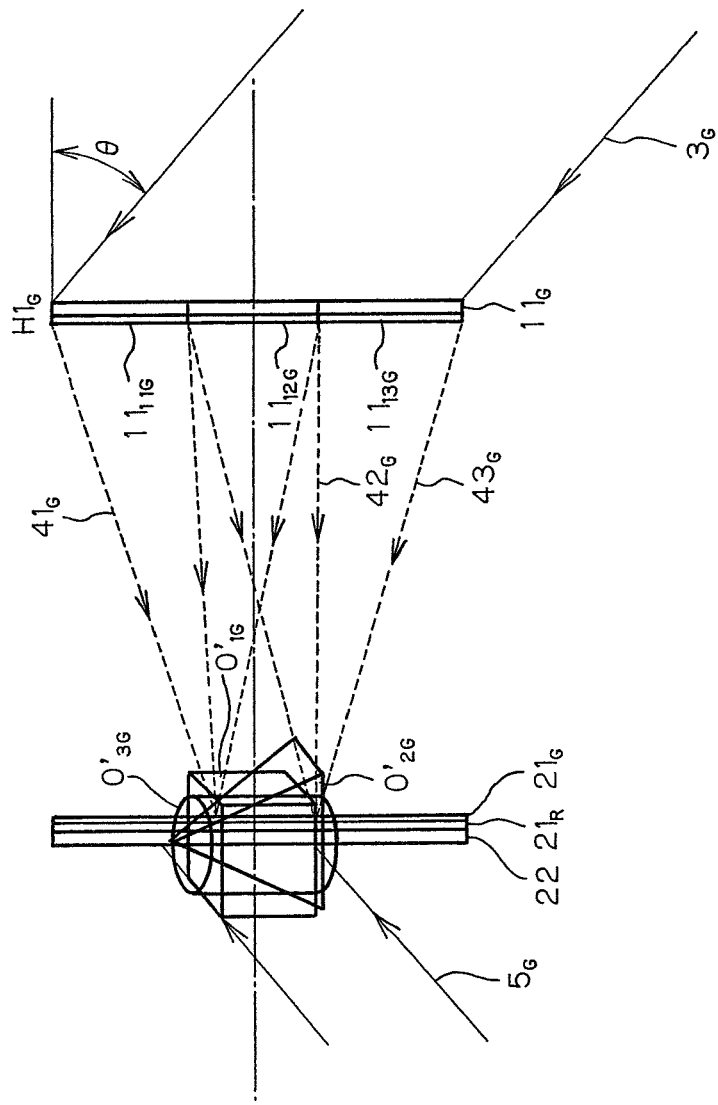
FIG. 23 is illustrative of one layout for holographically recording the second-stage H2 hologram for G.
Figure 24:
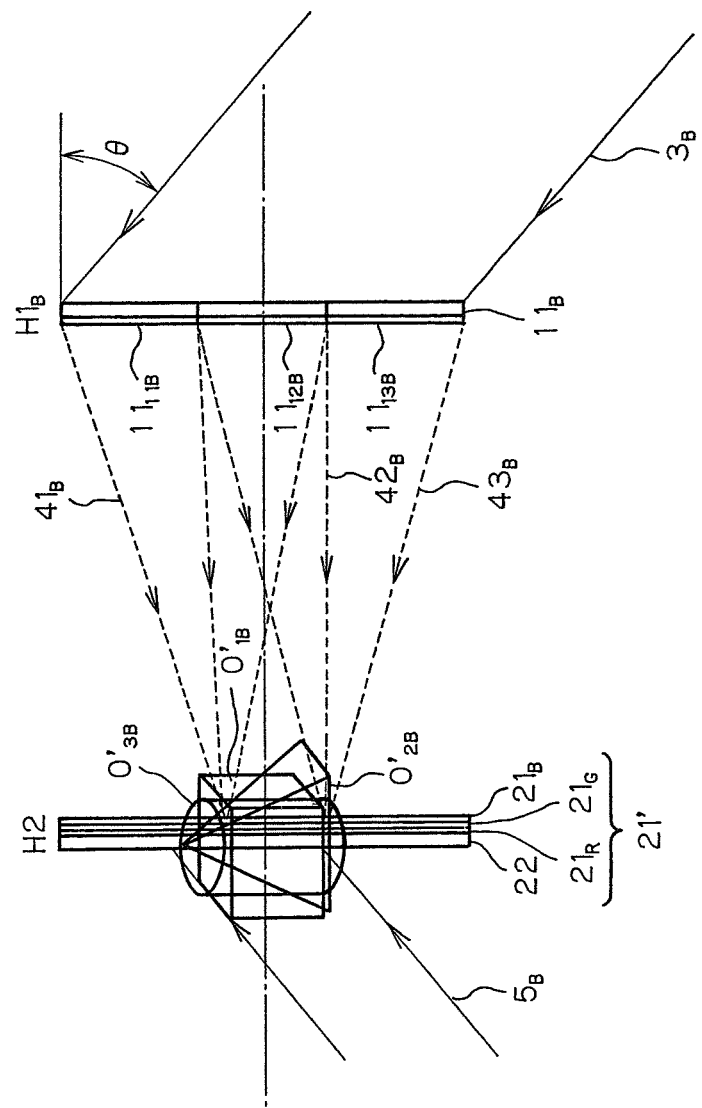
FIG. 24 is illustrative of one layout for holographically recording the second-stage H2 hologram for B.

Then, as depicted in FIGS. 22, 23 and 24, a plurality of elemental holograms $11_{11R}$-$11_{13R}$ for R, a plurality of elemental holograms $11_{11G}$-$11_{13G}$ for G, and a plurality of elemental holograms $11_{11B}$-$11_{13B}$ for B are imposed side by side in such a way as to be adjacent to one another (FIGS. 14 and 16), as is the case with the monochromatic elemental holograms $11_{11}$-$11_{13}$, into the H1 hologram $11_R$ for R, the H1 hologram $11_G$ for G, and the H1 hologram $11_B$ for B, respectively.

One example of how to fabricate the second-stage H2 hologram using the aforesaid H1 holograms $11_R$, $11_G$ and $11_B$ is now explained. First, as depicted in FIG. 22, reconstructing light $3_R$ of a wavelength $\lambda_R$ that travels in a direction opposite to that taken by the reference light $2_{1R}$, $2_{2R}$ and $2_{3R}$ applied to the holographic recording of the elemental holograms $11_{11R}$, $11_{12R}$ and $11_{13R}$ for R is allowed to enter the H1 hologram $11_R$, wherein the elemental holograms $11_{11R}$, $11_{12R}$ and $11_{13R}$ for R are lined up side by side, from its side that faces away from the holographic recording reference light $2_{1R}$, $2_{2R}$ and $2_{3R}$ applied to the holographic recording of the elemental holograms $11_{11R}$, $11_{12R}$ and $11_{13R}$ for R, whereupon the R-component images $O_{1R}'$, $O_{2R}'$ and $O_{3R}'$ of the first, second and third objects $O_1$, $O_2$ and $O_3$ are reconstructed and formed by diffracted light $4_{1R}$, $4_{2R}$ and $4_{3R}$ from the elemental holograms $11_{11R}$, $11_{12R}$ and $11_{13R}$ at the same positions of the H1 hologram $11_R$ surface as the relative positions of the objects $O_{1R}$, $O_{2R}$ and $O_{3R}$ at the time of holographic recording. If the positions of the first, second and third objects $O_1$, $O_2$ and $O_3$ overlap spatially, the images $O_{1R}'$, $O_{2R}'$ and $O_{3R}'$ are formed in a spatially overlapping way, too. The photosensitive material $21_R$ for recording the second-stage H2 hologram in R having sensitivity to the wavelength $\alpha_R$ for R, applied onto a transparent substrate 22, is located near the positions at which the R-component images $O_{1R}'$, $O_{2R}'$ and $O_{3R}'$ of the first, second and third objects $O_1$, $O_2$ and $O_3$ are formed, and reference light $5_R$ comprising parallel light of the same wavelength, coherent with the reconstructing light $3_R$ and coming from the same light source, is allowed to enter simultaneously that photosensitive material $21_R$ at any arbitrary angle of incidence from its side that faces, or faces way from, the diffracted light $4_{1R}$, $4_{2R}$ and $4_{3R}$ so that the second-stage H2 hologram of R is holographically recorded in the photosensitive material $21_R$.

Thereafter, the photosensitive material $21_R$ is post-treated to get rid of photosensitivity (in this example, the photopolymer is used as the photosensitive materials $21_R$, $21_G$ and $21_B$ for recording the second-stage H2 hologram and heating and ultraviolet irradiation are carried out for that post-treatment after holographic recording). Onto that, as depicted in FIG. 23, the photosensitive material $21_G$ for recording the second-stage H2 hologram in G having sensitivity to the G wavelength $\lambda_G$ is applied, and the transparent substrate 22 is located at the same position as the relative position of FIG. 22. Then, the H1 hologram $11_G$ wherein the elemental holograms $11_{11G}$, $11_{12G}$ and $11_{13G}$ for G are lined up side by side in place of the H1 hologram $11_R$ for R of FIG. 22 is located at the same position. Likewise, the reconstructing light $3_G$ of wavelength $\lambda_G$ that travels in a direction opposite to that taken by the holographic recording reference light $2_{1G}$, $2_{2G}$ and $2_{3G}$ is allowed to enter the H1 hologram $11_G$ for G from its side that faces away from the holographic recording reference light $2_{1G}$, $2_{2G}$ and $2_{3G}$ applied to the holographic recording of the elemental holograms $11_{11G}$, $11_{12G}$ and $11_{13G}$ for G, whereupon the G-component images $O_{1G}'$, $O_{2G}'$ and $O_{3G}'$ of the first, second and third $O_1$, $O_2$ and $O_3$ are reconstructed and formed by the diffracted light $4_{1G}$, $4_{2G}$ and $4_3$ from the elemental holograms $11_{11G}$, $11_{12G}$ and $11_{13G}$ on the same position of the H1 hologram $11_G$ surface for G as the relative position of the objects $O_1$, $O_2$ and $O_3$ upon holographic recording. The photosensitive material $21_G$ for recording the second-stage H2 hologram in G applied onto the transparent substrate 22 is positioned near these G-component images $O_{1G}'$, $O_{2G}'$ and $O_{3G}'$, and reference light $5_G$ comprising parallel light of the same wavelength, coherent with the reconstructing light $3_G$ and coming from the same light source, is allowed to enter simultaneously the photosensitive material $21_G$ in the same direction and at the same angle of incidence as is the case with the reference light $5_R$ for R, so that the second-stage H2 hologram for G is holographically recorded in the photosensitive material $21_G$.

Thereafter, the photosensitive material $21_G$ is post-treated to get rid of photosensitivity. Onto that, as depicted in FIG. 24, the photosensitive material $21_B$ for recording the second-stage H2 hologram in B having sensitivity to the wavelength $\lambda_B$ for B is applied, and the transparent substrate 22 is located at the same position as the relative position of FIGS. 22 and 23. Then, the H1 hologram $11_B$ for B wherein the elemental holograms $11_{11B}$, $11_{12B}$ and $11_{13B}$ for B are imposed side by side in place of the H1 hologram $11_G$ for G of FIG. 23 is located at the same position. Likewise, the reconstructing light $3_B$ of wavelength $\lambda_B$ that travels in a direction opposite to that taken by the reference light $2_{1B}$, $2_{2B}$ and $2_{3B}$ applied to the holographic recording of the elemental holograms $11_{11B}$, $11_{12B}$ and $11_{13B}$ for B is allowed to enter the H1 hologram $11_B$ for B from its side that faces away from the holographic recording reference light $2_{1B}$, $2_{2B}$ and $2_{3B}$, whereupon the B-component images $O_{1B}'$, $O_{2B}'$ and $O_{3B}'$ of the first, second and third $O_1$, $O_2$ and $O_3$ are reconstructed and formed by the diffracted light $4_{1B}$, $4_{2B}$ and $4_{3B}$ from the elemental holograms $11_{11B}$, $11_{12B}$ and $11_{13B}$ on the same position of the H1 hologram $11_B$ surface for B as the relative position of the objects $O_1$, $O_2$ and $O_3$ upon holographic recording. The photosensitive material $21_B$ for recording the second-stage H2 hologram in B applied onto the transparent substrate 22 is positioned near these B-component images $O_{1B}'$, $O_{2B}'$ and $O_{3B}'$, and reference light $5_B$ comprising parallel light of the same wavelength, coherent with the reconstructing light $3_B$ and coming from the same light source, is allowed to enter simultaneously the photosensitive material $21_B$ in the same direction and at the same angle of incidence as is the case with the reference light $5_R$, $5_G$ for R, G, so that the second-stage H2 hologram for B is holographically recorded in the photosensitive material $21_B$.

Finally, the photosensitive material $21_B$ is likewise post-treated to get rid of photosensitivity, thereby obtaining a full-color H2 hologram 21' wherein the second-stage H2 hologram ($21_B$) for R, H2 hologram ($21_G$) for G and H2 hologram ($21_B$) for B are stacked on the transparent substrate 22 in order.

This full-color H2 hologram 21' works as already set forth with reference to FIG. 15 too. As reconstructing light 6 that travels in a direction opposite to that taken by the holographic recording reference light $5_R$, $5_G$, $5_B$ (white light here) enters the full-color H2 hologram 21' from its side that faces away from the holographic recording reference light $5_R$, $5_C$, $5_B$, it causes the three-color RGB images $O_1"$, $O_2"$ and $O_3"$ of the first, second and third objects $O_1$, $O_2$ and $O_3$ to be reconstructed by diffracted light 7 in an overlapping way, and the window 25 having the same size as that of the recording surface of the H1 hologram $11_R$, $11_G$, $11_B$ to be reconstructed at the original position of the H1 hologram $11_R$, $11_G$, $11_B$. And of the images $O_1"$, $O_2"$ and $O_3"$ of the first, second and third objects $O_1$, $O_2$ and $O_3$, the image $O_1"$ of the first object $O_1$ is reconstructed by the diffracted light component $7_1$ traveling toward the range $25_1$ corresponding to the first elemental holograms $11_{11R}$, $11_{12R}$ and $11_{13R}$ in the window 25; the image $O_2"$ of the second object $O_2$ is reconstructed by the diffracted light component $7_2$ traveling toward the range $25_2$ corresponding to the second elemental holograms $11_{12R}$, $11_{12G}$ and $11_{12B}$ in the window 25; and the image $O_3"$ of the third object $O_3$ is reconstructed by the diffracted light component $7_3$ traveling toward the range $25_3$ corresponding to the third elemental holograms $11_{13R}$, $11_{13G}$ and $11_{13B}$ in the window 25. Accordingly, when there is a viewer's eye E lying in the angle range $\alpha_1$ in FIG. 15 (the range $25_1$ in the window 25 defines an angle range subtended by a position on which the reference light $5_R$, $5_G$, $5_B$ for the H2 hologram 21 is incident), the full-color image $O_1"$ of the first object $O_1$ (cube) is seen near the H2 hologram 21 (21'); when the viewer's eye E lies in the angle range $\alpha_2$ (the range $25_2$ in the window 25 defines an angle range subtended by a position on which the reference light $5_R$, $5_G$, $5_B$ for the H2 hologram 21 (21') is incident), the full-color image $O_2"$ of the second object $O_2$ (triangular pyramid) is seen near the H2 hologram 21 (21'); and when the viewer's eye E lies in the angle range $\alpha_3$ (the range $25_3$ in the window 25 defines an angle range subtended by a position on which the reference light $5_R$, $5_G$, $5_B$ for the H2 hologram 21 (21') is incident), the full-color image $O_3"$ of the third object $O_3$ (cylinder) is seen near the H2 hologram 21 (21'): depending on the viewing direction, the image under observation changes between the full-color images $O_1"$, $O_2"$ and $O_3"$. In addition, the image $O_1"$, $O_2"$, $O_3"$ of each object is a three-dimensional (3D) one that changes in order depending on the viewing direction.

While the H1 holograms $11_R$, $11_G$ and $11_B$ are shown in FIGS. 22-24 as being recorded in the order of R, G and B, it is to be noted that they may be recorded in any desired order.

In the fabrication process for the full-color H2 hologram 21' as described above, while the photosensitive materials $21_R$, $21_G$ and $21_B$ for recording hologram in R, G and B are stacked in order on the common transparent substrate 22, the holograms of the corresponding colors are holographically recorded in order. In this connection, it is to be noted that a single photosensitive material sensitive to the three colors R, G and B may be sequentially or simultaneously exposed to holographic light. Simultaneous exposure, however, requires simultaneous reconstruction of images from the stacked H1 holograms $11_R$, $11_G$ and $11_B$. Note here that a hologram containing a lot more noise is recorded as the H2 hologram, because each of the H1 holograms $11_R$, $11_G$ and $11_B$ is of the transmission type that don't have high wavelength selectivity and has chromatic dispersion. However, if the H1 holograms $11_R$, $11_G$ and $11_B$ are each of a volume-cum-reflection type, such noise can be reduced.

Instead of stacking the photosensitive materials $21_R$, $21_G$ and $21_B$ for recording hologram in R, G and B in order on the common transparent substrate 22 while the holograms of corresponding colors are exposed in order to holographic light, while the photosensitive materials $21_R$, $21_G$ and $21_B$ for recording hologram are replaced in order, the H2 holograms of corresponding colors may be holographically recorded, and the thus holographically recorded three R, G and B H2 holograms may be stacked and integrated together into the full-color H2 hologram 21'. In this case, the relative position between the holograms is displaced by the thickness of each hologram in association with stacking operation, and there is correspondingly a displacement in the position of the reconstructed image of each color component. To compensate for this, the distance between each H2 hologram and the H1 hologram $11_R$, $11_G$, $11_B$ must be adjusted for each color upon holographic recording.

For the elemental holograms $11_{11R}$, $11_{12R}$ and $11_{13R}$; $11_{11G}$, $11_{12G}$ and $11_{13G}$; and $11_{11B}$, $11_{12B}$ and $11_{13B}$ that form the H1 holograms $11_R$, $11_G$ and $11_B$, too, different photosensitive materials $11_{11R}$, $11_{11G}$ and $11_{11B}$; $11_{12R}$, $11_{12G}$ and $11_{12B}$; and $11_{13R}$, $11_{13G}$ and $11_{13B}$ are used for each color. However, it is understood that they may be multi-recorded in a single photosensitive material having sensitivities to the three R, G and B colors (in this case, three photosensitive materials are used in lieu of nine). Note here that a hologram containing a lot more noise is recorded as the H2 hologram, because each of the H1 holograms $11_R$, $11_G$ and $11_B$ is of the transmission type that don't have high wavelength selectivity and has chromatic dispersion. However, if the H1 holograms $11_R$, $11_G$ and $11_B$ are each a volume type reflection hologram, such noise can be reduced.

It is noted that in the fabrication of the full-color multi-image type hologram of FIGS. 19-24, too, a plurality of elemental holograms $11_{11R}$, $11_{12R}$ and $11_{13R}$; $11_{11G}$, $11_{12G}$ and $11_{13G}$; and $11_{11B}$, $11_{12B}$ and $11_{13B}$ that form the H1 holograms $11_R$; $11_G$; and $11_B$ may be lined up side by side in such a way as to contact one another, as is the case with the monochromatic hologram. As already explained with reference to FIG. 16, however, they may be lined up side by side in such a way as to overlap one another or with a space between them. The angle dependency of the images from the H2 hologram 21' recorded from such H1 holograms $11_R$, $11_G$ and $11_B$ upon viewing is the same as described with reference to the monochromatic hologram.

Figure 25:
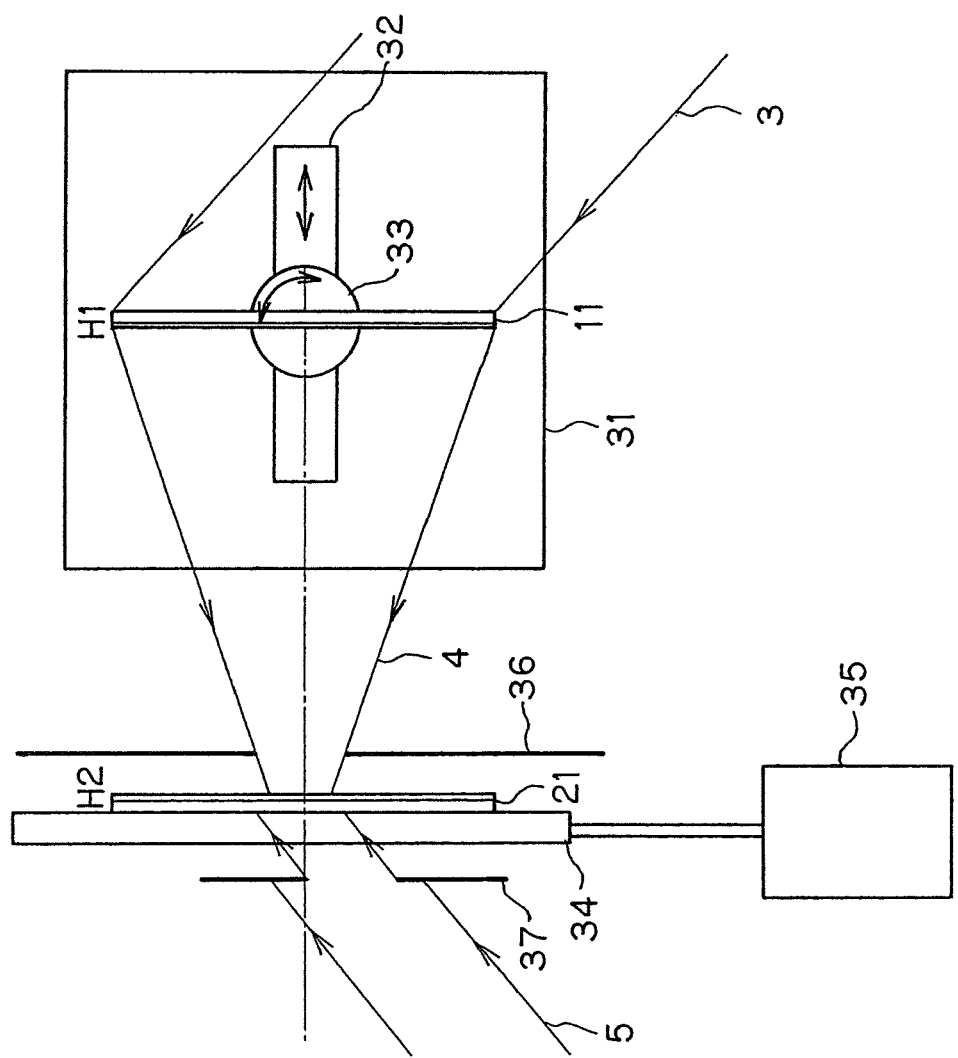
FIG. 25 is illustrative in construction of the first example of the recording system for the fabrication of a number of similar multi-recorded multi-image type holograms with one image changing over to another.

One exemplary construction of the recording system for the fabrication of most similar H2 holograms 21 with multiple similar H1 holograms 11 applied onto them is now set forth with reference to FIG. 25. The recording system comprises a master support table 31 on which the H1 hologram 11 is to be placed. On the master support table 31, an image-formation position movement adjusting table 32 is set to adjust the position in the horizontal one-dimensional direction of the sheet. On that, there is a rotation control table 33 provided, to which the H1 hologram 11 is to be attached. In front of the direction of movement of the image-formation position movement adjusting table 32, there is a table 34 supporting photosensitive material provided, which is formed of a transparent plate to which the photosensitive material 21 for recording H2 hologram is to be attached. That table 34 supporting photosensitive material is linked to a biaxial stepper mechanism 35 for forwarding it at a given pitch in two orthogonal directions in its plane. In front of the master support plate 31 for the photosensitive material 21 for recording H2 hologram attached to the photosensitive material support table 34, there is a diffracted light limiting mask 36 provided for confining diffracted light 4 from the H1 hologram 11 attached to the master support table 31 to within an aperture corresponding to a recording area, and on the back side of the photosensitive material support table 34, there is a reference light limiting mask 37 provided, which has an aperture corresponding to that in the diffracted light limiting mask 36.

When the H2 hologram 21 is fabricated from the H1 hologram 11, the H1 hologram 11 is first attached to the rotation control table 33 in the master support table 31. Then, the position of the image-formation position movement adjusting table 32 is adjusted such that reconstructed images $O_1'$, $O_2'$ and $O_3'$ from the H1 hologram 11 are formed near the surface of the photosensitive material support table 34. Then, the angle of rotation of the rotation control table 33 is controlled such that the reconstructed images $O_1'$, $O_2'$ and $O_3'$ come within the aperture in the diffracted light limiting mask 36. After the control of such one-dimensional direction position and the angle of rotation, a photosensitive material 21 for recording H2 hologram is attached onto the photosensitive material support table 34, and the biaxial stepping mechanism 35 is adjusted to determine the starting position for recording the photosensitive material 21 in the photosensitive material 21 for recording H2 hologram. In that state, as reconstructing light 3 is allowed to enter the H1 hologram 11 at a predetermined angle of incidence, and reference light 5 is allowed to enter through the aperture in the diffracted light limiting mask 36 on the back side of the photosensitive material support table 34, it causes diffracted light 4 to be given out of the H1 hologram 11, which is in turn incident on an area of the photosensitive material 21 for recording H2 hologram corresponding to the aperture in the mask 36 limiting the diffracting light through the diffracted light limiting mask 36. In that area, the diffracted light interferes with the reference light 5 for holographic recording of one H2 hologram. Then, the reconstructing light 3 and reference light 5 are cut off, and the biaxial stepping mechanism 35 is actuated to forward the photosensitive material support table 34 by one frame in a predetermined direction to dislocate the areas of the photosensitive material 21 for recording H2 hologram corresponding in the apertures in the masks 36 and 37, after which a similar H2 hologram is holographically recorded in a new area in the same way as described above. Subsequently, the biaxial stepper mechanism 34 is forwarded step by step in order in the two orthogonal directions in its plane, so that identical, specific H2 holograms are holographically multi-recorded onto the photosensitive material 21 for recording H2 hologram. After holographic multi-recording, the photosensitive material 21 for recording H2 hologram is taken off and post-treated to obtain a volume hologram with a number of multi-image type holograms.

It is noted that the reason the angle of rotation of the H1 hologram 11 must be adjusted at the rotation control table 33 is that even with the incidence of the reconstructing light 3 at the same angle of incidence $\theta$ as that for the recording reference light $2_1$-$2_3$, the reconstructed images $O_1'$, $O_2'$ and $O_3'$ are often not formed at the original relative positions of the objects $O_1$, $O_2$ and $O_3$ due to the shrinkage of the photosensitive material 11 for recording H1 hologram. For relocation of them to the original positions, the angle of rotation of the H1 hologram 11 must be adjusted.

The recording system for the fabrication of the multi-recorded H2 hologram 21 of FIG. 25 has been described with reference to the fabrication by the two-step process of the monochromatic multi-image type hologram of FIG. 25. However, it would be evident to those skilled in the art that the recording system here may equally be applied to the fabrication by the two-step process of the full-color multi-image type holograms of FIGS. 10-12 and FIGS. 22-24, too.

The results of estimation of the color reproducibility and field of view of the full-color hologram fabricated by such a two-step process as described above are now explained with reference to a comparison with those of the full-color hologram fabricated by a prior art process (Patent Publication 1).

Measurement of the color reproducibility and angle dependence of field of view of the fabricated hologram was done using a hologram estimation system set forth in Patent Publication 2. To enable the angle of incidence of illumination light on a hologram and the viewing angle of diffracted light from hologram to be measured at varying conditions, the hologram estimation system here is built up of a sample table which is capable of holding the sample to be estimated and positioned such that the held sample is positioned substantially on a reference axial line; a light source device adapted to illuminate the sample table and the hologram held on it, specifically a laser having a given wavelength; and the instrument for measuring information about diffracted light from the hologram is held on the sample plate, specifically a color luminance meter, wherein at least two of them are rotatable about the aforesaid reference axial line. By rotating one of the sample table and the light source device to a desired angle position relative to another, the angle of incidence of light on any desired site of the hologram can be set as desired. Also, by rotating one of the sample table and the measuring instrument to a desired angle position relative to another, the viewing angle can be set as desired and, hence, the angle of incidence of light on, and the viewing angle of, any desired site of the hologram in the longitudinal and lateral directions can be easily determined as desired, so that information about the color, brightness, etc. of the hologram can be measured and angle changes can be easily determined as well.

Referring further to how to estimate color reproducibility, the correction of a full-color Lippmann hologram for a color tone is implemented by adjustment of the exposure rate of laser. In general, however, the reproduction of white color from the original is not easy. For the correction of measurement data, therefore, only luminance is corrected, leaving the chromaticity of white uncorrected. A stereoscopic model (object) and a hologram differ largely in their luminance ratio depending on angle: the correction of the original for luminance is implemented on the basis of the white luminance of the original, and the correction of the hologram for luminance is implemented on the basis of the luminance of the white (N9.5) reproduced in the hologram.

Specific reference is now made to how to correct luminance, how to work out the coordinates L*, a*, b* for CIE1976 (L*a*b*), and how to estimate color reproducibility.

From the results of measurement of a standard white surface, a coefficient luminance compensation $K_Y$ is calculated out according to the following equation (1):

$$K_Y = Y_W / Y_{Wi} \quad (1)$$

Here $K_Y$ is the correction coefficient for converting luminance into a reflectance; $Y_W$ is the stimulus value according to JIS Z8722 (with a spectral stereoscopic reflectance of 0.9) for the standard white surface under a standard light source; and $Y_{Wi}$ is the luminance Y of the white color of the original or the luminance Y of the white color reproduced in the hologram.

From the thus calculated luminance correction coefficient $K_Y$, tristimulus values X, Y, Z are worked out according to the following equations (2):

$$X = X_i \cdot K_Y$$

$$Y = Y_i \cdot K_Y$$

$$Z = Z_i \cdot K_Y \quad (2)$$

Here $X_i$, $Y_i$ and $Z_i$ are tristimulus value measurements.

From the tristimulus values corrected for luminance, coordinates L*, a*, b* are figured out according to the following equations (3):

$$L^* = 116(Y/Y_n)^{1/3} - 16$$

$$a^* = 500\{X/X_n\}^{1/3} - (Y/Y_n)^{1/3}\}$$

$$b^* = 200\{Y/Y_n\}^{1/3} - (Z/Z_n)^{1/3}\} \quad (3)$$

Here $X_n$, $Y_n$ and $Z_n$ are the tristimulus values of a perfect scattering surface under a standard light source. If the standard light source here is equivalent to D50, $X_n$, $Y_n$ and $Z_n$ are supposed to be equal to 96.42, 100.00 and 82.51, respectively.

Based on the L*, a*, b* worked out according to equations (3), a brightness difference ΔL*, a chroma saturation difference ΔC* and a hue difference ΔH* are found from the following equations (4):

$$\Delta L^* = L^*_h - L^*_o$$

$$\Delta C^* = (a^{*2}_h + b^{*2}_h)^{1/2} - (a^{*2}_o + b^{*2}_o)^{1/2}$$

$$\Delta H^* = \tan^{-1}(b^*_h/a^*_h) - \tan^{-1}(b^*_o/a^*_o)$$

Here $L^*_h$, $a^*_h$ and $b^*_h$ are the values of L*, a* and b* for the hologram, respectively, and L*o, a*o and b*o are the values of L*, a* and b* for the original, respectively.

For the original to be recorded in the hologram, an arrangement with five color chips or white (N9.5), red (5R5/14), yellow (5Y8/12), green (5G5/10) and blue (5PB4/10) chips lined up side by side was used. Note here that the bracketed notations are pursuant to Munsell notation. This was fabricated by the two-step process of the invention into a full-color hologram (for the purpose of estimation, however, the recording area of the photosensitive material for recording H1 hologram was left un-divided at the time of H1 hologram fabrication). For the purpose of comparison, on the other hand, the original was fabricated by Denisyuk's method into a full-color hologram. Each full-color hologram was used as a master to make a sample hologram by a hologram copying process. Note here that when copying the full-color hologram fabricated from the original by Denisyuk's method, the angle of incidence of copying illumination light was chosen in such a way as to limit the field of vision by the method set forth in Patent Publication 1. The designed angle of incidence of reconstructing light on the copied sample hologram was set to a vertically upward 52° in the case of the inventive two-step process, and to a vertically upward 35° in the case of Denisyuk's method with the field of vision limited by the method set forth in Patent Publication 1.

Figure 26A:
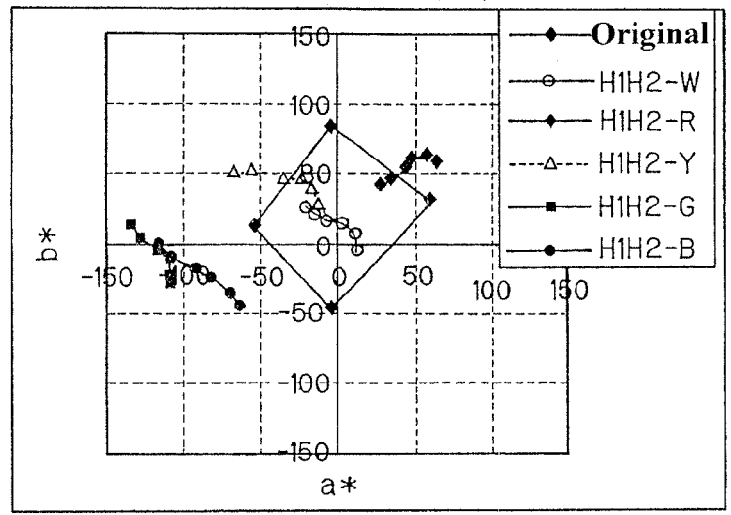
FIG. 26 is illustrative of the results of measuring the color reproducibility of a sample hologram copied from the full-color hologram of the invention.

FIG. 26 indicates the results of measuring the color reproducibility of a sample hologram copied by the hologram-copy method from the H2 full-color master hologram fabricated by the two-step process according to the invention: FIG. 26(a) is illustrative of the coordinate values a* and b* of diffracted light from hologram portions corresponding to the five color chips (H1H2-W (white), H1H2-R (red), H1H2-Y (yellow), H1H2-G (green) and H1H2-B (blue)) to a viewing angle of 0° at the time when the angle of incidence of reconstructing light varies from 44° to 67°, with the coordinate values a* and b* for the original being indicated, too.

Figure 26B:
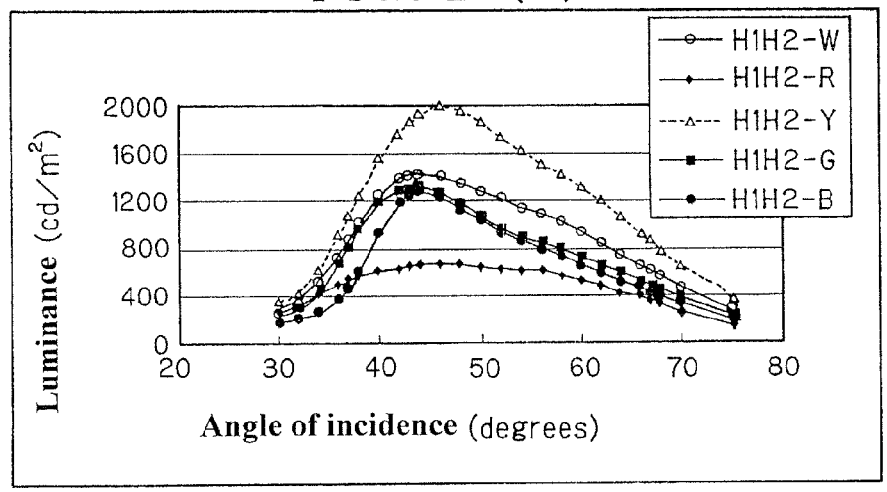

FIG. 26(b) is indicative of how the luminance value of diffracted light from hologram portions corresponding to the five color chips changes at the time when the angle of incidence light of reconstructing light varies at the position having a viewing angle of 0°.

Figure 26C:
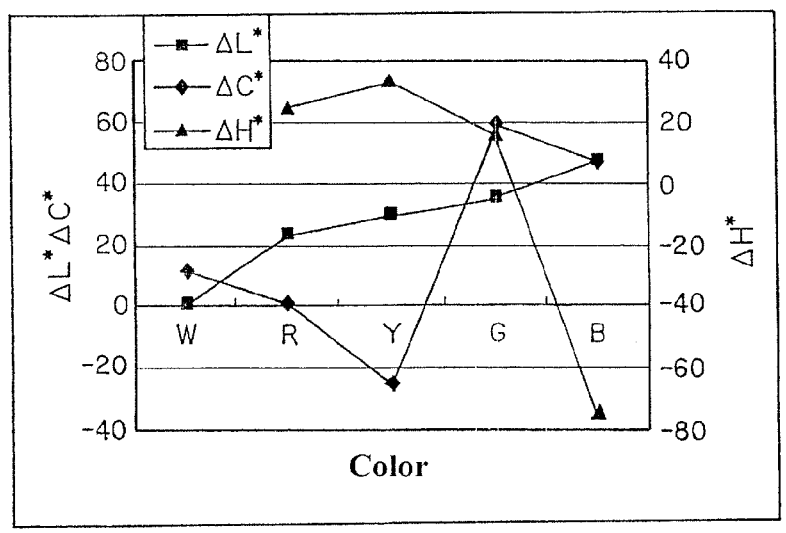

FIG. 26(c) is illustrative of the brightness difference ΔL*, saturation difference ΔC* and color tone difference ΔH* between the sample hologram and the original of each color chip at the angle of incidence of 52° for the reconstructing light and the viewing angle of 0°.

From FIGS. 26(a) and 26(b), it can be seen that although the inventive sample hologram does not significantly vary in terms of the reproduced color of each chip when the reconstructing light lies in the range of 44° to 67° with the design angle of incidence of 52° included in it, yet the luminance becomes highest at the angle of incidence of 44°, with the color reproduction range close to that at the design angle of incidence of 52°.

From FIG. 26(c), it can be seen that when the inventive sample hologram is corrected for luminance on the basis of white luminance, the brightness difference $\Delta L^*$ indicates that each color is higher than the original in brightness; $\Delta C^*$ indicates that yellow goes wrong; and the color tone difference $\Delta H^*$ indicates that blue is different from the original.

Figure 27A:
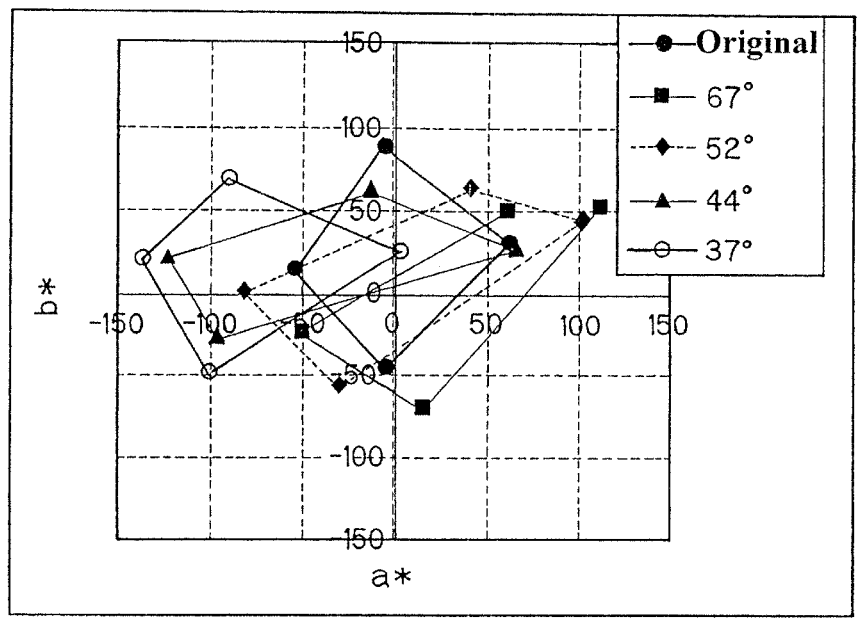
FIG. 27 is an a*b* chromaticity diagram illustrative of comparisons between the inventive full-color hologram and a comparative full-color hologram in terms of color reproducibility.
Figure 27B:
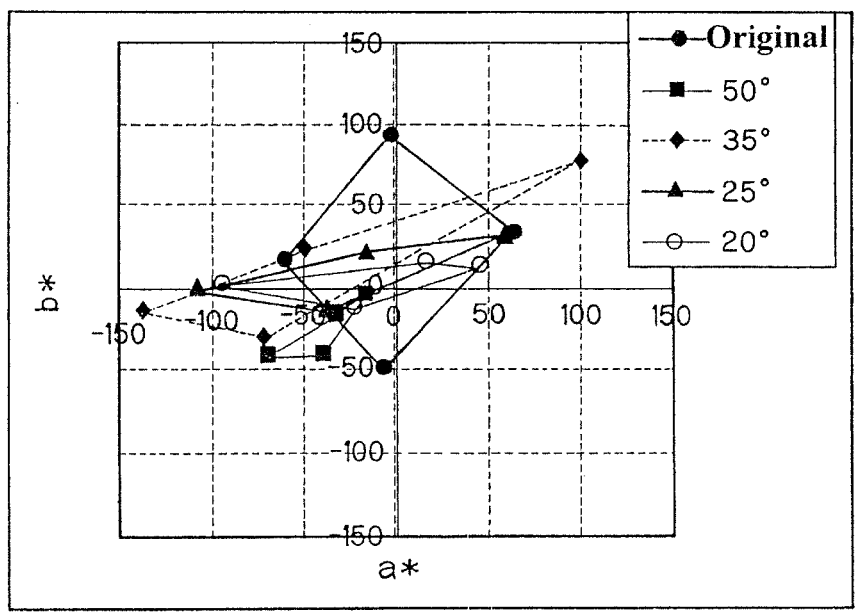

Two a*b* chromaticity diagrams with the angle of incidence of reconstructing light as a parameter are now given as FIG. 27 for the purpose of making comparisons between the color reproducibility of a full-color hologram fabricated by the two-step process according to the invention and that of a comparative full-color hologram copied from a hologram fabricated by Denisyuk's method with the field of vision limited by the method set forth in Patent Publication 1. FIG. 27(a) is the chromaticity diagram for the invention, and FIG. 27(b) is a comparison. The angle indicated in FIG. 27 is the angle of incidence of reconstructing light in the vertical direction, and the design angle of incidence is 52° for the invention, and 35° for the purpose of comparison.

From FIGS. 27(a) and 27(b), it can be seen that the color reproduction range for the design angle of incidence of 52° of the inventive sample hologram is approximate to that of the original and larger (wider) than that of the comparison. It is thus found that the color reproducibility of the full-color hologram fabricated by the two-step process according to the invention is much better than that of the comparison.

FIG. 28 is illustrative of the dependency of the white chip site of the original in the vertical (a) and the horizontal direction (b) between the full-color hologram fabricated by the two-step process of the invention and a comparative full-color hologram copied from a hologram fabricated by Denisyuk's method with the field of vision limited by the method of Patent Publication 1. The designed viewing angle here is 0° in both the vertical and the horizontal direction.

Figure 28A:
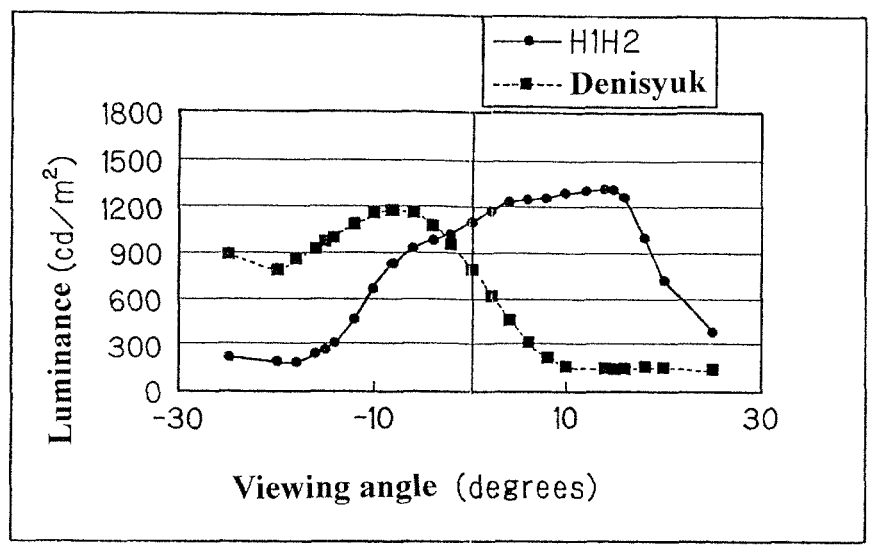
FIG. 28 is illustrative of the viewing angle dependency of the inventive full-color hologram, and a comparative full-color hologram.
Figure 28B:
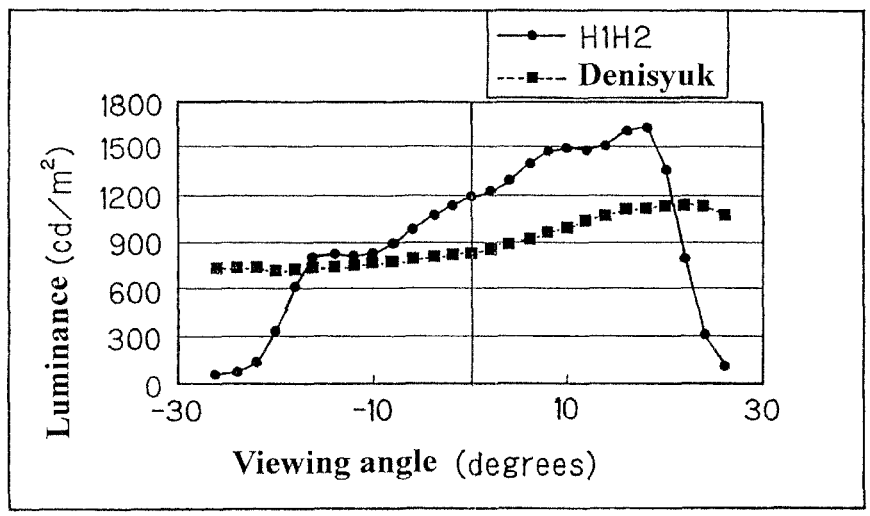

From FIGS. 28(a) and 28(b), it can be seen that the full-color hologram by the two-step process of the invention can have a viewing angle range limited in both the vertical and the horizontal direction, and its brightness at the designed viewing angle is higher than that of the comparative hologram.

Between the full-color hologram by the two-step process of the invention and the comparative hologram, there is a different luminance distribution profile of viewing angle dependency: the luminance distribution profile of the full-color hologram of the invention is broader in both the vertical and the horizontal direction near the design viewing angle of 0°, whereas that of the comparative hologram is flat in the horizontal direction, with a peak in the vertical direction. This is because there is a difference in the principles of limiting the viewing angle range (the field of vision) between the process of the invention and the comparative process.

Further, from the fact that the viewing angle dependency curve has a rectangular, flat, broad shape with the viewing angle falling sharply down at both ends, it is found that the full-color hologram by the two-step process of the invention is well fit for a multi-image type hologram with one image changing over to another.

Figure 29:
FIG. 29 is illustrative of one example of a series of moving scenes recorded in a plurality of sub-areas or element holograms.
Figure 30:
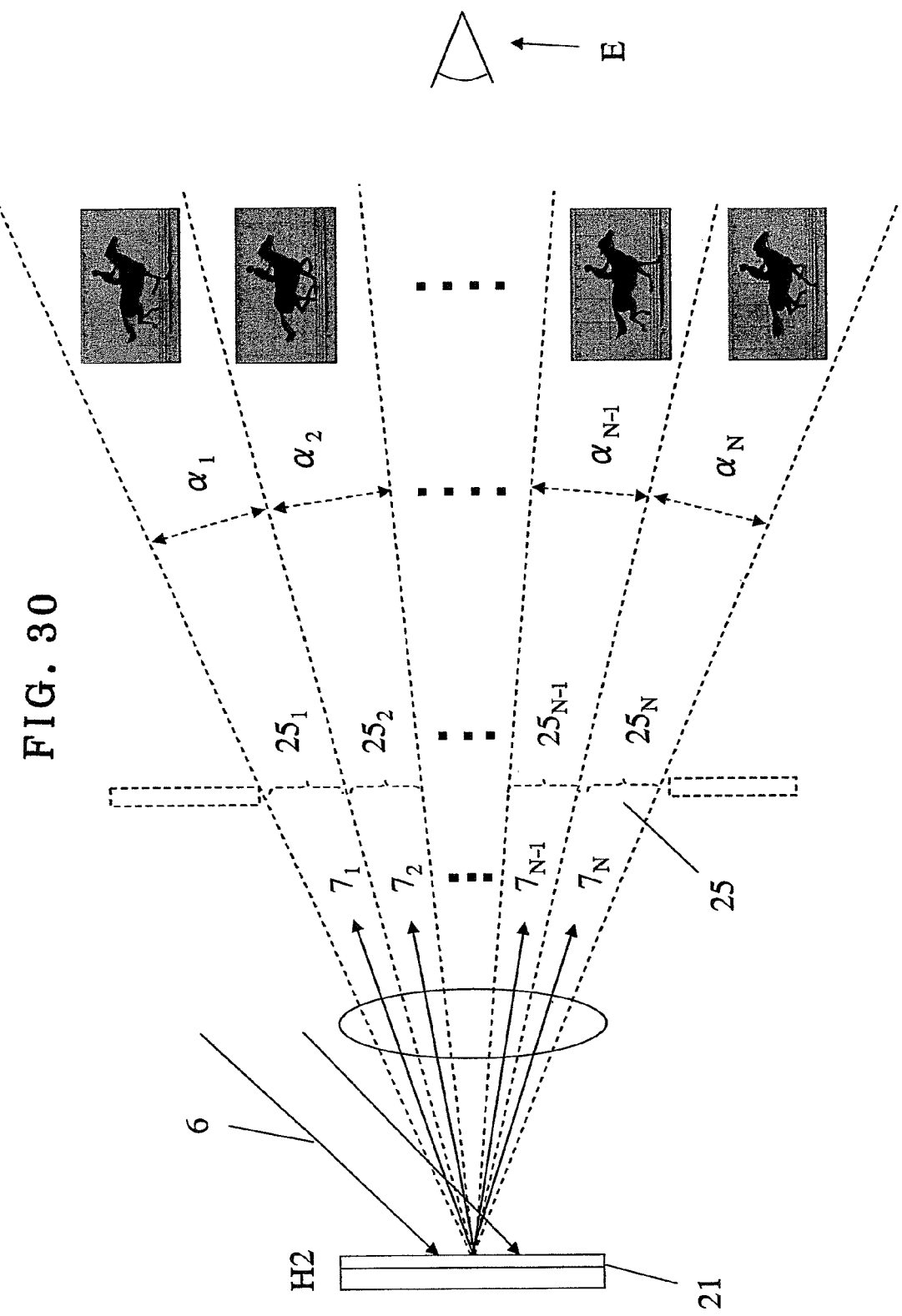
FIG. 30 is illustrative of why "moving picture" effects are obtainable from a multi-image type hologram fabricated using the H1 hologram of FIG. 29 having sub-areas or elemental holograms.

While the multi-image type hologram fabrication process of the invention and the multi-image type hologram fabricated by that process have been described with reference to several examples, it is to be noted that the invention is in no sense limited to them and so could be modified in various ways. In the invention, for instance, different objects (cube, triangular pyramid, circular cylinder) have been described as being recorded in the different sub-areas or elemental holograms of the H1 hologram; however, it is acceptable to record the same object in each sub-area or elemental hologram. Alternatively, a series of restlessly moving frames (scenes) the same person, animal or the like may be recorded. FIG. 29 is illustrative of one exemplary series of scenes, showing how a horse gallops off from the left to right of the upper row of frames, then from the left to right of the middle row, and then from the left to right of the lower row. As a series of such scenes are recorded in a plurality of sub-areas or elemental holograms of the H1 hologram from top to bottom, it allows a viewer to see them as if the horse galloped off, as depicted in FIG. 30, because the reconstructed images from the H2 hologram 21 change continuously while the viewer's eye E moves from top to bottom: there are "moving picture" effects achievable. Further, the full-color hologram of the invention may be designed such that the recorded object images are reconstructed on some images in full color, and on some images in monochrome. Still further, the multi-image type hologram of the invention may be used as a hologram rich in forgery preventive effect or aesthetic effect, and as an optical elemental or device as well.

What we claim is:

1. A method for fabricating a multi-image type hologram, said method comprising:
    dividing a hologram recording material into a plurality of sub-areas such that different objects to be displayed on different images are holographically recorded in the respective sub-areas, using reference light having an identical angle of incidence, thereby making a first-stage hologram; and simultaneously reconstructing images of said objects recorded in the sub-areas from the recorded first-stage hologram, such that a material for recording a second-stage hologram is located near the reconstructed object images to make a reflection or transmission type volume hologram,
    wherein the first-stage hologram and the second-stage hologram are recorded using a laser light having a same wavelength,
    wherein said objects recorded in the respective sub-areas of the recorded first-stage hologram are reconstructed using a laser light having a single wavelength that is a same as used for recording the objects,
    wherein said simultaneously reconstructed images are recorded in said second-stage hologram, and
    wherein an image of at least one object changes over to an image of at least one other object depending on a viewing direction.

2. A method according to claim 1, characterized in that at least one of the objects holographically recorded in the respective sub-areas of said hologram recording material is an image reconstructed from a computer-generated hologram.

3. A method according to claim 1, characterized in that a direction of incidence of the reference light upon recording the second-stage hologram is determined such that when said reference light is projected onto a surface of the first-stage hologram, said direction of incidence is substantially parallel with a direction of division of the first-stage hologram into the plurality of sub-areas.

4. A method according to claim 1, characterized in that a silver halide photosensitive material for the first-stage hologram is used as the recording material for the first-stage hologram, and a photopolymer is used as the recording material for recording the second-stage hologram.

5. A method according to claim 1, characterized in that substantially parallel light is used as the reference light used for recording the first- and second-stage holograms.

6. A method according to claim 1, characterized in that when images of the objects recorded in the respective sub-areas or elemental holograms are simultaneously reconstructed from the first-stage hologram for recording said object images as a reflection or transmission type volume hologram, the first-stage hologram is supported in such a way as to be adjustable in position in a direction toward the material for recording the second-stage hologram and in angle with respect to the reconstructing light.

7. A method according to claim 1, characterized in that said material for recording the second-stage hologram is supported in such a way as to be forwarded step by step in two orthogonal directions in a plane thereof with respect to the first-stage hologram, and multi-image type holograms are multi-recorded in each step-by-step forwarding area of said second-stage hologram recording material.

8. The method according to claim 1, wherein each sub-area is disposed in a separate region of the first-stage hologram, and the separate regions do not substantially overlap with one another.

9. The method according to claim 1, wherein each of the objects to be displayed on different images has a different physical shape.

10. A method for fabricating a full-color multi-image type hologram, said method comprising:
   dividing a plurality of hologram recording materials for different colors into a plurality of sub-areas in such a way as to correspond to one another such that different objects to be displayed on different images are holographically recorded in the respective sub-areas at different color wavelengths for each hologram recording material, using reference light having an identical angle of incidence, thereby making a plurality of first-stage holograms; and simultaneously reconstructing images of the objects recorded in the respective sub-areas and having corresponding color components from each of the recorded first-stage holograms, such that a material for recording a second-stage hologram is located near the reconstructed object images to make a reflection or transmission type volume hologram,
   wherein the first-stage holograms and the second-stage hologram are recorded using a laser light having a same wavelength, and
   wherein an image of at least one object changes over to an image of at least one other object depending on a viewing direction.

11. A method according to claim 10, characterized in that at least one of the objects holographically recorded in the respective sub-areas of each of said plurality of hologram recording materials for different colors is an image reconstructed from a computer-generated hologram capable of reconstructing a full-color image.

12. A method according to claim 10, characterized in that the object images recorded in the respective sub-areas and having corresponding color components are simultaneously reconstructed in order from the plurality of first-stage holograms, and a plurality of materials for recording the second-stage hologram are located in order near the reconstructed object images to make a reflection or transmission type volume hologram.

13. A method according to claim 12, characterized in that while the materials for recording the second-stage hologram in different colors are stacked in order, the object images having different color components are reconstructed in order from the plurality of first-stage holograms to record said object images in order in the stacked materials for recording the second-stage hologram.

14. A method for fabricating a multi-image type hologram, said method comprising:
   holographically recording different objects to be displayed on different images in a plurality of recording materials for an elemental hologram, using reference light having an identical angle of incidence, such that a plurality of elemental holograms are imposed side by side into a first-stage hologram; and simultaneously reconstructing images of the objects recorded in the respective elemental holograms from said first-stage hologram such that a second-stage hologram recording material is located near the thus reconstructed object images to make a reflection or transmission type volume hologram,
   wherein the first-stage hologram and the second-stage hologram are recorded using a laser light having a same wavelength, and
   wherein an image of at least one object changes over to an image of at least one other object depending on a viewing direction.

15. A method according to claim 14, characterized in that at least one of the objects holographically recorded in the respective elemental holograms of said recording materials for the elemental hologram is an image reconstructed from a computer-generated hologram.

16. A method according to claim 14, characterized in that a direction of incidence of the reference light upon recording the second-stage hologram is determined such that when said reference light is projected onto a surface of the first-stage hologram, said direction of incidence is substantially parallel with a direction of lining-up of said plurality of elemental holograms of the first-stage hologram.

17. A method according to claim 14, characterized in that in a side-by-side arrangement of the plurality of elemental holograms in the first-stage hologram, the elemental holograms are imposed in such a way as to overlap one another.

18. A method according to claim 14, characterized in that a silver halide photosensitive material is used as the material for recording the first-stage hologram, and a photopolymer is used as the material for recording the second-stage hologram.

19. A method according to claim 14, characterized in that substantially parallel light is used as the reference light used for recording the first- and second-stage holograms.

20. A method for fabricating a full-color multi-image hologram, said method comprising:
   providing a plurality of materials for recording elemental holograms for different colors; holographically recording different objects to be displayed on different images in the plurality of materials for recording elemental holograms for each of a plurality of color wavelengths, using reference light having an identical angle of incidence, such that a plurality of elemental holograms are imposed side by side into a first-stage hologram for each color; and simultaneously reconstructing images of the objects recorded in the respective elemental holograms and having corresponding color components from said first-stage hologram such that a material for recording a second-stage hologram is located near the reconstructed object images to make a reflection or transmission type volume hologram,
   wherein the first-stage hologram and the second-stage hologram are recorded using a laser light having a same wavelength, and
   wherein an image of at least one object changes over to an image of at least one other object depending on a viewing direction.

21. A method according to claim 20, characterized in that at least one of the objects holographically recorded in the respective elemental holograms of each of said plurality of materials for recording elemental holograms in different colors is an image reconstructed from a computer-generated hologram capable of reconstructing a full-color image.

22. A method according to claim 20, characterized in that the object images recorded in the respective elemental holograms and having corresponding color components are simultaneously reconstructed in order from the plurality of first-stage holograms, and a plurality of materials for recording the second-stage hologram corresponding to the plurality of materials for recording elemental holograms are located in order near the reconstructed object images to make a reflection or transmission type volume hologram.

23. A method according to claim 22, characterized in that while the materials for recording the second-stage hologram in different colors are stacked in order, the object images having different color components are reconstructed in order from the plurality of first-stage holograms to record said object images in order in the stacked recording materials for recording the second-stage hologram.

* * * * *